United States Patent
Hayashi et al.

(10) Patent No.: US 10,414,108 B2
(45) Date of Patent: Sep. 17, 2019

(54) METHOD FOR PRODUCING OPTICAL FILM, AND OPTICAL FILM

(71) Applicant: Sharp Kabushiki Kaisha, Sakai, Osaka (JP)

(72) Inventors: Hidekazu Hayashi, Osaka (JP); Tokio Taguchi, Osaka (JP); Nobuaki Yamada, Osaka (JP); Yasuhiro Shibai, Osaka (JP); Atsushi Niinoh, Osaka (JP); Kenichiro Nakamatsu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 371 days.

(21) Appl. No.: 15/118,536

(22) PCT Filed: Feb. 10, 2016

(86) PCT No.: PCT/JP2016/053985
§ 371 (c)(1),
(2) Date: Aug. 12, 2016

(87) PCT Pub. No.: WO2016/174893
PCT Pub. Date: Nov. 3, 2016

(65) Prior Publication Data
US 2017/0066207 A1    Mar. 9, 2017

(30) Foreign Application Priority Data

Apr. 30, 2015  (JP) .................................. 2015-092967
Nov. 19, 2015  (JP) .................................. 2015-226792

(51) Int. Cl.
*B29D 11/00*    (2006.01)
*B32B 3/30*     (2006.01)
(Continued)

(52) U.S. Cl.
CPC ........ *B29D 11/00788* (2013.01); *B29C 33/62* (2013.01); *B29C 59/026* (2013.01);
(Continued)

(58) Field of Classification Search
CPC ........ B29D 11/00788; B29D 11/00865; B32B 3/30; B32B 27/08; B32B 27/30; B32B 37/15; B29C 33/62; B29C 59/062
See application file for complete search history.

(56) References Cited

U.S. PATENT DOCUMENTS 5,770,124 A * 6/1998 Marecki ................. G02B 5/124
                                                              264/1.36
2005/0106404 A1  5/2005 Hayashida et al.
(Continued)

FOREIGN PATENT DOCUMENTS

JP    2003-172808 A    6/2003
JP    2005097371 A     4/2005
(Continued)

OTHER PUBLICATIONS

Robert F. Fedors. "A Method for Estimating Both the Solubility Parameters and Molar Volumes of Liquids". Polymer Engineering and Science, vol. 14, No. 2. Feb. 1974. pp. 147-154.
(Continued)

*Primary Examiner* — Mathieu D Vargot
(74) *Attorney, Agent, or Firm* — Harness, Dickey & Pierce, P.L.C.

(57) ABSTRACT

A method for producing an optical film includes: (1) applying a lower layer resin and an upper layer resin; (2) forming a resin layer having the uneven structure on a surface thereof by pressing a mold against the lower layer resin and the upper layer resin from the upper layer resin side in the state where the applied lower layer resin and upper layer resin are stacked; and (3) curing the resin layer, the lower layer resin
(Continued)

containing at least one kind of first monomer that contains no fluorine atoms, the upper layer resin containing a fluorine-containing monomer and at least one kind of second monomer that contains no fluorine atoms, at least one of the first monomer and the second monomer containing a compatible monomer that is compatible with the fluorine-containing monomer and being dissolved in the lower layer resin and the upper layer resin.

21 Claims, 19 Drawing Sheets

(51) Int. Cl.
<table>
<tr><td>G02B 1/118</td><td>(2015.01)</td></tr>
<tr><td>G02B 1/18</td><td>(2015.01)</td></tr>
<tr><td>G02B 1/14</td><td>(2015.01)</td></tr>
<tr><td>B29C 33/62</td><td>(2006.01)</td></tr>
<tr><td>C09D 5/00</td><td>(2006.01)</td></tr>
<tr><td>C09D 5/16</td><td>(2006.01)</td></tr>
<tr><td>C09D 133/08</td><td>(2006.01)</td></tr>
<tr><td>C09D 133/24</td><td>(2006.01)</td></tr>
<tr><td>C09D 175/16</td><td>(2006.01)</td></tr>
<tr><td>B29C 59/02</td><td>(2006.01)</td></tr>
<tr><td>C08F 290/06</td><td>(2006.01)</td></tr>
<tr><td>C08L 75/16</td><td>(2006.01)</td></tr>
<tr><td>B32B 27/08</td><td>(2006.01)</td></tr>
<tr><td>B32B 27/30</td><td>(2006.01)</td></tr>
<tr><td>B32B 37/15</td><td>(2006.01)</td></tr>
<tr><td>B29C 35/08</td><td>(2006.01)</td></tr>
<tr><td>B29K 33/04</td><td>(2006.01)</td></tr>
<tr><td>B29K 105/00</td><td>(2006.01)</td></tr>
<tr><td>B32B 38/06</td><td>(2006.01)</td></tr>
</table>

(52) U.S. Cl.
CPC ......... *B29D 11/00865* (2013.01); *B32B 3/30* (2013.01); *B32B 27/08* (2013.01); *B32B 27/30* (2013.01); *B32B 37/15* (2013.01); *C08F 290/067* (2013.01); *C08L 75/16* (2013.01); *C09D 5/006* (2013.01); *C09D 5/1662* (2013.01); *C09D 5/1681* (2013.01); *C09D 5/1693* (2013.01); *C09D 133/08* (2013.01); *C09D 133/24* (2013.01); *C09D 175/16* (2013.01); *G02B 1/118* (2013.01); *G02B 1/14* (2015.01); *G02B 1/18* (2015.01); *B29C 35/0805* (2013.01); *B29C 2035/0827* (2013.01); *B29C 2059/023* (2013.01); *B29D 11/0073* (2013.01); *B29K 2033/04* (2013.01); *B29K 2105/0002* (2013.01); *B29K 2105/0005* (2013.01); *B29K 2995/0087* (2013.01); *B29K 2995/0097* (2013.01); *B32B 38/06* (2013.01); *B32B 2551/00* (2013.01)

(56) References Cited

U.S. PATENT DOCUMENTS

<table>
<tr><td>2008/0218865 A1*</td><td>9/2008</td><td>Iwata</td><td>G02B 1/111<br>359/601</td></tr>
<tr><td>2012/0132103 A1</td><td>5/2012</td><td>Tsugita et al.</td><td></td></tr>
<tr><td>2012/0314294 A1*</td><td>12/2012</td><td>Nakayama</td><td>C08G 73/10<br>359/580</td></tr>
<tr><td>2013/0155497 A1*</td><td>6/2013</td><td>Mochizuki</td><td>G02B 5/0808<br>359/361</td></tr>
</table>

FOREIGN PATENT DOCUMENTS

<table>
<tr><td>JP</td><td>2007178724 A</td><td>7/2007</td></tr>
<tr><td>JP</td><td>4111818 B2</td><td>7/2008</td></tr>
<tr><td>JP</td><td>2011191368 A</td><td>9/2011</td></tr>
<tr><td>JP</td><td>2014153524 A</td><td>8/2014</td></tr>
<tr><td>JP</td><td>2014153525 A</td><td>8/2014</td></tr>
<tr><td>WO</td><td>WO-2011013615 A1</td><td>2/2011</td></tr>
<tr><td>WO</td><td>WO-2013191089 A1</td><td>12/2013</td></tr>
</table>

OTHER PUBLICATIONS

J. Brandrup et al. "Polymer Handbook—Fourth Edition". John Wiley & Sons, Inc. A Wiley-Interscience Publication. 1999.

Ken Milam et al. "P-193: Optool DAC-HP: An Anti-fingerprint Coating Material for Touch Panel Screens". SID 11 Digest. 2011. pp. 1826-1829.

Nano Science Corporation. "Useful tips for XPS analysis (XPS Bunseki no mamechishiki". 2014. www.nanoscience.co.jp/knowledge/XPS/knowledge02.html.

Ana Maria Ferraria et al. "XPS studies of directly fluorinated HDPE: problems and solutions". Polymer 44. Elsevier-Science Direct. 2003. pp. 7241-7249.

Thermo Fisher Scientific, Inc. "Oxygen". 2013. www.xpssimplified.com/elements/oxygen.php.

Niall Stobie et al. "Silver Doped Perfluoropolyether-Urethane Coatings: Antibacterial Activity and Surface Analysis". Colloids and Surfaces B: Biointerfaces vol. 72. 2009. pp. 62-67.

Restriction Requirement for U.S. Appl. No. 15/649,755 dated Jul. 10, 2019.

* cited by examiner (a)

(b)

(c)

(d)

(a)

(b)

(c)

(a)

(b)

(c)

(d)

(a)

(b)

(c)

METHOD FOR PRODUCING OPTICAL FILM, AND OPTICAL FILM

TECHNICAL FIELD

The present invention relates to methods for producing an optical film, and optical films. More specifically, the present invention relates to a method for producing an optical film having a nanometer-sized uneven structure, and to an optical film produced by the method for producing an optical film.

BACKGROUND ART

Optical films having a nanometer-sized uneven structure (nanostructure) are known to be used as anti-reflection films. Such an uneven structure has a refractive index continuously changing from the air layer to the base film, which enables significant reduction of the reflected light. Those optical films have excellent anti-reflection properties, but have a disadvantage that due to the uneven structure of their surfaces, dirt such as a fingerprint (sebum) easily spreads once it has adhered to the surface, and it may be difficult to wipe off the dirt that has entered the gaps between the projections. Also, since the adhered dirt has a reflectance greatly different from the optical film, the dirt can be easily recognized. For these reasons, water- and oil-repellent optical films having excellent anti-fouling properties have been desired. Patent Literatures 1 to 3, for example, disclose configurations responding to the desire, such as a configuration in which a layer made of a fluorine-based material is formed on the surface having the uneven structure, and a configuration in which a fluorine-based material is added to the uneven structure.

CITATION LIST

Patent Literature

Patent Literature 1: JP 2003-172808 A
Patent Literature 2: JP 2007-178724 A
Patent Literature 3: JP 2014-153524 A
Patent Literature 4: WO 2011/013615

Non Patent Literature

Non Patent Literature 1: R. F. Fedors, Polym. Eng. Sci., 14[2], 1974, pp. 147-154
Non Patent Literature 2: J. Brandrup et al., "Solubility Parameter Values", Polymer Handbook, 4th edition
Non Patent Literature 3: K. Milam et al., "Optool™ DAC-HP: An Anti-fingerprint Coating Material for Touch Panel Screens", SID11 DIGEST, 2011, pp. 1826-1829
Non Patent Literature 4: Nano Science Corporation, "Useful tips for XPS analysis (XPS Bunseki no mame-chishiki", "Chemical state of carbon (C1s binding energy shift (chemical shift)) (Kabon no kagaku-jotai (C1s no Ketsugo enerugi no shifuto (kagaku shifuto))", [online], 2014, [searched on Nov. 6, 2015], Internet (URL: http://www.nanoscience.co.jp/knowledge/XPS/knowledge02.html
Non Patent Literature 5: A. M. Ferraria et al., "XPS studies of directly fluorinated HDPE: problems and solutions", Polymer 44, 2003, pp. 7241-7249
Non Patent Literature 6: Thermo Fisher Scientific Inc., "Oxygen", "Binding energies of common chemical states)", [online], 2013, [searched on Nov. 6, 2015], Internet (URL: http://xpssimplified.com/elements/oxygen.php)
Non Patent Literature 7: N. Stobie et al., "Silver Doped Perfluoropolyether-Urethane Coatings: Antibacterial Activity and Surface Analysis", Colloids and Surfaces B: Biointerfaces, Vol. 72, 2009, pp. 62-67

SUMMARY OF INVENTION

Technical Problem

Conventional optical films, however, have insufficient anti-fouling properties, and thus can be improved. Also, the fluorine-based material, used to improve the anti-fouling properties, tends to be removed when dirt or the like substance adhering to the surface is wiped off. Hence, those conventional optical films can be improved also from the viewpoint of improving the scratch resistance.

Patent Literature 1 discloses a configuration in which a water-repellent film made of polytetrafluoroethylene is formed on the surface having an uneven structure. The invention described in Patent Literature 1, however, has low adhesion between the uneven structure and the film made of polytetrafluoroethylene, and is likely to cause peeling of the film. Besides, since the film made of polytetrafluoroethylene is thin, the strength of the film is weak, and thus the concentration of polytetrafluoroethylene tends to be decreased by a wipe. Thus, this invention can still be improved from the viewpoint of improving the scratch resistance.

Patent Literature 2 discloses a method of forming an uneven structure by, between a base film and a mold, supplying a photocurable resin composition containing a fluorine compound, rolling the composition, and curing the composition. The invention described in Patent Literature 2, however, has an insufficient fluorine compound concentration on the surface having the uneven structure, and therefore has insufficient oil repellency. Thus, this invention can still be improved from the viewpoint of improving the anti-fouling properties.

Patent Literature 3 discloses a configuration in which a lubricating layer of a fluorine-based lubricant containing perfluoroalkyl polyether carboxylic acid is formed on the surface having an uneven structure. However, the invention described in Patent Literature 3 has low adhesion between the uneven structure and the lubricating layer of a fluorine-based lubricant, and is likely to cause peeling of the layer. Thus, this invention can still be improved from the viewpoint of improving the scratch resistance.

The present invention was made in view of the above current state of the art, and aims to provide a method for producing an optical film excellent in anti-fouling properties and scratch resistance as well as anti-reflection properties; and an optical film excellent in anti-fouling properties and scratch resistance as well as anti-reflection properties.

Solution to Problem

The inventors have made various studies on methods for producing optical films excellent in anti-fouling properties and scratch resistance as well as anti-reflection properties. As a result, the inventors have focused on a method of applying a lower layer resin and an upper layer resin, pressing a mold against the two layers in the stacked state, forming a resin layer having a nanometer-sized uneven structure on the surface, and curing the resin layer. The inventors have then found that when the monomer component of the upper layer resin contains a fluorine-containing monomer and the monomer component of at least one of the lower layer resin and the upper layer resin contains a compatible monomer being compatible with the fluorine-containing monomer and is dissolved in the lower layer resin and the upper layer resin, the concentration of fluorine atoms in the vicinity of the surface having an uneven structure is increased, so that the water repellency and oil repellency are increased. Also, the water repellency and oil repellency have been found to be significantly improved and thus excellent anti-fouling properties can be obtained on the surface having a nanometer-sized uneven structure, compared with a common surface such as a flat surface. Furthermore, the inventors have found that when compatible monomers are used, the lower layer resin and the upper layer resin are locally mixed and polymerized in the interface between the resins while the concentration of fluorine atoms in the vicinity of the surface having the uneven structure is maintained, whereby the resin layer with an increased adhesion between the resins is formed and excellent scratch resistance can be obtained. The inventors therefore solved the above-described problems, and thereby made the present invention.

That is, one aspect of the present invention may be a method for producing an optical film having on a surface thereof an uneven structure provided with projections at a pitch equal to or shorter than the wavelength of visible light, the method including the steps of: (1) applying a lower layer resin and an upper layer resin; (2) forming a resin layer having the uneven structure on a surface thereof by pressing a mold against the lower layer resin and the upper layer resin from the upper layer resin side in the state where the applied lower layer resin and upper layer resin are stacked; and (3) curing the resin layer, the lower layer resin containing at least one kind of first monomer that contains no fluorine atoms, the upper layer resin containing a fluorine-containing monomer and at least one kind of second monomer that contains no fluorine atoms, at least one of the first monomer and the second monomer containing a compatible monomer that is compatible with the fluorine-containing monomer and being dissolved in the lower layer resin and the upper layer resin.

Another aspect of the present invention may be an optical film produced by the above-described method for producing an optical film.

Yet another aspect of the present invention may be an optical film including a cured resin layer having an uneven structure on a surface thereof, the uneven structure being provided with projections at a pitch equal to or shorter than the wavelength of visible light, the cured resin layer containing carbon atoms, nitrogen atoms, oxygen atoms, and fluorine atoms as constituent atoms, the proportion of the number of the fluorine atoms relative to the total number of the carbon atoms, the nitrogen atoms, the oxygen atoms, and the fluorine atoms on the surface having the uneven structure being 33 atom % or higher, the number of the atoms being measured by X-ray photoelectron spectroscopy under the conditions of an X-ray beam diameter of 100 μm, an analysis area of 1000 μm×500 μm, and a photoelectron extraction angle of 45°.

Yet another aspect of the present invention may be an optical film including a cured resin layer having an uneven structure on a surface thereof, the uneven structure being provided with projections at a pitch equal to or shorter than the wavelength of visible light, the cured resin layer containing carbon atoms, nitrogen atoms, oxygen atoms, and fluorine atoms as constituent atoms, the ratio of a peak area of $OCF_2$ bonds to the sum of a peak area of C—O bonds and a peak area of C=O bonds being 0.3 or higher according to spectra obtained by curve-fitting for the O1s peak on the surface having the uneven structure with a peak attributed to the C—O bonds, a peak attributed to the C=O bonds, and a peak attributed to the $OCF_2$ bonds, the O1s peak being measured by X-ray photoelectron spectroscopy under the conditions of an X-ray beam diameter of 100 μm, an analysis area of 1000 μm×500 μm, and a photoelectron extraction angle of 45°.

Yet another aspect of the present invention may be an optical film including a cured resin layer having an uneven structure on a surface thereof, the uneven structure being provided with projections at a pitch equal to or shorter than the wavelength of visible light, the cured resin layer containing carbon atoms, nitrogen atoms, oxygen atoms, and fluorine atoms as constituent atoms, D satisfying the equation $MF_D/MF_S=0.3$ being 240 nm or more, where $MF_S$, expressed with the unit of atom %, is the proportion of the number of the fluorine atoms relative to the total number of the carbon atoms, the nitrogen atoms, the oxygen atoms, and the fluorine atoms on the surface having the uneven structure, and $MF_D$, expressed with the unit of atom %, is the proportion of the number of the fluorine atoms relative to the total number of the carbon atoms, the nitrogen atoms, the oxygen atoms, and the fluorine atoms at a position away from the surface having the uneven structure by D, expressed with the unit of nm, in the depth direction in terms of polyhydroxy styrene equivalent, the number of the atoms being measured by X-ray photoelectron spectroscopy under the conditions of an X-ray beam diameter of 100 μm, an analysis area of 1000 μm×500 μm, and a photoelectron extraction angle of 45°.

Advantageous Effects of Invention

The present invention can provide a method for producing an optical film excellent in anti-fouling properties and scratch resistance as well as anti-reflection properties; and an optical film excellent in anti-fouling properties and scratch resistance as well as anti-reflection properties.

DESCRIPTION OF EMBODIMENTS

Figure 1:
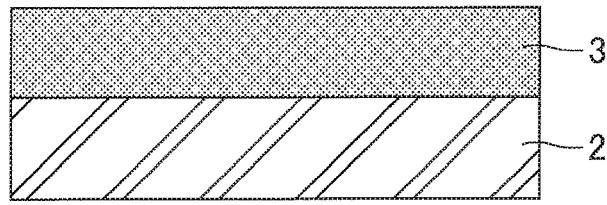
FIG. 1 illustrates schematic cross-sectional views for explaining the process of producing an optical film of Embodiment 1 (steps a to d).
Figure 1:
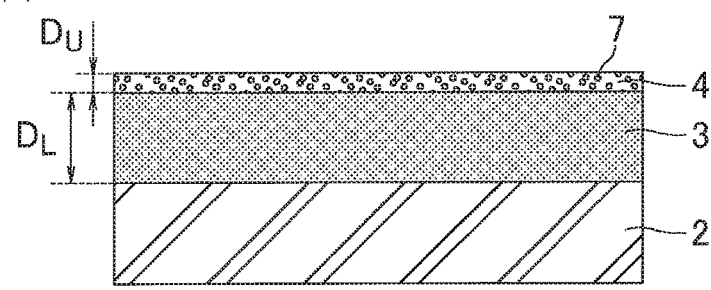
Figure 1:
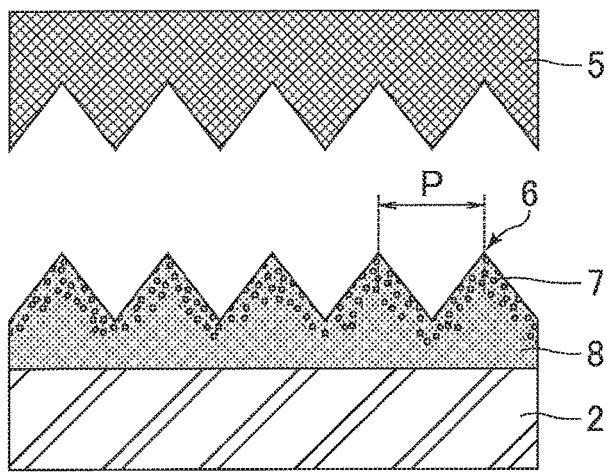
Figure 1:
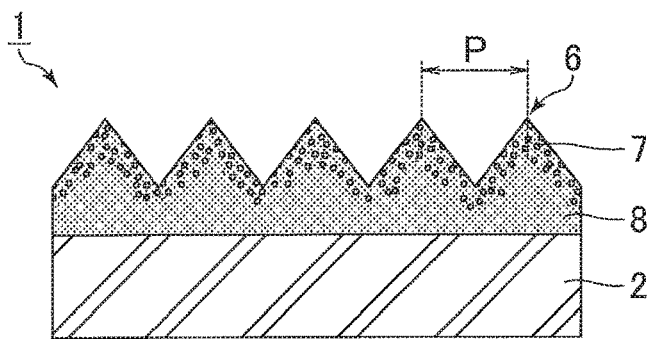

The present invention will be described in more detail below with reference to the drawings based on embodiments. The embodiments, however, are not intended to limit the scope of the present invention. Hereinafter, the same portions or the portions having the same function in different drawings are provided with the same reference numeral except for an alphabet following the numeral, and thus the same reference numeral is not repeatedly described. Also, the configurations of the respective embodiments may suitably be combined or altered within the spirit of the present invention.

Embodiment 1

FIG. 1 illustrates schematic cross-sectional views for explaining the process of producing an optical film of Embodiment 1 (steps a to d). Hereinafter, the method for producing the optical film of Embodiment 1 is described in detail with reference to FIG. 1.

(a) Application of Lower Layer Resin

First, as illustrated in the view (a) of FIG. 1, a lower layer resin 3 is applied to a base film 2. Examples of the method for applying the lower layer resin 3 include, but are not particularly limited to, application methods such as the gravure method and the slot die method.

(b) Application of Upper Layer Resin

As illustrated in the view (b) of FIG. 1, an upper layer resin 4 is applied to the applied lower layer resin 3. As a result, the upper layer resin 4 is formed on the lower layer resin 3 on the side opposite to the base film 2. Examples of the method for applying the upper layer resin 4 include, but are not particularly limited to, application methods such as the spray method, the gravure method, and the slot die method. The spray method is preferred because the film thickness is easily adjustable and the apparatus cost can be suppressed. In particular, it is preferred to perform the application using a swirl nozzle, an electrostatic nozzle, or an ultrasonic nozzle.

(c) Formation of Uneven Structure

As illustrated in the view (c) of FIG. 1, in the state where the applied lower layer resin 3 and upper layer resin 4 are stacked, a mold 5 is pressed against the lower layer resin 3 and the upper layer resin 4 from the upper layer resin 4 side, so that a resin layer 8 having an uneven structure on a surface thereof is formed. The resin layer 8 is an integral form of the lower layer resin 3 and the upper layer resin 4 with no interface between these resins. The uneven structure of the resin layer 8 corresponds to a structure in which projections 6 are provided at a pitch P (distance between the tops of the projections 6 adjacent to each other) equal to or shorter than the wavelength of visible light, i.e., a moth-eye structure.

(d) Curing of Resin Layer

The resin layer 8 having the uneven structure is cured. As a result, an optical film 1 including a cured product of the resin layer 8 having the uneven structure on the surface as illustrated in the view (d) of FIG. 1 is completed. Examples of the method for curing the resin layer 8 include, but are not particularly limited to, methods utilizing light, heat, or a combination of light and heat. The method is preferably one which utilizes ultraviolet rays. The number of times for the photoirradiation of the resin layer 8 is not particularly limited, and may be a single time or multiple times. The photoirradiation may be performed from the base film 2 side or from the resin layer 8 side.

In the production process described above, the steps (a) to (d) can be performed continuously and efficiently by, for example, using the base film 2 with a roll shape.

Each component used in production of the optical film 1 is described below.

Examples of the material of the base film 2 include triacetyl cellulose (TAC) (solubility parameter: 12.2 (cal/cm$^3$)$^{1/2}$), polyethylene terephthalate (PET) (solubility parameter: 10.7 (cal/cm$^3$)$^{1/2}$), polymethyl methacrylate (PMMA) (solubility parameter: 9.06 (cal/cm$^3$)$^{1/2}$), cyclo-olefin polymer (COP) (solubility parameter: 7.4 (cal/cm$^3$)$^{1/2}$), and polycarbonate (PC). The material may be selected according to use environments. Those materials can give high hardness, excellent transparency, and excellent weather resistance to the base film 2. The base film 2 may be subjected to an easy adhesion treatment. For example, a TAC film on which an easy adhesion treatment has been performed (solubility parameter: 11 (cal/cm$^3$)$^{1/2}$) may be used. The base film 2 may also be subjected to a saponification treatment. For example, a TAC film on which a saponification treatment has been performed (solubility parameter: 16.7 (cal/cm$^3$)$^{1/2}$) may be used.

The thickness of the base film 2 is not particularly limited, but is preferably in the range of 10 μm to 120 μm, more preferably in the range of 40 μm to 80 μm, from the viewpoint of achieving the transparency and processability.

The lower layer resin 3 contains at least one kind of first monomer that contains no fluorine atoms. Examples of such a first monomer include acrylate monomers such as urethane acrylates, polyfunctional acrylates, and monofunctional acrylates, and a mixture of two or more kinds of acrylate monomers (photocurable resin) may be suitable. Those materials can give a refractive index suitable in combination use with the base film 2, excellent transparency, excellent flexibility, and excellent weather resistance to the lower layer resin 3.

Examples of the urethane acrylates include a urethane acrylate (product name: UA-7100, solubility parameter: 10.2 (cal/cm$^3$)$^{1/2}$, molecular weight: 1700, surface tension: 85.2 dyn/cm) from Shin-Nakamura Chemical Co., Ltd., a urethane acrylate (product name: U-4HA, solubility parameter: 11.3 (cal/cm$^3$)$^{1/2}$, molecular weight: 600, surface tension: 66.6 dyn/cm) from Shin-Nakamura Chemical Co., Ltd., a urethane acrylate (product name: UA-306H, solubility parameter: 10.8 (cal/cm$^3$)$^{1/2}$, molecular weight: 750, surface tension: 70.0 dyn/cm) from Kyoeisha Chemical Co., Ltd., and a urethane acrylate (product name: AH-600, solubility parameter: 10.9 (cal/cm$^3$)$^{1/2}$, molecular weight: 600, surface tension: 63.1 dyn/cm) from Kyoeisha Chemical Co., Ltd.

Examples of the polyfunctional acrylates include a polyfunctional acrylate (product name: ATM-35E, solubility parameter: 9.6 (cal/cm$^3$)$^{1/2}$, molecular weight: 1892, surface tension: 76.8 dyn/cm) from Shin-Nakamura Chemical Co., Ltd., a polyfunctional acrylate (product name: A-TMM-3LM-N, solubility parameter: 12.6 (cal/cm$^3$)$^{1/2}$, molecular weight: 298, surface tension: 64.4 dyn/cm) from Shin-Nakamura Chemical Co., Ltd., a polyfunctional acrylate (product name: TMP-3P, solubility parameter: 9.4 (cal/cm$^3$)$^{1/2}$, molecular weight: 470, surface tension: 45.2 dyn/cm) from DKS Co. Ltd., a polyfunctional acrylate (product name: BPP-4, solubility parameter: 9.8 (cal/cm$^3$)$^{1/2}$, molecular weight: 570, surface tension: 51.4 dyn/cm) from DKS Co. Ltd., a polyfunctional acrylate (product name: PD-070A, solubility parameter: 8.9 (cal/cm$^3$)$^{1/2}$, molecular weight: 840, surface tension: 51.6 dyn/cm) from Toho Chemical Industry Co., Ltd., and a polyfunctional acrylate (product name: 80MFA, solubility parameter: 13.4 (cal/cm$^3$)$^{1/2}$, molecular weight: 350, surface tension: 66.6 dyn/cm) from Kyoeisha Chemical Co., Ltd.

Examples of the monofunctional acrylates include an amide group-containing monomer (product name: ACMO (registered trademark), solubility parameter: 12.0 (cal/cm$^3$)$^{1/2}$, molecular weight: 141, surface tension: 43.7 dyn/cm) from KJ Chemicals Corporation, an amide group-containing monomer (product name: HEAA (registered trademark), solubility parameter: 14.4 (cal/cm$^3$)$^{1/2}$, molecular weight: 115, surface tension: 45.7 dyn/cm) from KJ Chemicals Corporation, an amide group-containing monomer (product name: DEAA (registered trademark), solubility parameter: 10.1 (cal/cm$^3$)$^{1/2}$, molecular weight: 127, surface tension: 28.0 dyn/cm) from KJ Chemicals Corporation, a hydroxy group-containing monomer (product name: CHDMMA, solubility parameter: 11.6 (cal/cm$^3$)$^{1/2}$, molecular weight: 198, surface tension: 43.5 dyn/cm) from Nippon Kasei Chemical Co., Ltd., a hydroxy group-containing monomer (product name: 4HBA, solubility parameter: 11.6 (cal/cm$^3$)$^{1/2}$, molecular weight: 144, surface tension: 36.3 dyn/cm) from Nippon Kasei Chemical Co., Ltd., and an acetoacetoxy group-containing monomer (product name: AAEM, solubility parameter: 10.6 (cal/cm$^3$)$^{1/2}$, molecular weight: 214, surface tension: 39.5 dyn/cm) from The Nippon Synthetic Chemical Industry Co., Ltd.

The solubility parameter as used herein is calculated by the Fedors's estimation method described in Non Patent Literatures 1 and 2, which estimates the solubility parameter from the molecular structure. The smaller the solubility parameter is, the higher the water repellency becomes. The greater the solubility parameter is, the higher the hydrophilicity becomes.

The surface tension as used herein is determined by the penetration rate method. The penetration rate method is a method of pressing the target substance into a column under a constant pressure to fill the column, and determining the surface tension of the target substance with water from the equation: $l^2/t = (r \cdot \gamma \cos \theta)/2\eta$. In this equation, l represents the penetration height of water, t represents time, r represents the radius of capillary of the filling target substance, $\gamma$ represents the surface tension, $\eta$ represents the viscosity of water, and $\theta$ represents the contact angle. The smaller the surface tension is, the greater the contact angle becomes and the higher the water repellency becomes.

The lower layer resin 3 may further contain a polymerization initiator. Examples of the polymerization initiator include photopolymerization initiators. The photopolymerization initiator is a compound that is active to an active energy ray and is added to initiate the polymerization reaction of polymerizing monomers. The photopolymerization initiator may be, for example, a radical polymerization initiator, an anionic polymerization initiator, or a cationic polymerization initiator. Examples of the photopolymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; and benzyl ketals such as benzyl dimethyl ketal and hydroxy cyclohexyl phenyl ketone. Known examples of the photopolymerization initiators include a photopolymerization initiator (product name: IRGACURE (registered trademark) 819) from BASF A.G.

The thickness $D_L$ (after application) of the lower layer resin 3 is not particularly limited, but is preferably in the range of 3 µm to 30 µm, more preferably in the range of 5 µm to 7 µm.

The lower layer resin 3 preferably has a viscosity of higher than 10 cp and lower than 10000 cp at 25° C. In the case that the viscosity of the lower layer resin 3 is higher than 10 cp at 25° C., a fluorine-containing monomer contained in the upper layer resin 4 can be prevented from being mixed into the lower layer resin 3 in the state where the lower layer resin 3 and the upper layer resin 4 are stacked, so that the concentration of fluorine atoms 7 in the vicinity of the surface of the upper layer resin 4 can be suitably prevented from decreasing. In the case that the viscosity of the lower layer resin 3 is lower than 10000 cp at 25° C., the applicability of the lower layer resin 3 can be suitably increased. The viscosity as used herein is measured using a model TV-25 viscometer (product name: TVE-25L) from Toki Sangyo Co., Ltd.

The upper layer resin 4 contains a fluorine-containing monomer. The fluorine-containing monomer can reduce the surface free energy of the optical film 1, and gives, when combined with the moth-eye structure, excellent anti-fouling properties to the optical film 1.

The fluorine-containing monomer preferably includes a moiety containing at least one selected from the group consisting of fluoroalkyl groups, fluorooxyalkyl groups, fluoroalkenyl groups, fluoroalkanediyl groups, and fluorooxyalkanediyl groups, and a reactive moiety.

The fluoroalkyl groups, fluorooxyalkyl groups, fluoroalkenyl groups, fluoroalkanediyl groups, and fluorooxyalkanediyl groups each are a substituent in which at least one hydrogen atom in the akyl, oxyalkyl, alkenyl, alkanediyl, or oxyalkanediyl group is replaced by a fluorine atom. The fluoroalkyl groups, fluorooxyalkyl groups, fluoroalkenyl groups, fluoroalkanediyl groups, and fluorooxyalkanediyl groups each are a substituent mainly containing fluorine atoms and carbon atoms, and may have a branched structure. A plurality of these substituents may be connected.

The reactive moiety refers to a moiety that reacts with another component under an external energy such as light or heat. Examples of such a reactive moiety include alkoxysilyl groups, silylether groups, silanol groups resulting from hydrolysis of alkoxysilyl groups, carboxyl groups, hydroxy groups, epoxy groups, vinyl groups, allyl groups, acryloyl groups, and methacryloyl groups. From the viewpoint of the reactivity and the handleability, the reactive moiety is preferably an alkoxysilyl group, a silyl ether group, a silanol group, an epoxy group, a vinyl group, an allyl group, an acryloyl group, or a methacryloyl group, more preferably a vinyl group, an allyl group, an acryloyl group, or a methacryloyl group, particularly preferably an acryloyl group or a methacryloyl group.

Examples of the fluorine-containing monomer include monomers represented by the following formula (A).

$$R^{f1}\text{—}R^2\text{—}D^1 \tag{A}$$

In the formula (A), $R^{f1}$ represents a moiety containing at least one selected from the group consisting of fluoroalkyl groups, fluorooxyalkyl groups, fluoroalkenyl groups, fluoroalkanediyl groups, and fluorooxyalkanediyl groups; $R^2$ represents an alkanediyl group, an alkanetriyl group, or the ester, urethane, ether, or triazine structure derived from any of these groups; and $D^1$ represents a reactive moiety.

Examples of the monomers represented by the formula (A) include 2,2,2-trifluoroethyl acrylate, 2,2,3,3,3-pentafluoropropyl acrylate, 2-perfluorobutyl ethyl acrylate, 3-perfluorobutyl-2-hydroxypropyl acrylate, 2-perfluorohexyl ethyl acrylate, 3-perfluorohexyl-2-hydroxypropyl acrylate, 2-perfluorooctyl ethyl acrylate, 3-perfluorooctyl-2-hydroxypropyl acrylate, 2-perfluorodecyl ethyl acrylate, 2-perfluoro-3-methylbutyl ethyl acrylate, 3-perfluoro-3-methoxybutyl-2-hydroxypropyl acrylate, 2-perfluoro-5-methylhexyl ethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutyl ethyl methacrylate, 3-perfluorobutyl-2-hydroxypropyl methacrylate, 2-perfluorooctyl ethyl methacrylate, 3-perfluorooctyl-2-hydroxypropyl methacrylate, 2-perfluorodecyl ethyl methacrylate, 2-perfluoro-3-methylbutyl ethyl methacrylate, 3-perfluoro-3-methylbutyl-2-hydroxypropyl methacrylate, 2-perfluoro-5-methylhexyl ethyl methacrylate, 3-perfluoro-5-methylhexyl-2-hydroxypropyl methacrylate, 2-perfluoro-7-methyloctyl ethyl methacrylate, 3-perfluoro-7-methyloctyl ethyl methacrylate, tetrafluoropropyl methacrylate, octafluoropentyl methacrylate, dodecafluoroheptyl methacrylate, hexadecafluorononyl methacrylate, 1-trifluoromethyl trifluoroethyl methacrylate, hexafluorobutyl methacrylate, and triacryloyl-heptadecafluorononenyl-pentaerythritol.

Examples of suitable materials of the fluorine-containing monomer include materials containing a fluoropolyether moiety. A fluoropolyether moiety contains a group such as a fluoroalkyl group, an oxyfluoroalkyl group, or an oxyfluoroalkyldiyl group, and is represented by the following formula (B) or (C).

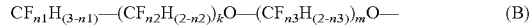

$$CF_{n1}H_{(3-n1)}\text{—}(CF_{n2}H_{(2-n2)})_k O\text{—}(CF_{n3}H_{(2-n3)})_m O\text{—} \tag{B}$$

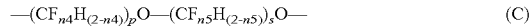

$$\text{—}(CF_{n4}H_{(2-n4)})_p O\text{—}(CF_{n5}H_{(2-n5)})_s O\text{—} \tag{C}$$

In the formulas (B) and (C), n1 is an integer of 1 to 3, n2 to n5 each are 1 or 2, and k, m, p, and s each are an integer of 0 or greater. Preferred combinations of n1 to n5 are combinations in which n1 is 2 or 3 and n2 to n5 each are 1 or 2. More preferred combinations of n1 to n5 are combinations in which n1 is 3, n2 and n4 each are 2, and n3 and n5 each are 1 or 2.

The number of carbon atoms contained in the fluoropolyether moiety is preferably in the range of 4 to 12, more preferably in the range of 4 to 10, still more preferably in the range of 6 to 8. If the number of carbon atoms is less than 4, the surface energy may decrease. If the number of carbon atoms is more than 12, the solubility of the monomer into the solvent may decrease. The fluorine-containing monomer may include multiple fluoropolyether moieties per molecule.

Known examples of the fluorine-containing monomer include a fluorine-based additive (product name: OPTOOL DAC-HP, solubility parameter: 9.7 $(cal/cm^3)^{1/2}$) from Daikin Industries Ltd., a fluorine-based additive (product name: OPTOOL DSX) from Daikin Industries Ltd., a fluorine-based additive (product name: Afluid, solubility parameter: 9 to 11 $(cal/cm^3)^{1/2}$, surface tension: 11 dyn/cm) from Asahi Glass Co., Ltd., a fluorine-based additive (product name: MEGAFACE (registered trademark) RS-76-NS) from DIC Corporation, a fluorine-based additive (product name: MEGAFACE RS-75) from DIC Corporation, a fluorine-based additive (product name: C10GACRY) from Yushi-Seihin Co., Ltd., and a fluorine-based additive (product name: C8HGOL) from Yushi-Seihin Co., Ltd. Preferably, the fluorine-containing monomer is curable by ultraviolet rays and contains an —$OCF_2$— chain and/or =NCO— chain.

The fluorine-containing monomer may be contained also in the lower layer resin 3. In this case, the concentration of the fluorine-containing monomer in the upper layer resin 4 is preferably higher than that in the lower layer resin 3. It is particularly preferred that the lower layer resin 3 contains no fluorine-containing monomer.

The upper layer resin 4 preferably has a concentration of the fluorine-containing monomer of higher than 0% by weight and lower than 20% by weight. In the case that the concentration of the fluorine-containing monomer is lower than 20% by weight, occurrence of cloudiness due to a large amount of the fluorine-containing monomer can be suitably prevented.

The upper layer resin 4 contains at least one kind of second monomer that contains no fluorine atoms. Examples of such a second monomer include an amide group-containing monomer (product name: ACMO) from KJ Chemicals Corporation, an amide group-containing monomer (product name: HEAA) from KJ Chemicals Corporation, an amide group-containing monomer (product name: DEAA) from KJ Chemicals Corporation, a hydroxy group-containing monomer (product name: CHDMMA) from Nippon Kasei Chemical Co., Ltd., a hydroxy group-containing monomer (product name: 4HBA) from Nippon Kasei Chemical Co., Ltd., and an acetoacetoxy group-containing monomer (product name: AAEM) from The Nippon Synthetic Chemical Industry Co., Ltd.

The thickness $D_U$ (after application) of the upper layer resin 4 is not particularly limited, but is preferably in the range of 0.1 μm to 15 μm, more preferably in the range of 1 μm to 10 μm, still more preferably in the range of 2 μm to 8 μm, particularly preferably in the range of 5 μm to 8 μm. In order to improve the smoothness (leveling properties) after application, a fluorine-based surfactant (e.g. a fluorine-based surfactant (product name: SURFLON (registered trademark) S-232) from AGC Seimi Chemical Co., Ltd.) or a fluorine-based solvent (e.g. fluorine-based solvent (product name: Diluent ZV) from FluoroTechnology Co., Ltd.) may further be added to the upper layer resin 4.

The upper layer resin 4 preferably has a viscosity of higher than 0.1 cp and lower than 100 cp at 25° C. In the case that the viscosity of the upper layer resin 4 is lower than 100 cp at 25° C., suitable fluidity of the fluorine-containing monomer contained in the upper layer resin 4 can be achieved, so that the applicability of the upper layer resin 4 can be suitably improved. In the case that the viscosity of the upper layer resin 4 is higher than 0.1 cp at 25° C., the applicability of the upper layer resin 4 can be suitably improved, so that the thickness of the upper layer resin 4 can be easily controlled.

The upper layer resin 4 preferably contains no solvent. That is, the upper layer resin 4 is preferably a non-solvent resin. In the case that a solvent is not added to the upper layer resin 4, an apparatus for drying and removing the solvent is not necessary, and thus the apparatus cost can be suppressed. Also, since no solvent is used, the cost for the solvent can be eliminated and the productivity can be improved. In contrast, if a solvent is added to the upper layer resin 4, the fluorine-containing monomer may be mixed too well, which may decrease the concentration of the fluorine atoms 7 in the vicinity of the surface of the optical film 1. Also, the volatility of the upper layer resin 4 will be high, which may decrease the applicability.

At least one of the first monomer and the second monomer contains a compatible monomer that is compatible with the fluorine-containing monomer, and is dissolved in the lower layer resin 3 and the upper layer resin 4. Thereby, the fluorine-containing monomer is concentrated in the vicinity of the surface of the optical film 1 while maintaining its compatibility with the compatible monomer. As a result, the concentration of the fluorine atoms 7 in the vicinity of the surface can be increased. Here, in order to improve the adhesion between the lower layer resin 3 and the upper layer resin 4, it is important to achieve a state in which, when the resins come into contact with each other as monomers, the resins are instantaneously mixed with each other in the interface therebetween, and after polymerization, the monomer compositions continuously change such that the interface does not exist therebetween. The compatible monomer is added to form the resin layer 8 in such a state by improving the compatibility between the lower layer resin 3 and the upper layer resin 4. The compatible monomer therefore gives excellent scratch resistance to the optical film 1.

Suitable as the compatible monomer is a reactive dilution monomer for photocurable resins, for example. Examples of such a reactive dilution monomer include an amide group-containing monomer (product name: ACMO) from KJ Chemicals Corporation, an amide group-containing monomer (product name: HEAA) from KJ Chemicals Corporation, an amide group-containing monomer (product name: DEAA) from KJ Chemicals Corporation, a hydroxy group-containing monomer (product name: CHDMMA) from Nippon Kasei Chemical Co., Ltd., a hydroxy group-containing monomer (product name: 4HBA) from Nippon Kasei Chemical Co., Ltd., and an acetoacetoxy group-containing monomer (product name: AAEM) from The Nippon Synthetic Chemical Industry Co., Ltd. Such a material can suitably dissolve the fluorine-containing monomer. Also, such a material is highly compatible with the base film 2 (e.g. TAC film). Hence, when such a material is added to the lower layer resin 3, the adhesion between the base film 2 and the lower layer resin 3 can be suitably improved. The compatible monomer preferably contains an acid amide bond in the molecule.

The solubility parameter of the fluorine-containing monomer is preferably in the range of 5 $(cal/cm^3)^{1/2}$ to 11 $(cal/cm^3)^{1/2}$. The solubility parameter of a monomer component other than the compatible monomer in the lower layer resin 3 is preferably in the range of 7 $(cal/cm^3)^{1/2}$ to 16 $(cal/cm^3)^{1/2}$. The solubility parameter of a monomer component other than the compatible monomer in the upper layer resin 4 is preferably in the range of 7 $(cal/cm^3)^{1/2}$ to 16 $(cal/cm^3)^{1/2}$.

The solubility parameter of the compatible monomer is not particularly limited and can be suitably selected. From the viewpoint of sufficiently improving the compatibility between the lower layer resin 3 and the upper layer resin 4, the solubility parameter is preferably in the range of 5 $(cal/cm^3)^{1/2}$ to 16 $(cal/cm^3)^{1/2}$, more preferably in the range of 8.3 $(cal/cm^3)^{1/2}$ to 9.7 $(cal/cm^3)^{1/2}$, still more preferably in the range of 8.3 $(cal/cm^3)^{1/2}$ to 9.5 $(cal/cm^3)^{1/2}$. Since a compatible monomer having a lower solubility parameter has better compatibility with the fluorine-containing monomer, the range for the concentration of the fluorine-containing monomer in the upper layer resin 4 can be set wide. Hence, even when the concentration of the fluorine-containing monomer in the upper layer resin 4 is high, disadvantages such as cloudiness and separation of layers can be suppressed, and the appearance after curing of the upper layer resin 4 can be favorable.

In the case that the monomer component other than the compatible monomer in the lower layer resin 3 includes multiple monomers, the solubility parameter of the monomer component other than the compatible monomer in the lower layer resin 3 (or simply the solubility parameter of the lower layer resin) is the sum of values each obtained by multiplying the solubility parameter of each monomer by the ratio by weight of the monomer to the whole monomer component other than the compatible monomer. In the case that the monomer component other than the compatible monomer in the upper layer resin 4 includes multiple monomers, the solubility parameter of the monomer component other than the compatible monomer in the upper layer resin 4 (or simply the solubility parameter of the upper layer resin) is the sum of values each obtained by multiplying the solubility parameter of each monomer by the ratio by weight of the monomer to the whole monomer component other than the compatible monomer. In the case that multiple fluorine-containing monomers are contained, the solubility parameter of the fluorine-containing monomer is the sum of values each obtained by multiplying the solubility parameter of each fluorine-containing monomer by the ratio by weight of the fluorine-containing monomer to all the fluorine-containing monomers. In the case that multiple compatible monomers are contained, the solubility parameter of the compatible monomer is the sum of values each obtained by multiplying the solubility parameter of each compatible monomer by the ratio by weight of the compatible monomer to all the compatible monomers.

The difference between the solubility parameter of the compatible monomer and the solubility parameter of the fluorine-containing monomer is preferably in the range of 0 $(cal/cm^3)^{1/2}$ to 4.0 $(cal/cm^3)^{1/2}$, more preferably in the range of 0 $(cal/cm^3)^{1/2}$ to 3.0 $(cal/cm^3)^{1/2}$, still more preferably in the range of 0 $(cal/cm^3)^{1/2}$ to 2.5 $(cal/cm^3)^{1/2}$, from the viewpoint of sufficiently improving the compatibility between the monomers.

The difference between the solubility parameter of the compatible monomer and the solubility parameter of the monomer component other than the compatible monomer in the lower layer resin 3 is preferably in the range of 0 $(cal/cm^3)^{1/2}$ to 3.0 $(cal/cm^3)^{1/2}$, more preferably in the range of 0 $(cal/cm^3)^{1/2}$ to 2.0 $(cal/cm^3)^{1/2}$, from the viewpoint of sufficiently improving the compatibility between the monomers.

The difference between the solubility parameter of the compatible monomer and the solubility parameter of the monomer component other than the compatible monomer in the upper layer resin 4 is preferably in the range of 0 $(cal/cm^3)^{1/2}$ to 3.0 $(cal/cm^3)^{1/2}$, more preferably in the range of 0 $(cal/cm^3)^{1/2}$ to 2.0 $(cal/cm^3)^{1/2}$, from the viewpoint of sufficiently improving the compatibility between the monomers.

The difference between the solubility parameter of the fluorine-containing monomer and the solubility parameter of the monomer component other than the compatible monomer in the lower layer resin 3 is preferably in the range of 3.0 $(cal/cm^3)^{1/2}$ to 5.0 $(cal/cm^3)^{1/2}$, from the viewpoint of suitably preventing the fluorine-containing monomer contained in the upper layer resin 4 from being mixed into the lower layer resin 3 in the state where the lower layer resin 3 and the upper layer resin 4 are stacked, and eventually suitably preventing a decrease in the concentration of the fluorine atoms 7 in the vicinity of the surface of the upper layer resin 4.

The difference between the solubility parameter of the base film 2 and the solubility parameter of the monomer component other than the compatible monomer in the lower layer resin 3 is preferably in the range of 0 $(cal/cm^3)^{1/2}$ to 5.0 $(cal/cm^3)^{1/2}$, from the viewpoint of sufficiently improving the adhesion between these components.

The compatible monomer is contained in at least one of the first monomer (lower layer resin 3) and the second monomer (upper layer resin 4) in any of the following forms (i) to (iii), for example.

(i) Form in which the compatible monomer is contained in the first monomer and the second monomer This form is effective when the difference between the solubility parameter of the monomer component other than the compatible monomer in the lower layer resin 3 and the solubility parameter of the fluorine-containing monomer is large (for example, 2.0 $(cal/cm^3)^{1/2}$ or more). The compatible monomer contained in the first monomer and the compatible monomer contained in the second monomer may have the same solubility parameter or different solubility parameters. In the case that these monomers have different solubility parameters, the solubility parameter of the compatible monomer contained in the first monomer is preferably greater than the solubility parameter of the compatible monomer contained in the second monomer. In the case that these monomers have the same solubility parameter, the compatible monomers may be the same one whose solubility parameter is preferably an intermediate value between the solubility parameter of the monomer component other than the compatible monomer in the lower layer resin 3 and the solubility parameter of the fluorine-containing monomer.

(ii) Form in which the compatible monomer is contained only in the first monomer The solubility parameter of the compatible monomer is preferably an intermediate value between the solubility parameter of the monomer component other than the compatible monomer in the lower layer resin 3 and the solubility parameter of the fluorine-containing monomer.

(iii) Form in which the compatible monomer is contained only in the second monomer The solubility parameter of the compatible monomer is preferably an intermediate value between the solubility parameter of the monomer component other than the compatible monomer in the lower layer resin 3 and the solubility parameter of the fluorine-containing monomer.

The mold 5 is pressed against the lower layer resin 3 and the upper layer resin 4 to form the uneven structure (moth-eye structure). The mold 5 can be one produced by the following method, for example. First, a substrate is produced by sequentially forming, on an aluminum base material, a film of silicon dioxide ($SiO_2$) as an insulating layer and a film of pure aluminum. At this time, in the case that the aluminum base material is in a roll shape, the insulating layer and the pure aluminum layer can be continuously formed. Next, the pure aluminum layer formed on the surface of the substrate is alternately repetitively anodized and etched, so that a female die (mold) having a moth-eye structure can be produced.

The mold 5 has preferably been subjected to a release treatment. When the mold 5 has been subjected to a release treatment, the surface free energy of the mold 5 can be lowered, and the fluorine-containing monomer can be suitably concentrated in the vicinity of the surface of the resin layer 8 (upper layer resin 4) when the mold 5 is pressed against the layer. The release treatment also suitably prevents the fluorine-containing monomer from moving away from the vicinity of the surface of the resin layer 8 before the resin layer 8 is cured. As a result, the concentration of the fluorine atoms 7 in the vicinity of the surface of the optical film 1 can be suitably increased. The release treatment is preferably a surface treatment with a silane coupling agent. Suitable as the silane coupling agent is a fluorine-based silane coupling agent.

As described above, the method for producing the optical film of Embodiment 1 enables formation of a moth-eye structure on the surface and formation of the resin layer 8 having an increased concentration of the fluorine atoms 7 in the vicinity of the surface and improved adhesion between the lower layer resin 3 and the upper layer resin 4. Hence, an optical film excellent in anti-fouling properties and scratch resistance as well as anti-reflection properties can be produced.

Next, the optical film 1 produced by the above-described production method is described below.

As illustrated in the view (d) of FIG. 1, the optical film 1 includes the base film 2 and a cured product of the resin layer 8 in the given order. The optical film 1 corresponds to an anti-reflection film with the projections 6 provided at a pitch P equal to or shorter than the wavelength of visible light, i.e., an anti-reflection film having a moth-eye structure. Thereby, the optical film 1 can show excellent anti-reflection properties (low-reflection properties) with the moth-eye structure.

Examples of the shape of the projections 6 include, but are not particularly limited to, shapes that taper toward the end (tapered shapes) such as shapes formed by a pillar-shaped bottom portion and a hemispherical top portion (i.e. bell shapes) and conical shapes (cone shapes, circular cone shapes). Also, the projections 6 may have a shape with branched projections. The branched projections refer to projections formed at an irregular pitch in the anodizing and etching for production of the mold 5. In the view (d) of FIG. 1, the base of the gap between each adjacent pair of the projections 6 has an inclined shape, but may have a horizontal shape without the inclination.

The pitch P of the adjacent projections 6 may be any pitch equal to or shorter than the wavelength (780 nm) of visible light, but from the viewpoint of achieving sufficient anti-fouling properties, the pitch P is preferably in the range of 100 nm to 400 nm, more preferably in the range of 100 nm to 200 nm. The pitch of adjacent projections as used herein refers to the average distance between all adjacent projections except for the branched projections in a 1-μm square region in a plane photograph taken by a scanning electron microscope (product name: S-4700) from Hitachi High-Technologies Corp. The pitch of adjacent projections is measured in the state where osmium(VIII) oxide (thickness: 5 nm) from Wako Pure Chemical Industries, Ltd. has been applied to the uneven structure by an osmium coater (product name: Neoc-ST) from Meiwafosis Co., Ltd.

The height of the projections 6 is not particularly limited, but from the viewpoint of achieving a suitable aspect ratio of the projections 6 at the same time as described below, the height is preferably in the range of 50 nm to 600 nm, more preferably in the range of 100 nm to 300 nm. The height of projections as used herein refers to the average height of 10 consecutive adjacent projections except for branched projections in a cross-sectional photograph taken by a scanning electron microscope (product name: S-4700) from Hitachi High-Technologies Corp. Here, these 10 projections should exclude projections with defects or deformed parts (e.g., parts deformed in preparation of a sample). The sample used is obtained by sampling in a region of the optical film without specific defects. For example, in the case that the optical film is continuously produced in a roll shape, the sample used is sampled around the center of the roll shape. The height of the projections is measured in the state where osmium(VIII) oxide (thickness: 5 nm) from Wako Pure Chemical Industries, Ltd. has been applied to the uneven structure by an osmium coater (product name: Neoc-ST) from Meiwafosis Co., Ltd.

The aspect ratio of the projections 6 is not particularly limited, and is preferably in the range of 0.8 to 1.5. In the case that the aspect ratio of the projections 6 is 1.5 or less, the processability of the moth-eye structure is sufficiently improved, which reduces the concern about occurrence of sticking and poor transfer conditions (e.g. occurrence of clogging or winding in the mold 5) in formation of the moth-eye structure. In the case that the aspect ratio of the projections 6 is 0.8 or more, optical phenomena such as moire and rainbow unevenness can be sufficiently prevented, so that favorable reflection properties can be achieved. The aspect ratio of the projections as used herein refers to the ratio (height/pitch) of the pitch of adjacent projections and the height of the projections.

The arrangement of the projections 6 is not particularly limited, and may be a random arrangement or regular arrangement. From the viewpoint of sufficiently preventing occurrence of moire, a random arrangement is preferred.

The surface of the optical film 1 preferably has a contact angle with water of 1000 or greater and a contact angle with hexadecane of 400 or greater. In this case, an optical film having sufficiently high water repellency and oil repellency can be obtained. More preferably, the surface of the optical film 1 has a contact angle with water of 150° or greater and a contact angle with hexadecane of 90° or greater. In this case, an optical film having higher water repellency and higher oil repellency, that is, super water repellency and super oil repellency, can be obtained. The contact angle with water is an index showing the level of water repellency. The greater the contact angle with water is, the higher the water repellency becomes. The contact angle with hexadecane is an index showing the level of oil repellency. The greater the contact angle with hexadecane is, the higher the oil repellency becomes. The contact angle as used herein refers to the average contact angle at three sites each calculated by the θ/2 method (calculated from the equation $\theta/2=\arctan(h/r)$ wherein θ represents a contact angle, r represents a radius of a droplet, and h represents the height of the droplet) using a portable angle meter (product name: PCA-1) from Kyowa Interface Science Co., Ltd. Here, the first measurement site is selected to be the center portion of the sample, and the second and third measurement sites are selected to be two points that are away from the first measurement site by 20 mm or more and are symmetrical with the first measurement site.

Embodiment 2

Figure 2:
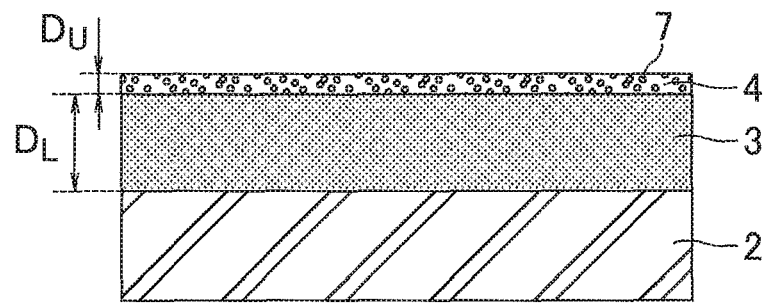
FIG. 2 illustrates schematic cross-sectional views for explaining the process of producing an optical film of Embodiment 2 (steps a to c).
Figure 2:
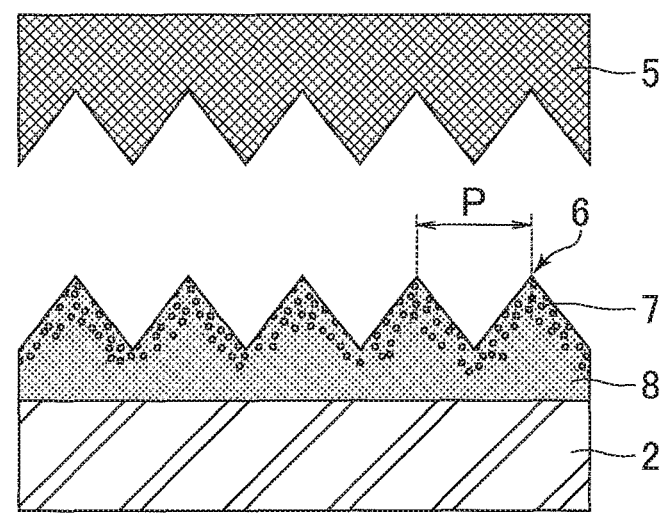
Figure 2:
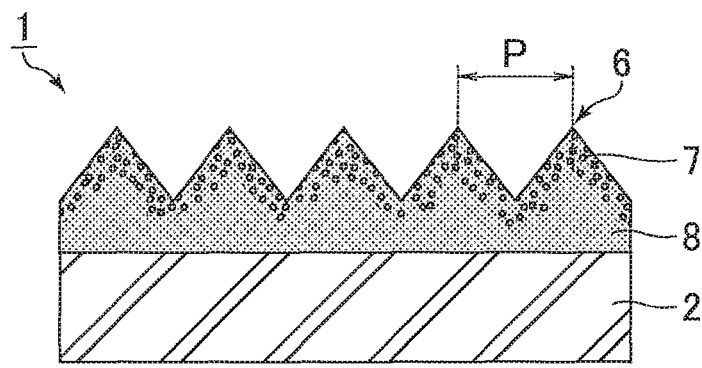

FIG. 2 illustrates schematic cross-sectional views for explaining the process of producing an optical film of Embodiment 2 (steps a to c). Embodiment 2 is the same as Embodiment 1 except that the lower layer resin and the upper layer resin are simultaneously applied. Hence, the same points are not described here.

(a) Application of Lower Layer Resin and Upper Layer Resin

First, as illustrated in the view (a) of FIG. 2, the lower layer resin 3 and the upper layer resin 4 are simultaneously applied to the base film 2 by the co-extrusion method. As a result, the upper layer resin 4 is formed on the lower layer resin 3 on the side opposite to the base film 2.

(b) Formation of Uneven Structure

As illustrated in the view (b) of FIG. 2, in the state where the applied lower layer resin 3 and upper layer resin 4 are stacked, the mold 5 is pressed against the lower layer resin 3 and the upper layer resin 4 from the upper layer resin 4 side, so that the resin layer 8 having an uneven structure on a surface thereof is formed.

(c) Curing of Resin Layer

The resin layer 8 having the uneven structure is cured. As a result, the optical film 1 including a cured product of the resin layer 8 having the uneven structure on the surface as illustrated in the view (c) of FIG. 2 is completed.

The method for producing an optical film according to Embodiment 2 enables production of an optical film excellent in anti-fouling properties and scratch resistance as well as anti-reflection properties as in the case of the method for producing an optical film according to Embodiment 1. Furthermore, since the lower layer resin 3 and the upper layer resin 4 are simultaneously applied, the number of steps can be reduced compared to Embodiment 1.

Embodiment 3

Figure 3:
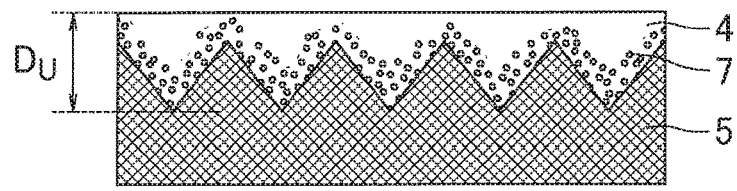
FIG. 3 illustrates schematic cross-sectional views for explaining the process of producing an optical film of Embodiment 3 (steps a to c).
Figure 3:
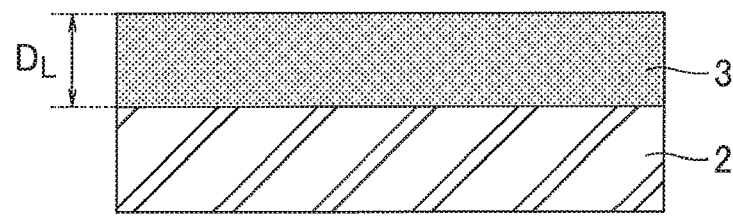
Figure 3:
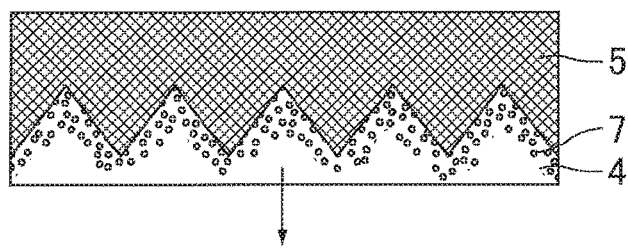
Figure 3:
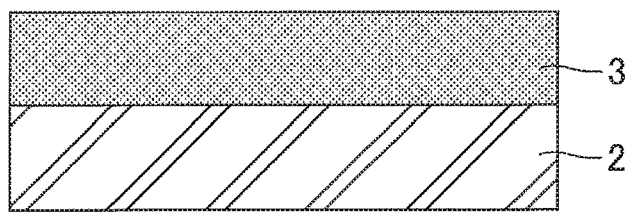
Figure 3:
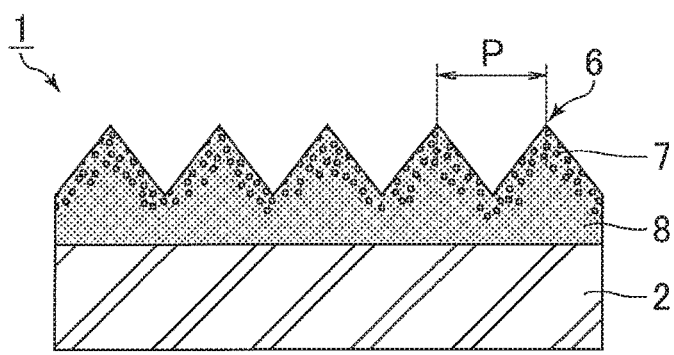

FIG. 3 illustrates schematic cross-sectional views for explaining the process of producing an optical film of Embodiment 3 (steps a to c). Embodiment 3 is the same as Embodiment 1 except that the method for applying the upper layer resin is changed. Hence, the same points are not described here.

(a) Application of Lower Layer Resin and Upper Layer Resin

First, as illustrated in the view (a) of FIG. 3, the lower layer resin 3 is applied to the base film 2. Meanwhile, the upper layer resin 4 is applied to an uneven surface of the mold 5. Here, as illustrated in the view (a) of FIG. 3, the thickness $D_U$ (after application) of the upper layer resin 4 in the present embodiment refers to the distance from a position of the upper layer resin 4 corresponding to the bottom point of a recess of the mold 5 to the surface of the upper layer resin 4 on the side opposite to the mold 5.

(b) Formation of Uneven Structure

As illustrated in the view (b) of FIG. 3, the mold 5 to which the upper layer resin 4 has been applied is pressed from the upper layer resin 4 side against the lower layer resin 3 applied to the base film 2, so that the upper layer resin 4 is stacked on the lower layer resin 3 and, simultaneously, an uneven structure is formed. As a result, the resin layer 8 having the uneven structure on the surface is formed.

(c) Curing of Resin Layer

The resin layer 8 having the uneven structure is cured. As a result, the optical film 1 including a cured product of the resin layer 8 having the uneven structure on the surface as illustrated in the view (c) of FIG. 3 is completed.

The method for producing an optical film according to Embodiment 3 enables production of an optical film excellent in anti-fouling properties and scratch resistance as well as anti-reflection properties as in the case of the method for producing an optical film according to Embodiment 1. Furthermore, since stacking of the upper layer resin 4 on the lower layer resin 3 and formation of the uneven structure are simultaneously performed, the number of steps can be reduced compared to Embodiment 1. Also, when the mold 5 has been subjected to a release treatment, the fluorine-containing monomer contained in the upper layer resin 4 can be suitably concentrated on the mold 5 side, i.e., in the vicinity of the surface of the upper layer resin 4, before the upper layer resin 4 is stacked on the lower layer resin 3. As a result, the concentration of the fluorine atoms 7 in the vicinity of the surface of the optical film 1 can be more suitably increased.

In a mode in which the upper layer resin 4 is applied to the uneven surface of the mold 5 as in the present embodiment, in the case that the upper layer resin 4 contains a fluorine-containing monomer (e.g. fluorine-based additive (product name: OPTOOL DAC-HP) from Daikin Industries, Ltd.) and a compatible monomer (e.g. amide group-containing monomer (product name: ACMO) from KJ Chemicals Corporation), the smoothness (leveling properties) of the upper layer resin 4 after application can be effectively improved and the occurrence of cissing on the mold 5 can be effectively prevented by adding a fluorine-based surfactant (e.g. fluorine-based surfactant (product name: SURFLON S-232) from AGC Seimi Chemical Co., Ltd.) or a fluorine-based solvent (e.g. fluorine-based solvent (product name: Diluent ZV) from FluoroTechnology Co., Ltd.), which have a low surface tension, to the upper layer resin 4. In this case, the ratio by weight of the fluorine-based surfactant or the fluorine-based solvent to the upper layer resin 4 is preferably in the range of 1% by weight to 200% by weight.

Hereinafter, the present invention will be described in more detail based on examples and comparative examples which, however, are not intended to limit the scope of the present invention.

Example 1

An optical film was produced by the method for producing the optical film of Embodiment 1. The production process was performed as described below.

(a) Application of Lower Layer Resin

First, the lower layer resin 3 was applied to the base film 2 by a bar coater (product name: No. 03) from Daiichi Rika Co., Ltd. The base film 2 and the lower layer resin 3 used were the following ones.

<Base Film 2>

A PET film (product name: COSMOSHINE (registered trademark) A4300) from Toyobo Co., Ltd. on which an easy adhesion treatment has been performed The solubility parameter of the base film 2 was 10.7 $(cal/cm^3)^{1/2}$. The thickness of the base film 2 was 75 μm.

<Lower Layer Resin 3>

A mixture of the following materials (the numerical values given to the respective materials are the concentrations of the respective materials in the lower layer resin 3.)

Urethane acrylate (product name: UA-7100) from Shin-Nakamura Chemical Co., Ltd.: 31% by weight Polyfunctional acrylate (product name: ATM-35E) from Shin-Nakamura Chemical Co., Ltd.: 40% by weight Polyfunctional acrylate (product name: A-TMM-3LM-N) from Shin-Nakamura Chemical Co., Ltd.: 27.5% by weight Photopolymerization initiator (product name: IRGACURE 819) from BASF A.G.: 1.5% by weight The solubility parameter of the lower layer resin 3 (excluding the photopolymerization initiator) was 10.5 $(cal/cm^3)^{1/2}$. The thickness $D_L$ (after application) of the lower layer resin 3 was 7 μm.

(b) Application of the Upper Layer Resin

The upper layer resin 4 was applied to the applied lower layer resin 3 by an ultrasonic spray (product name of the nozzle: Vortex) from Sono-Tek Corporation. The upper layer resin 4 used was the following one.

<Upper Layer Resin 4>

A mixture of the following materials (the numerical values given to the respective materials are the concentrations of the respective materials in the upper layer resin 4.)

Fluorine-containing monomer: fluorine-based additive (product name: OPTOOL DAC-HP) from Daikin Industries, Ltd.: 10% by weight Compatible monomer: amide group-containing monomer (product name: ACMO) from KJ Chemicals Corporation: 90% by weight The "OPTOOL DAC-HP" used as the fluorine-containing monomer had a solids concentration of 10% by weight. The solubility parameter of the fluorine-containing monomer was 9.7 $(cal/cm^3)^{1/2}$. The solubility parameter of the compatible monomer was 12.0 $(cal/cm^3)^{1/2}$. The thickness $D_U$ (after application) of the upper layer resin 4 was 1.3 μm.

(c) Formation of Uneven Structure

In the state where the applied lower layer resin 3 and upper layer resin 4 were stacked, the mold 5 was pressed against the lower layer resin 3 and the upper layer resin 4 from the upper layer resin 4 side, so that the resin layer 8 having an uneven structure on the surface was formed. The mold 5 used was one produced by the following method.

<Mold 5>

First, a film of aluminum was formed on a glass substrate by sputtering. Next, an anodized layer provided with multiple fine holes (recesses) (the distance between the bottom points of adjacent holes was equal to or shorter than the wavelength of visible light) was formed by repeating anodizing and etching alternately on the formed film of aluminum. Specifically, fine holes (recesses) each having a shape that becomes smaller toward the inside of the film of aluminum (tapered shape) were formed by sequentially performing anodizing, etching, anodizing, etching, anodizing, etching, anodizing, etching, and anodizing (anodizing: five times, etching: four times). Thereby, the mold 5 having an uneven structure was obtained. At this time, the uneven structure of the mold 5 can be changed by controlling the time for anodizing and the time for etching. In the present example, the time for one anodizing process was 316 seconds, and the time for one etching process was 825 seconds. Observation of the mold 5 with a scanning electron microscope found that the pitch of the projections was 200 nm and the height of the projections was 350 nm. The mold 5 was subjected to a release treatment in advance with a fluorine-based additive (product name: OPTOOL DSX) from Daikin Industries Ltd.

(d) Curing of Resin Layer

The resin layer 8 having the uneven structure was cured by being irradiated with ultraviolet rays (dose: 200 mJ/cm$^2$) from the base film 2 side by an UV lamp (product name: LIGHT HANMAR6J6P3) from Fusion UV Systems Inc. As a result, the optical film 1 including a cured product of the resin layer 8 having the uneven structure on the surface was completed. The surface specification of the optical film 1 is shown below.

Shape of the projections 6: Bell shape
Pitch P of the projections 6: 200 nm
Height of the projections 6: 200 to 250 nm Example 2

An optical film was produced by the same production method as in Example 1 except that the thickness $D_U$ (after application) of the upper layer resin 4 was 6.5 μm.

Example 3

An optical film was produced by the method for producing an optical film according to Embodiment 3. The production process was performed as described below.

(a) Application of Lower Layer Resin and Upper Layer Resin

First, the lower layer resin 3 was applied to the base film 2 by a bar coater (product name: No. 03) from Daiichi Rika Co., Ltd. Meanwhile, the upper layer resin 4 was applied to the uneven surface of the mold 5 by an ultrasonic spray (product name of the nozzle: Vortex) from Sono-Tek Corporation. The base film 2, the lower layer resin 3, the upper layer resin 4, and the mold 5 used were the same as those used in Example 1. The thickness $D_L$ (after application) of the lower layer resin 3 was 7 μm. The thickness $D_U$ (after application) of the upper layer resin 4 was 1.3 μm.

(b) Formation of Uneven Structure

The mold 5 to which the upper layer resin 4 was applied was pressed from the upper layer resin 4 side against the lower layer resin 3 applied to the base film 2, so that the upper layer resin 4 was stacked on the lower layer resin 3 and, simultaneously, the uneven structure was formed.

(c) Curing of Resin Layer

The resin layer 8 having the uneven structure was cured by being irradiated with ultraviolet rays (dose: 200 mJ/cm$^2$) from the base film 2 side by an UV lamp (product name: LIGHT HANMAR6J6P3) from Fusion UV systems Inc. As a result, the optical film 1 including a cured product of the resin layer 8 having the uneven structure on the surface was completed. The surface specification of the optical film 1 is shown below.

Shape of the projections 6: Bell shape
Pitch P of the projections 6: 200 nm
Height of the projections 6: 200 to 250 nm Example 4

An optical film was produced by the same production method as in Example 3 except that the thickness $D_U$ (after application) of the upper layer resin 4 was 2.5 μm.

Example 5

An optical film was produced by the same production method as in Example 3 except that the thickness $D_U$ (after application) of the upper layer resin 4 was 3.8 μm.

Example 6

An optical film was produced by the same production method as in Example 3 except that the thickness $D_U$ (after application) of the upper layer resin 4 was 25.0 μm.

Example 7

An optical film was produced by the same production method as in Example 3 except for changes in the material of the base film, the apparatus used for application of the upper layer resin, and the thickness of the upper layer resin.

The base film 2 used was a TAC film (product name: FUJITAC (registered trademark) TD80UL) from Fujifilm Corporation on which an easy adhesion treatment has been performed. The solubility parameter of the base film 2 was 11 $(cal/cm^3)^{1/2}$. The thickness of the base film 2 was 75 μm. The apparatus used to apply the upper layer resin 4 was a bar coater (product name: No. 02) from Daiichi Rika Co., Ltd. The thickness $D_U$ (after application) of the upper layer resin 4 was 2 µm.

Example 8

An optical film was produced by the same production method as in Example 7 except that the release treatment for the mold 5 was not performed in advance and the thickness $D_L$ (after application) of the lower layer resin 3 was 6 µm.

Comparative Example 1

Figure 4:
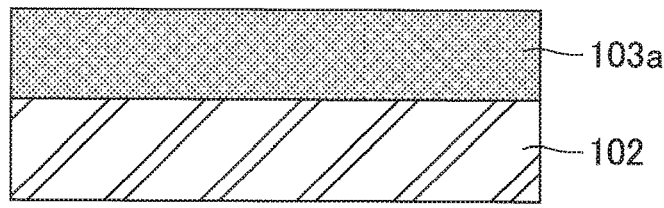
FIG. 4 illustrates schematic cross-sectional views for explaining the process of producing an optical film of Comparative Example 1 (steps a to d).
Figure 4:
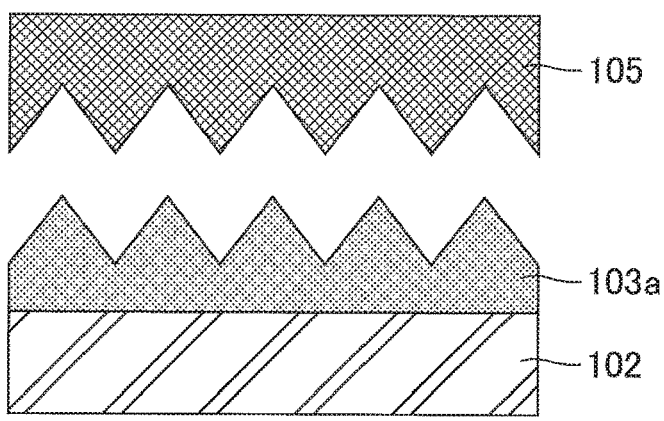
Figure 4:
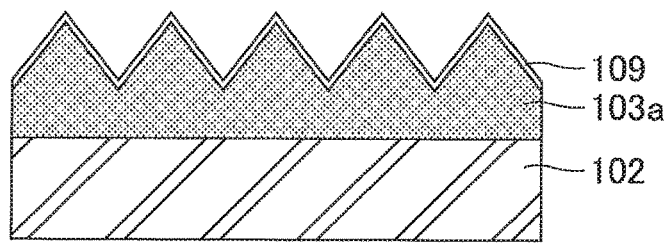
Figure 4:
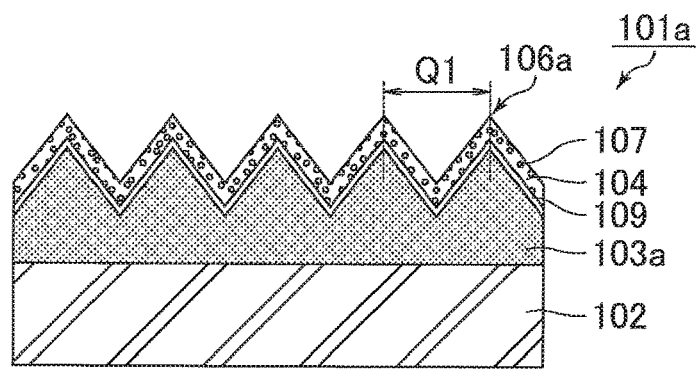

FIG. 4 illustrates schematic cross-sectional views for explaining the process of producing an optical film of Comparative Example 1 (steps a to d). The production process was performed as described below.

(a) Application of Lower Layer Resin

First, as illustrated in the view (a) of FIG. 4, a lower layer resin 103a was applied to a base film 102 by a bar coater (product name: No. 03) from Daiichi Rika Co., Ltd. The base film 102 and the lower layer resin 103a used were the following ones.

<Base Film 102>

A TAC film (product name: FUJITAC TD80UL) from Fujifilm Corporation on which an easy adhesion treatment has been performed The thickness of the base film 102 was 75 µm.

<Lower Layer Resin 103a>

A mixture of the following materials (the numerical values given to the respective materials are the concentrations of the respective materials in the lower layer resin 103a)

Urethane acrylate (product name: UA-7100) from Shin-Nakamura Chemical Co., Ltd.: 31% by weight
Polyfunctional acrylate (product name: ATM-35E) from Shin-Nakamura Chemical Co., Ltd.: 40% by weight
Polyfunctional acrylate (product name: A-TMM-3LM-N) from Shin-Nakamura Chemical Co., Ltd.: 27.5% by weight
Photopolymerization initiator (product name: IRGACURE 819) from BASF A.G.: 1.5% by weight The thickness (after application) of the lower layer resin 103a was 7 µm.

(b) Formation of Uneven Structure

As illustrated in the view (b) of FIG. 4, a mold 105 was pressed against the applied lower layer resin 103a, so that an uneven structure was formed. The mold 105 used was produced by the following method.

<Mold 105>

First, a film of aluminum was formed on a glass substrate by sputtering. Next, an anodized layer provided with multiple fine holes (recesses) (the distance between the bottom points of adjacent holes was equal to or shorter than the wavelength of visible light) was formed by repeating anodizing and etching alternately on the formed film of aluminum. Specifically, fine holes (recesses) each having a shape that becomes smaller toward the inside of the film of aluminum (tapered shape) were formed by sequentially performing anodizing, etching, anodizing, etching, anodizing, etching, anodizing, etching, and anodizing (anodizing: five times, etching: four times). Thereby, the mold 105 having an uneven structure was obtained. In the present comparative example, the time for one anodizing process was 316 seconds, and the time for one etching process was 825 seconds. Observation of the mold 105 with a scanning electron microscope found that the pitch of the projections was 200 nm and the height of the projections was 350 nm. The mold 105 was subjected to a release treatment in advance by a fluorine-based additive (product name: OPTOOL DSX) from Daikin Industries Ltd.

(c) Curing of Lower Layer Resin

The lower layer resin 103a having the uneven structure was cured by being irradiated with ultraviolet rays (dose: 200 mJ/cm$^2$) from the base film 102 side by an UV lamp (product name: LIGHT HANMAR6J6P3) from Fusion UV Systems Inc. The surface of the cured lower layer resin 103a was subjected to an oxygen (O$_2$) plasma treatment, and a film of silicon dioxide (SiO$_2$) was formed on the lower layer resin 103a by radio frequency (RF) sputtering, whereby a silicon dioxide layer 109 was formed. The thickness of the silicon dioxide layer 109 was 10 nm.

(d) Application of Upper Layer Resin

As illustrated in the view (d) of FIG. 4, an upper layer resin 104 was vapor-deposited on the silicon dioxide layer 109 by the induction heating method (degree of vacuum: $1 \times 10^{-4}$ to $1 \times 10^{-3}$ Pa). As a result, an optical film 101a was completed. The upper layer resin 104 used was a fluorine-based additive (product name: OPTOOL DSX) containing fluorine atoms 107 from Daikin Industries, Ltd. The thickness of the upper layer resin 104 was 10 nm or less. The surface specification of the optical film 101a is shown below.

Shape of projections 106a: Bell shape
Pitch Q1 of the projections 106a: 200 nm
Height of the projections 106a: 200 to 250 nm Comparative Example 2

An optical film was produced by the same production method as in Comparative Example 1 except that a film of silicon dioxide was not formed in order to eliminate the damage on the lower layer resin 103a in formation of a film of silicon dioxide.

Comparative Example 3

Figure 5:
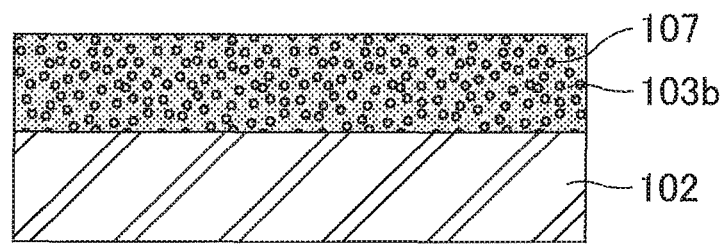
FIG. 5 illustrates schematic cross-sectional views for explaining the process of producing an optical film of Comparative Example 3 (steps a to c).
Figure 5:
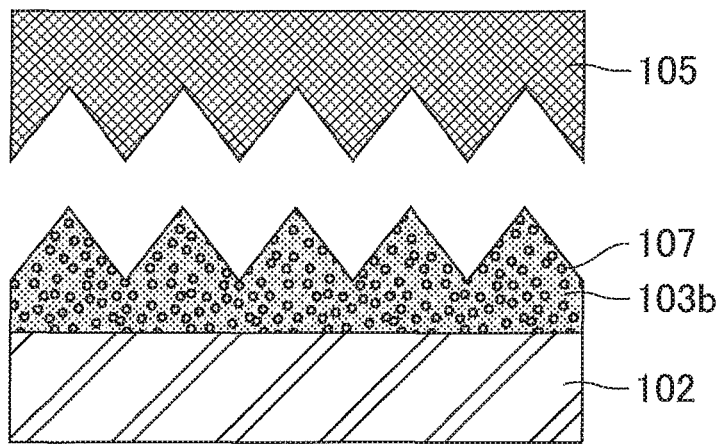
Figure 5:
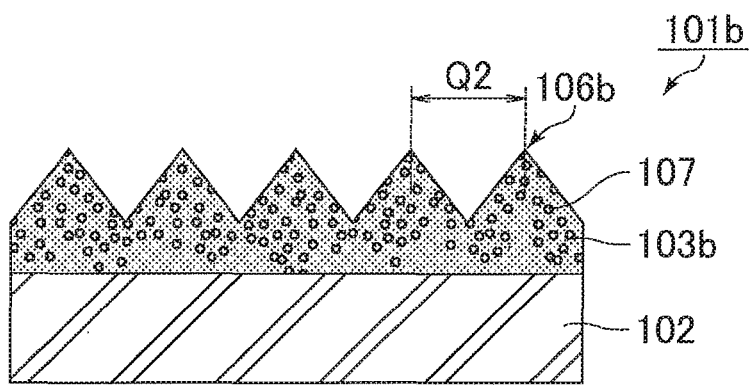

FIG. 5 illustrates schematic cross-sectional views for explaining the process of producing an optical film of Comparative Example 3 (steps a to c). The production process was performed as described below.

(a) Application of Lower Layer Resin

First, as illustrated in the view (a) of FIG. 5, a lower layer resin 103b to which a fluorine-containing monomer containing fluorine atoms 107 was added was applied to the base film 102 by a bar coater (product name: No. 03) from Daiichi Rika Co., Ltd. The base film 102 and the lower layer resin 103b used were the following ones.

<Base Film 102>

A TAC film (product name: FUJITAC TD80UL) from Fujifilm Corporation on which an easy adhesion treatment has been performed The thickness of the base film 102 was 75 µm.

<Lower Layer Resin 103b>

A mixture of the following materials (the numerical values given to the respective materials are the concentrations of the respective materials in the lower layer resin 103b)

Urethane acrylate (product name: UA-7100) from Shin-Nakamura Chemical Co., Ltd.: 24.5% by weight
Polyfunctional acrylate (product name: ATM-35E) from Shin-Nakamura Chemical Co., Ltd.: 32.0% by weight Polyfunctional acrylate (product name: A-TMM-3LM-N) from Shin-Nakamura Chemical Co., Ltd.: 22.0% by weight Photopolymerization initiator (product name: IRGACURE 819) from BASF A.G.: 1.5% by weight Fluorine-containing monomer: fluorine-based additive (product name: OPTOOL DAC-HP) from Daikin Industries, Ltd.: 20% by weight The thickness (after application) of the lower layer resin 103b was 7 μm.

(b) Formation of Uneven Structure

As illustrated in the view (b) of FIG. 5, the mold 105 was pressed against the applied lower layer resin 103b, so that an uneven structure was formed. The mold 105 used was the same as that in Comparative Example 1.

(c) Curing of Lower Layer Resin

As illustrated in the view (c) of FIG. 5, the lower layer resin 103b having the uneven structure was cured by being irradiated with ultraviolet rays (dose: 200 mJ/cm$^2$) from the base film 102 side by an UV lamp (product name: LIGHT HANMAR6J6P3) from Fusion UV Systems Inc. As a result, an optical film 101b was completed. The surface specification of the optical film 101b is shown below.

Shape of projections 106b: Bell shape
Pitch Q2 of the projections 106b: 200 nm
Height of the projections 106b: 200 to 250 nm

[Evaluation of Optical Film]

Evaluation results of the anti-reflection properties, anti-fouling properties (water repellency, oil repellency, and wiping properties), scratch resistance, transparency, and slidability of the optical films of Examples 1 to 8 and Comparative Examples 1 to 3 are shown in Table 1.

Figure 6:
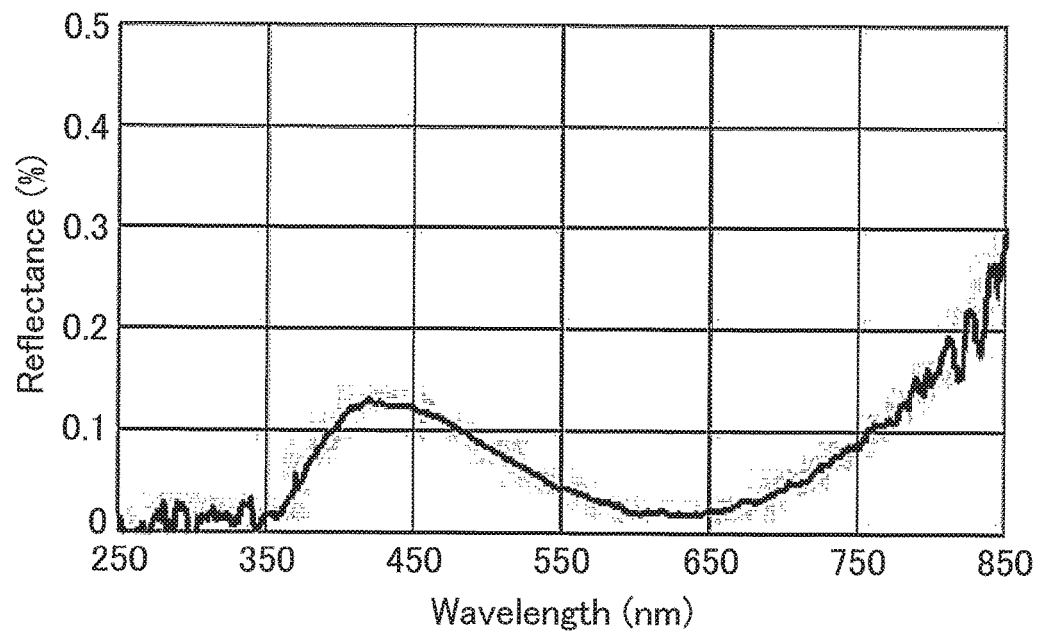
FIG. 6 is a graph showing the measurement results of the reflectance in Example 7.

The anti-reflection properties were evaluated based on the luminous reflectance (Y value) of the sample of each example. Specifically, the surface of the sample of each example was irradiated with a light source at a polar angle of 5°, and the regular reflectance of the sample of each example at each wavelength of the incident light was measured. The reflectance (Y value) at a wavelength of 550 nm was used as the evaluation index of anti-reflection properties. The reflectance was measured by a spectrophotometer (product name: V-560) from Jasco Corp. for a wavelength range of 250 to 850 nm. The measurement of the reflectance was performed in the state where a black acrylic plate (product name: ACRYLITE (registered trademark) EX-502) from Mitsubishi Rayon Co., Ltd. was attached to the back surface (surface with no uneven structure) of the sample of each example. The light source used was illuminant C. One example of the measurement results of the reflectance is shown in FIG. 6. FIG. 6 is a graph showing the measurement results of the reflectance in Example 7. In Example 7, the Y value at a wavelength of 550 nm was 0.05%, a* was −0.03, and b* was −1.06. In the examples (Examples 1 to 6) in which a PET film on which an easy adhesion treatment was performed was used as the base film 2, samples were determined to be at an acceptable level (having excellent anti-reflection properties) if the Y value at a wavelength of 550 nm was 0.3% or less. In the examples (Examples 7 and 8, Comparative Examples 1 to 3) in which a TAC film on which an easy adhesion treatment was performed was used as the base film 2 (102), samples were determined to be at an acceptable level (having excellent anti-reflection properties) if the Y value at a wavelength of 550 nm was 0.2% or less.

The anti-fouling properties were evaluated based on the water repellency, oil repellency, and wiping properties of the sample of each example.

The water repellency was evaluated based on the contact angle with water of the surface of the sample of each example. The method for measuring the contact angle was as described above. Samples were determined to be at an acceptable level (having excellent water repellency) if the samples had a contact angle with water of 100° or greater.

The oil repellency was evaluated based on the contact angle with hexadecane of the surface of the sample of each example. The method for measuring the contact angle was as described above. Samples were determined to be at an acceptable level (having excellent oil repellency) if the samples had a contact angle with hexadecane of 20° or greater.

The wiping properties were evaluated based on whether the dirt adhering to the surface of the sample of each example was wiped off or not. Specifically, Nivea cream (registered trademark) from Nivea-Kao Co, Ltd. was applied to the surface of the sample of each example, and was left to stand at a temperature of 25° C. and a humidity of 40 to 60% for three days. Then, the sample of each example was wiped with a nonwoven fabric (product name: savina (registered trademark)) from KB Seiren, Ltd. in a certain one direction for 50 times, and whether the dirt was wiped off or not was observed under an illuminance of 100 1×. The evaluation indexes used were as follows: excellent: the dirt was wiped off perfectly, good: the dirt was wiped off but not perfectly, poor: most of the dirt was not wiped off, and bad: the dirt was not wiped off at all. Samples were determined to be at an acceptable level (having excellent wiping properties) if the samples showed an excellent or good evaluation result.

By the evaluation methods described above, samples were evaluated as having excellent anti-fouling properties if the water repellency, oil repellency, and wiping properties were determined to be at acceptable levels.

The scratch resistance was evaluated based on the steel wool (SW) resistance of the sample of each example. Specifically, the surface of the sample of each example was rubbed with steel wool (product name: #0000) from Nippon Steel Wool Co., Ltd. in the state where a predetermined load was applied to the steel wool. The load level at which the surface was scratched was taken as the evaluation index of scratch resistance. The surface was rubbed with steel wool using a surface property tester (product name: 14FW) from Shinto Scientific Co., Ltd. as the test machine, with a stroke width of 30 mm, a rate of 100 mm/s, and the number of times of rubbing of 10 times in a reciprocating manner. The existence of a scratch was visually observed under an illuminance of 100 1× (fluorescent lamps). Here, samples were determined to be at an acceptable level (having excellent scratch resistance) if the steel wool resistance was 100 g or more.

The transparency was evaluated based on the haze (diffusivity) of the sample of each example. Specifically, the diffuse transmittance and the total light transmittance of the sample of each example were measured, and the haze calculated from the equation of haze (%)=100×(diffuse transmittance)/(total light transmittance) was taken as the evaluation index of the transparency. The diffuse transmittance and total light transmittance were measured by a haze meter (product name: NDH2000) from Nippon Denshoku Industries Co., Ltd. Samples were determined to be at an acceptable level (having excellent transparency) if the haze was 1.0% or lower.

The slidability was evaluated by touch with a cotton stick. The evaluation indexes used were excellent: very easily slidable, good: easily slidable, fair: slidable, and poor: not slidable. Here, samples were determined to be at an acceptable level (having excellent slidability) if the samples showed excellent, good, or fair evaluation result.

anti-fouling properties are described based on study examples on optical films produced by the method for producing an optical film according to Embodiment 3.

TABLE 1

|  | Anti-reflection properties Y value (%) | Anti-fouling properties | | Wiping properties | Scratch resistance SW resistance (g) | Transparency Haze (%) | Slidability |
|---|---|---|---|---|---|---|---|
|  |  | Water repellency Contact angle with water (°) | Oil repellency Contact angle with hexadecane (°) |  |  |  |  |
| Example 1 | 0.11 | 100 | 23 | Good | 100 | 0.7 | Fair |
| Example 2 | 0.11 | >150 | 90 | Excellent | 300 | 0.8 | Excellent |
| Example 3 | 0.11 | >150 | 75 | Excellent | 250 | 0.8 | Excellent |
| Example 4 | 0.10 | >150 | 94 | Excellent | 300 | 0.7 | Excellent |
| Example 5 | 0.10 | >150 | 96 | Excellent | 300 | 0.7 | Excellent |
| Example 6 | 0.11 | >150 | 120 | Excellent | 300 | 1.2 | Excellent |
| Example 7 | 0.05 | >150 | 100 | Excellent | 300 | 0.2 | Excellent |
| Example 8 | 0.05 | 110 | 70 | Good | 100 | 0.2 | Fair |
| Comparative Example 1 | 0.05 | >150 | 98 | Bad | 50 | 0.2 | Good |
| Comparative Example 2 | 0.05 | >150 | 94 | Poor | 100 | 0.2 | Good |
| Comparative Example 3 | 0.05 | 106 | 65 | Good | 100 | (Clouded) | Fair |

As shown in Table 1, Examples 1 to 8 were all excellent in anti-fouling properties and scratch resistance as well as anti-reflection properties. Specially, Examples 2 to 8 were better in anti-fouling properties and scratch resistance, and in particular, Examples 6 and 7 were excellent in anti-fouling properties and scratch resistance. That is, from the viewpoint of achieving especially good anti-fouling properties and scratch resistance, the method for producing an optical film according to Embodiment 3 was found to be suitable. Also, in comparison between Example 1 and Example 3 in which the thicknesses of the upper layer resins 4 were the same (1.3 μm), Example 3 was better in anti-fouling properties and scratch resistance. This result shows that, in the case that the thicknesses of the upper layer resins 4 are the same, use of the method for producing an optical film according to Embodiment 3 enables achievement of better anti-fouling properties and scratch resistance. Accordingly, the method for producing an optical film according to Embodiment 3 can effectively achieve excellent anti-fouling properties and excellent scratch resistance even when the upper layer resin 4 is thinly applied. Also, Examples 1 to 5, 7, and 8 were also excellent in transparency and slidability.

In contrast, as shown in Table 1, since the upper layer resin 104 was applied to the cured lower layer resin 103a in Comparative Examples 1 and 2, the adhesion between the lower layer resin 103a and the upper layer resin 104 was low, the scratch resistance was inferior (Comparative Example 1), and the wiping properties were inferior (Comparative Examples 1 and 2). The concentration of the fluorine-containing monomer in Comparative Example 3 was made higher than that in each of the other examples in order to improve the anti-fouling properties, but cloudiness was caused by the large amount of the fluorine-containing monomer.

[Study on Improvement of Anti-Fouling Properties]

As described above, the method for producing an optical film according to Embodiment 3 was found to be able to achieve even better anti-fouling properties. In the following, preferred characteristics of optical films having excellent Study Example 1

An optical film was produced by the method for producing an optical film according to Embodiment 3. The production process was performed as described below.

(a) Application of Lower Layer Resin and Upper Layer Resin

First, the lower layer resin 3 was applied to the base film 2 by a bar coater (product name: No. 06) from Daiichi Rika Co., Ltd. The upper layer resin 4 was applied to the uneven surface of the mold 5 by an electrostatic spray (product name: PDS-D series) from Hamamatsu Nano Technology Inc. The application voltage to the electrostatic nozzle was 2.5 kV. The base film 2, the lower layer resin 3, and the upper layer resin 4 used were the following ones. The mold 5 used was the same as that used in Example 1.

<Base Film 2>

A PET film (product name: COSMOSHINE A4300) from Toyobo Co., Ltd. on which an easy adhesion treatment has been performed The thickness of the base film 2 was 60 μm.

<Lower Layer Resin 3>

A mixture of the following materials (the numerical values given to the respective materials are the concentrations of the respective materials in the lower layer resin 3.)

Urethane acrylate (product name: UA-7100) from Shin-Nakamura Chemical Co., Ltd.: 31% by weight Polyfunctional acrylate (product name: ATM-35E) from Shin-Nakamura Chemical Co., Ltd.: 40% by weight Polyfunctional acrylate (product name: A-TMM-3LM-N) from Shin-Nakamura Chemical Co., Ltd.: 27.5% by weight Photopolymerization initiator (product name: IRGACURE 819) from BASF A.G.: 1.5% by weight The thickness $D_L$ (after application) of the lower layer resin 3 was 14 μm.

<Upper Layer Resin 4>

A mixture of the following materials (the numerical values given to the respective materials are the concentrations of the respective materials in the upper layer resin 4.)

Fluorine-containing monomer A: 10% by weight
Fluorine-containing monomer B: 40% by weight
Compatible monomer: amide group-containing monomer (product name: ACMO) from KJ Chemicals Corporation: 50% by weight The fluorine-containing monomer A was a mixture of 4-acryloyl morpholine (concentration: in the range of 75% to 85%) and perfluoro polyether (PFPE) (concentration: in the range of 15% to 25%) (the numerical values in the respective parentheses indicate the concentrations of the respective components in the fluorine-containing monomer A), and had a solids concentration of 20% by weight. The solids concentration of the fluorine-containing monomer A in the upper layer resin 4 was 2.2% by weight. The fluorine-containing monomer B was a fluorine-based surfactant described in Patent Literature 4. The application amount of the upper layer resin 4 to the mold 5 was 2.1 µl, and the application area was 80 mm×70 mm. That is, the thickness (equivalent) of the upper layer resin 4 was 0.375 µm.

(b) Formation of Uneven Structure

The mold 5 to which the upper layer resin 4 was applied was pressed from the upper layer resin 4 side against the lower layer resin 3 applied to the base film 2, so that the upper layer resin 4 was stacked on the lower layer resin 3 and, simultaneously, the uneven structure was formed.

(c) Curing of Resin Layer

The resin layer 8 having the uneven structure was cured by being irradiated with ultraviolet rays from the base film 2 side for three minutes using a video light (product name: VL-G151) from LPL Co., Ltd. (integrated amount of light: 54 mJ/cm$^2$). As a result, the optical film 1 including a cured product of the resin layer 8 having the uneven structure on the surface (hereinafter, such a cured product is also referred to as a cured resin layer) was completed. Observation with an optical microscope found that the thickness of the cured resin layer was 11.5 µm. The surface specification of the optical film 1 is shown below.

Shape of the projections 6: Bell shape
Pitch P of the projections 6: 200 nm
Height of the projections 6: 250 to 300 nm Study Example 2

An optical film was produced by the same production method as in Study Example 1 except that the application amount of the upper layer resin to the mold was changed.

The application amount of the upper layer resin 4 to the mold 5 was 6.5 µl, and the application area was 80 mm×70 mm. That is, the thickness (equivalent) of the upper layer resin 4 was 1.16 m.

Study Example 3

An optical film was produced by the same production method as in Study Example 1 except that the application amount of the upper layer resin to the mold was changed.

The application amount of the upper layer resin 4 to the mold 5 was 13.3 µl, and the application area was 80 mm×70 mm. That is, the thickness (equivalent) of the upper layer resin 4 was 2.38 µm.

Study Example 4

An optical film was produced by the same production method as in Study Example 1 except that the application amount of the upper layer resin to the mold was changed.

The application amount of the upper layer resin 4 to the mold 5 was 30.5 µl, and the application area was 80 mm×70 mm. That is, the thickness (equivalent) of the upper layer resin 4 was 5.45 µm.

Evaluation 1

The anti-fouling properties (water repellency, oil repellency, and fingerprint wiping properties) of the optical films of Study Examples 1 to 4 were evaluated. The evaluation results are shown in Table 2.

The water repellency was evaluated based on the contact angle with water of the surface of the sample of each study example. The oil repellency was evaluated based on the contact angle with hexadecane of the surface of the sample of each study example. The methods for measuring the contact angles were as described above.

The fingerprint wiping properties were evaluated based on the ease of wiping off the fingerprint on the surface of the sample of each study example. Specifically, a fingerprint was put on the surface of the sample of each study example, and the sample was left to stand at a temperature of 25° C. and a humidity of 40 to 60% for three days. Then, the sample of each study example was wiped with a nonwoven fabric (product name: savina) from KB Seiren, Ltd. in a certain one direction for 50 times, and the sample was observed under an illuminance of 100 1×. The ease of wiping off a fingerprint was evaluated in the increasing order from A, B, C, and D (with D being the easiest to wipe off).

TABLE 2

| | Anti-fouling properties | | |
|---|---|---|---|
| | Water repellency Contact angle with water (°) | Oil repellency Contact angle with hexadecane (°) | Fingerprint wiping properties |
| Study Example 1 | 43 | 10.7 | A |
| Study Example 2 | 143 | 10.2 | B |
| Study Example 3 | 159 | 34.1 | C |
| Study Example 4 | 162 | 94.7 | D |

As shown in Table 2, the highest anti-fouling properties were observed in Study Example 4, followed by Study Example 3, Study Example 2, and Study Example 1 in the given order. That is, the larger the application amount of the upper layer resin 4 to the mold 5 (the thicker the upper layer resin 4) is, the better the anti-fouling properties become. In comparison between Study Example 1 and Study Example 2, the oil repellencies were substantially the same as each other, but the fingerprint wiping properties of Study Example 2 were higher than those in Study Example 1. This is presumably because, since fingerprints contain not only oil but also moisture, the fingerprint wiping properties depend also on the water repellency (Study Example 2 showed better water repellency than Study Example 1).

Evaluation 2

Measurements by X-ray photoelectron spectroscopy (XPS) were performed on the surfaces of the optical films of Study Examples 1 to 4, i.e., the surfaces of the uneven structures. The X-ray photoelectron spectroscopy can analyze the atomic composition and chemical bonding state (binding species) of constituent atoms of a sample by irradiating the surface of the sample with X-rays and measuring the kinetic energy of the photoelectrons ejected from the surface. The measurement device used was an X-ray photoelectron spectroscopy instrument (product name: PHI 5000 VersaProbe II) from Ulvac-Phi, Inc., and the specification of the instrument is as described below.

Figure 7:
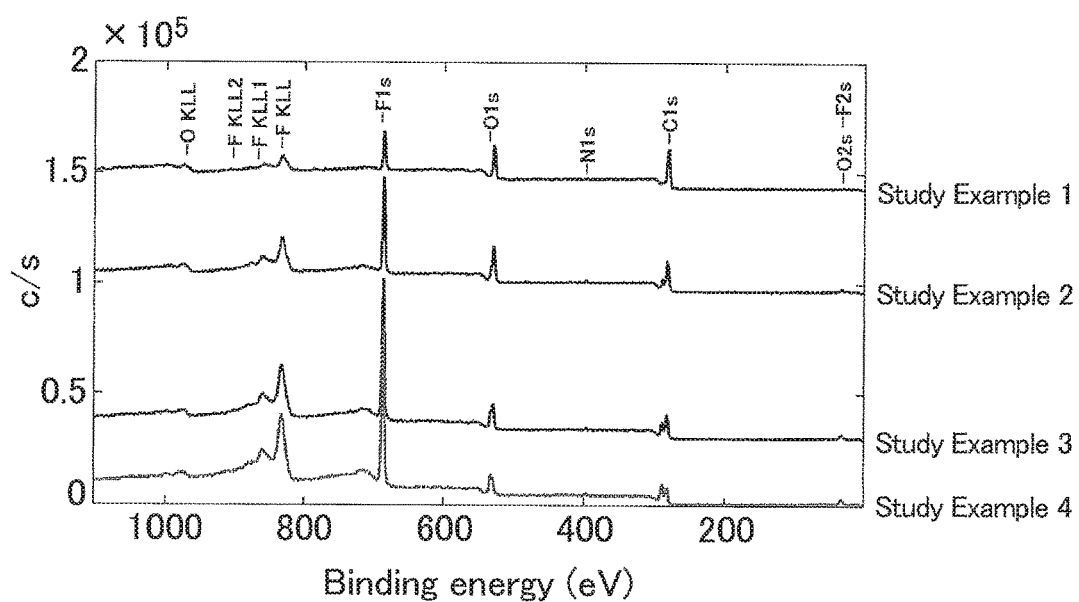
FIG. 7 is a graph showing survey spectra of the surfaces of optical films of Study Examples 1 to 4.

<Device Specification>
X-ray source: monochromatized AlKα radiation (1486.6 eV)
Spectroscope: electrostatic concentric hemispherical analyzer
Amplifier: multi-channel type FIG. 7 is a graph showing survey spectra of the surfaces of optical films of Study Examples 1 to 4. The "c/s" on the vertical axis in FIG. 7 is the abbreviation for "counts/seconds". This also applies to the other drawings. The measurement conditions of the survey spectrum were as described below.

<Measurement Conditions>
X-ray beam diameter: 100 μm (25 W, 15 kV)
Analysis area: 1000 μm×500 μm
Photoelectron extraction angle: 45°
Path energy: 187.85 eV As illustrated in FIG. 7, the optical film of each of Study Examples 1 to 4 showed the C1s peak, N1s peak, O1s peak, and F1s peak. That is, the cured resin layers of the optical films of Study Examples 1 to 4 were found to contain carbon atoms, nitrogen atoms, oxygen atoms, and fluorine atoms as the constituent atoms.

Next, from the results shown in FIG. 7, the proportion of the number of atoms of each kind relative to the total number of carbon atoms, nitrogen atoms, oxygen atoms, and fluorine atoms on the surface having the uneven structure was calculated. The calculation results are shown in Table 3. The surface having the uneven structure as used herein refers to a region that is within 6 nm from the outermost surface having the uneven structure in the depth direction.

TABLE 3

|  | C1s (atom %) | N1s (atom %) | O1s (atom %) | F1s (atom %) |
|---|---|---|---|---|
| Study Example 1 | 58.54 | 1.77 | 23.05 | 16.64 |
| Study Example 2 | 45.35 | 1.78 | 19.24 | 33.63 |
| Study Example 3 | 39.15 | 2.23 | 14.78 | 43.84 |
| Study Example 4 | 36.15 | 1.28 | 14.57 | 48.02 |

As shown in Table 3, the proportion of the number of fluorine atoms relative to the total number of carbon atoms, nitrogen atoms, oxygen atoms, and fluorine atoms on the surface having the uneven structure (hereinafter, such a proportion is also referred to as a fluorine content) was found to be the highest in Study Example 4, followed by Study Example 3, Study Example 2, and Study Example 1 in the given order, and to have a strong correlation with the anti-fouling properties shown in Table 2. That is, as the application amount of the upper layer resin 4 to the mold 5 increases (as the thickness of the upper layer resin 4 increases), the fluorine content on the surface having the uneven structure increases, and thus the anti-fouling properties are improved. The fluorine content on the surface having the uneven structure is preferably 16 atom % or higher, more preferably 33 atom % or higher, still more preferably 43 atom % or higher, particularly preferably 48 atom % or higher. The upper limit for the fluorine content on the surface having the uneven structure is preferably 55 atom %, more preferably 50 atom %. If the fluorine content on the surface having the uneven structure is higher than 55 atom %, the cured rein layer may be clouded.

Here, the results obtained by converting the unit of each numerical value "atom %" shown in Table 3 to "mass %" are shown in Table 4.

TABLE 4

|  | C1s (mass %) | N1s (mass %) | O1s (mass %) | F1s (mass %) |
|---|---|---|---|---|
| Study Example 1 | 49.77 | 1.75 | 26.10 | 22.38 |
| Study Example 2 | 35.92 | 1.64 | 20.30 | 42.14 |
| Study Example 3 | 29.94 | 1.99 | 15.05 | 53.02 |
| Study Example 4 | 27.18 | 1.11 | 14.59 | 57.12 |

Table 3 of Non Patent Literature 3 shows the state where the concentration of fluorine atoms on the surface was increased. However, as shown in Table 4, the optical films of Study Examples 2 to 4 can achieve a state where the concentration of fluorine atoms on the surface is higher than that in the state shown in Non Patent Literature 3.

Figure 8:
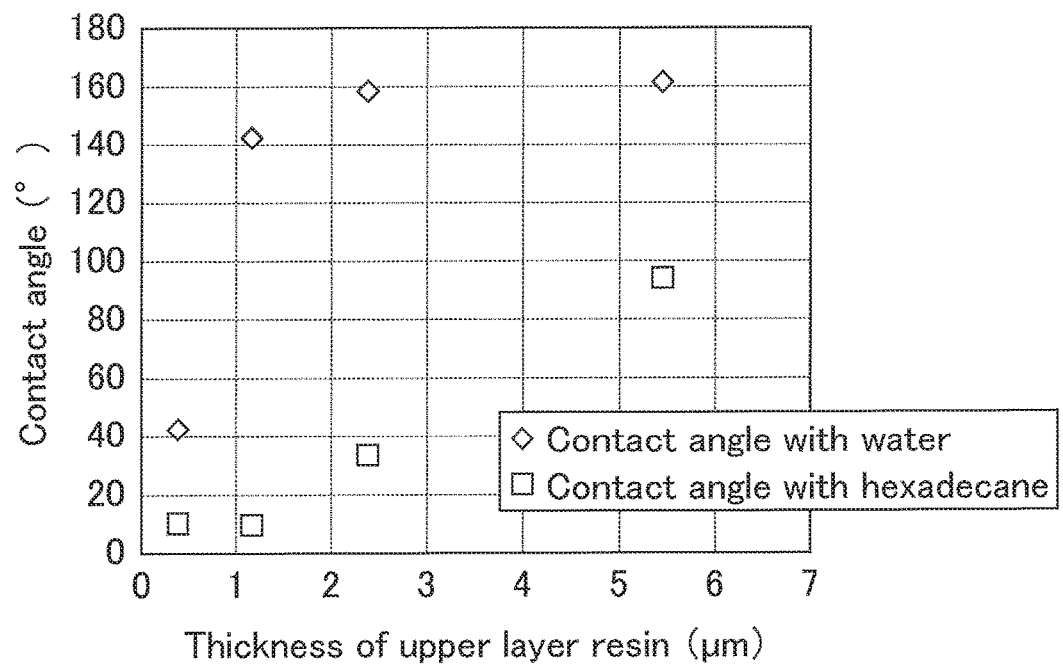
FIG. 8 is a graph showing the relation between the thickness of an upper layer resin and the contact angle.
Figure 9:
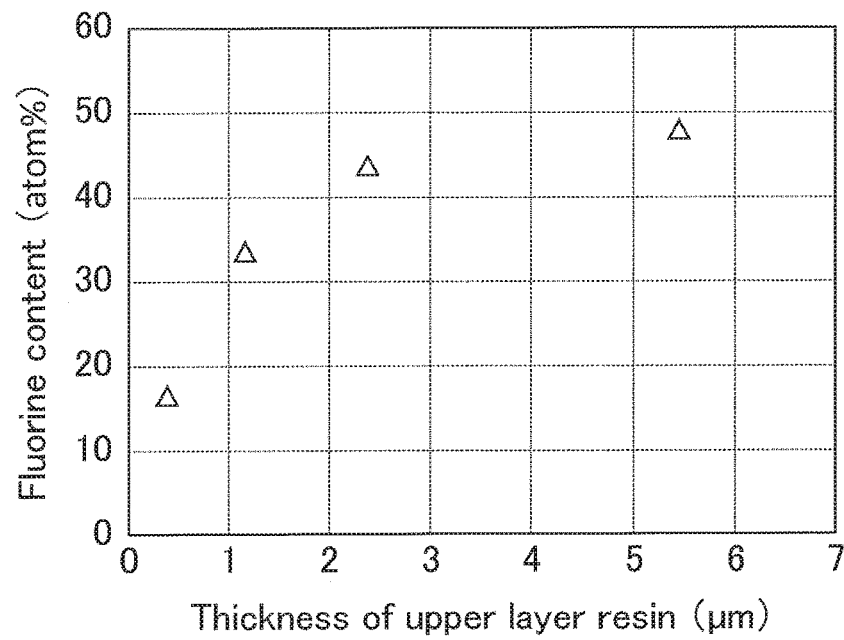
FIG. 9 is a graph showing the relation between the thickness of an upper layer resin and the proportion of the number of fluorine atoms relative to the total number of carbon atoms, nitrogen atoms, oxygen atoms, and fluorine atoms on the surface having an uneven structure.

The results obtained in Evaluation 1 and Evaluation 2 can be summarized in terms of the application amount of the upper layer resin 4 to the mold 5, that is, the thickness of the upper layer resin 4, as shown in FIGS. 8 and 9. FIG. 8 is a graph showing the relation between the thickness of an upper layer resin and the contact angle. FIG. 9 is a graph showing the relation between the thickness of an upper layer resin and the proportion of the number of fluorine atoms relative to the total number of carbon atoms, nitrogen atoms, oxygen atoms, and fluorine atoms on the surface having an uneven structure.

Comparison between FIG. 8 and FIG. 9 shows that the tendency of the contact angle with water relative to the thickness of the upper layer resin 4 and the tendency of the fluorine content on the surface having the uneven structure relative to the thickness of the upper layer resin 4 are similar to each other. That is, as the fluorine content on the surface having the uneven structure increases, the contact angle with water increases, and thus the water repellency is improved. Meanwhile, the tendency of the contact angle with hexadecane relative to the thickness of the upper layer resin 4 is considered to be related not only to the fluorine content on the surface having the uneven structure relative to the thickness of the upper layer resin 4 but also to the other factors.

Evaluation 3

The narrow spectra of the surfaces of the optical films of Study Examples 1 to 4 were measured by the X-ray photoelectron spectroscopy, and the correlation between the tendency of the contact angle with hexadecane relative to the thickness of the upper layer resin 4 and the binding species including fluorine atoms was studied.

Figure 10:
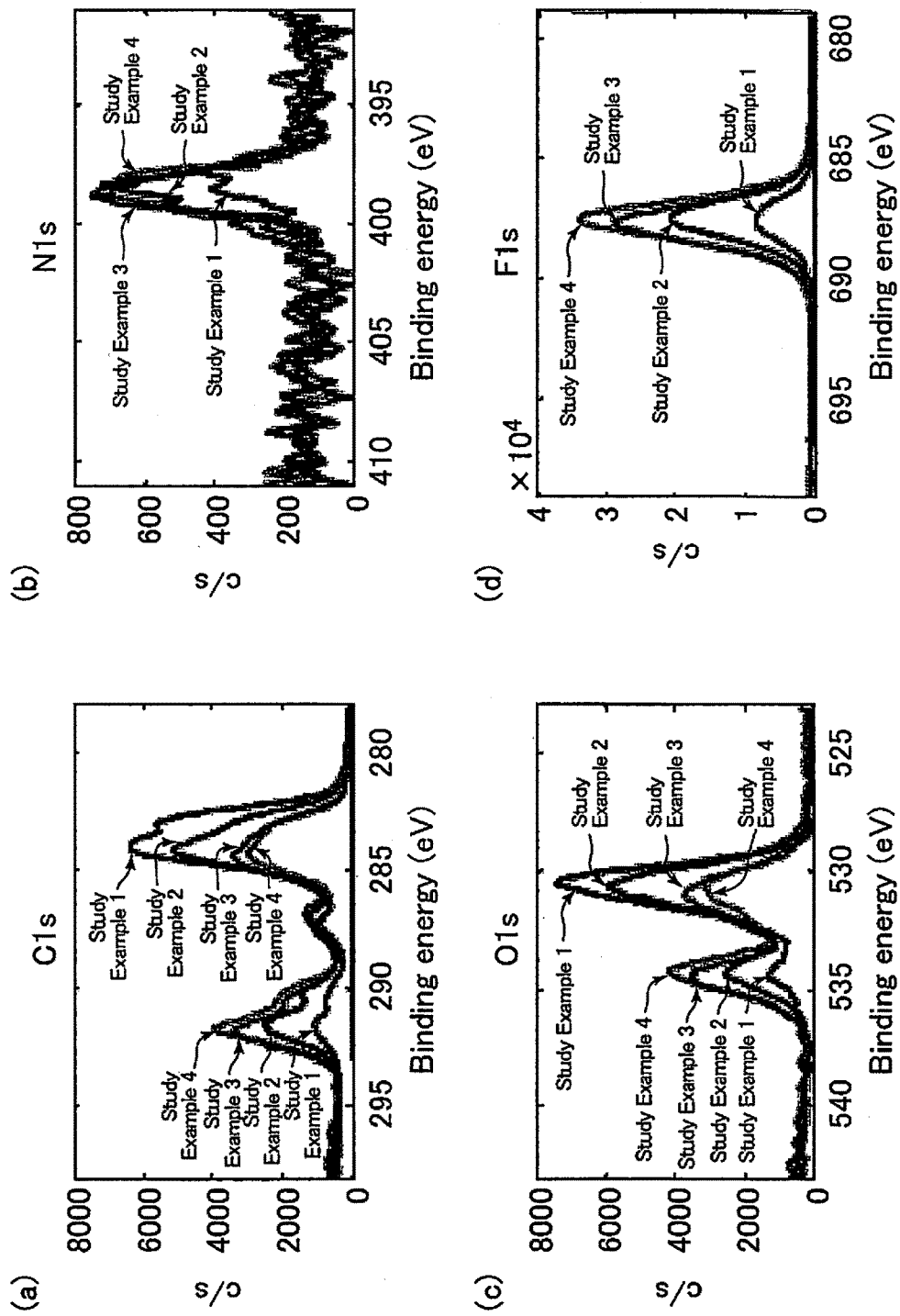
FIG. 10 includes graphs showing narrow spectra of the surfaces of the optical films of Study Examples 1 to 4, for (a) C1s peaks, (b) N1s peaks, (C) O1s peaks, and (d) F1s peaks.

FIG. 10 includes graphs showing narrow spectra of the surfaces of the optical films of Study Examples 1 to 4, for (a) C1s peaks, (b) N1s peaks, (C) O1s peaks, and (d) F1s peaks. The measurement conditions of the narrow spectra were as described below.

X-ray beam diameter: 100 μm (25 W, 15 kV)
Analysis area: 1000 μm×500 μm
Photoelectron extraction angle: 45°
Path energy: 46.95 eV Next, the peak in each narrow spectrum obtained was separated into multiple peaks, and the binding species of the respective peaks were identified from the peak positions and shapes. In the following, the analysis results of the C1s peak and the O1s peak in Study Example 4 are shown. The same analysis was also carried out for the other study examples.

Figure 11:
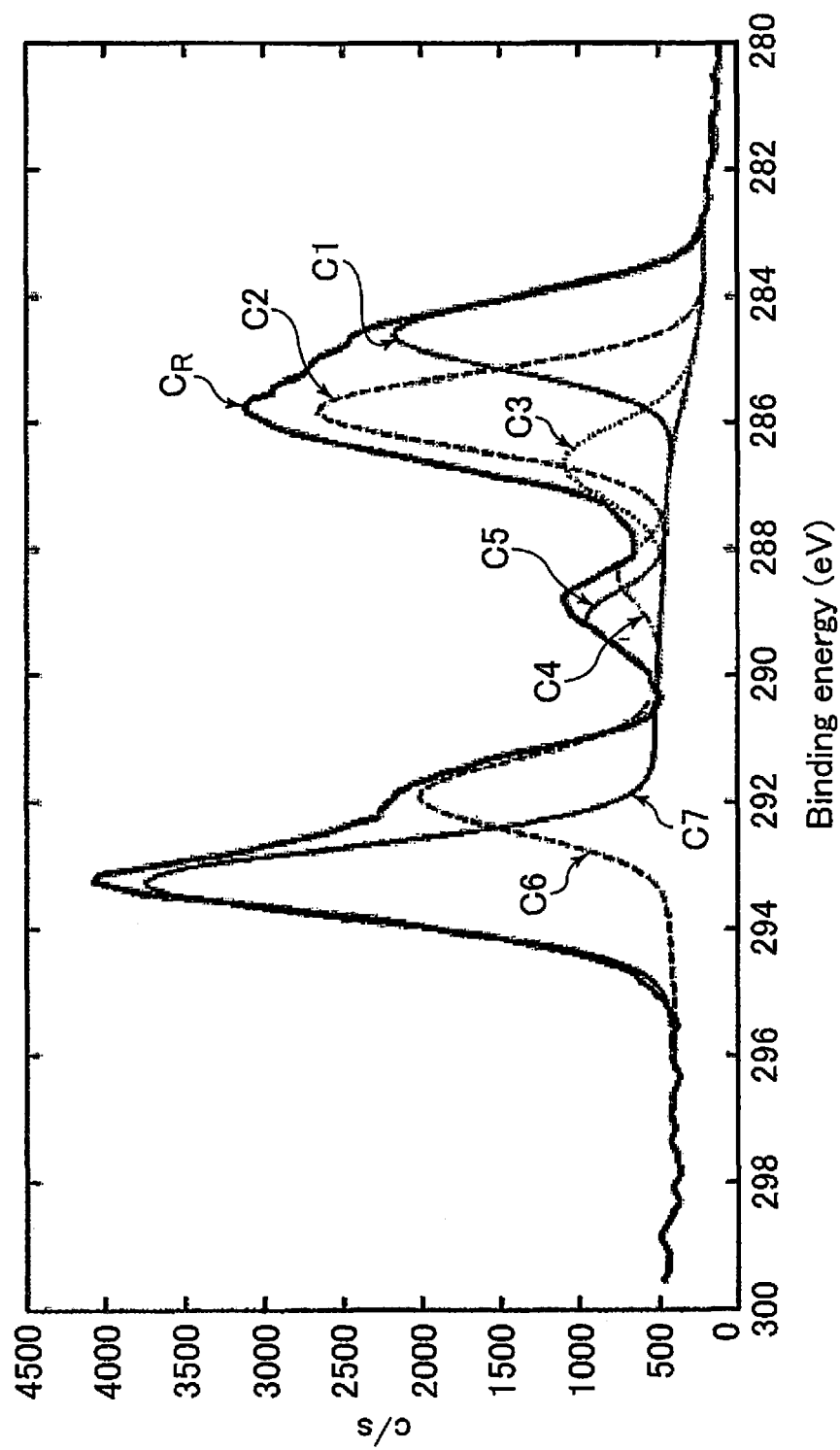
FIG. 11 is a graph showing an analysis result of the C1s peak in Study Example 4 shown in the graph (a) of FIG. 10.

FIG. 11 is a graph showing an analysis result of the C1s peak in Study Example 4 shown in the graph (a) of FIG. 10. In FIG. 11, the peak $C_R$ corresponds to the C1s peak in Study Example 4 shown in the graph (a) of FIG. 10. Meanwhile, the peaks C1 to C7 are spectra obtained by curve-fitting for the peak $C_R$ (C1s peak) with the peak attributed to each binding species. Also, the obtained spectra were subjected to electrification correction so that the position of the peak C1 was 284.6 eV.

The positions of the peaks C1 to C7 and the identified binding species are shown in Table 5. The binding species were identified using the information shown in Non Patent Literature 4 and Table 1 shown in Non Patent Literature 5.

TABLE 5

| | Peak position (eV) | Binding species |
|---|---|---|
| C1 | 284.6 | C—C bonds and others |
| C2 | 285.8 | C—O bonds, C—N bonds, and others |
| C3 | 286.8 | |
| C4 | 288.4 | CHF bonds, COO bonds, and others |
| C5 | 289.1 | |
| C6 | 291.9 to 292.1 | $CF_2$ bonds |
| C7 | 293.3 to 293.5 | $CF_3$ bonds and $OCF_2$ bonds |

As shown in Table 5, the peak C7 was identified as being attributed to "the $CF_3$ bonds and $OCF_2$ bonds". Since the peak attributed to the $CF_3$ bonds and the peak attributed to the $OCF_2$ bonds are at substantially the same position as shown in Table 1 in Non Patent Literature 5, it has been difficult to separate the peak C7 into these peaks.

Figure 12:
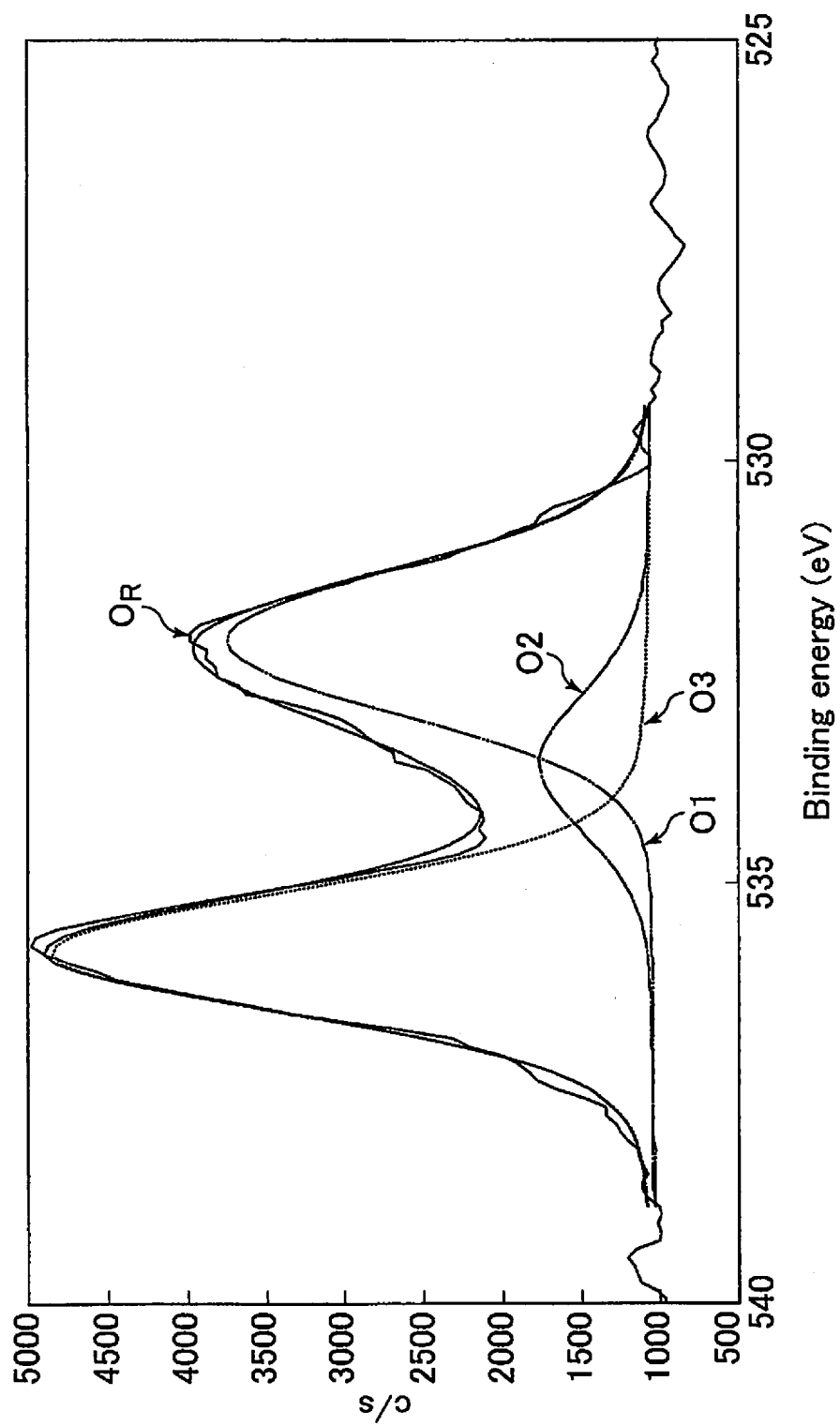
FIG. 12 is a graph showing an analysis result of the O1s peak in Study Example 4 shown in the graph (c) of FIG. 10.

FIG. 12 is a graph showing an analysis result of the O1s peak in Study Example 4 shown in the graph (c) of FIG. 10. In FIG. 12, the peak $O_R$ corresponds to the O1s peak in Study Example 4 shown in the graph (c) of FIG. 10. Meanwhile, the peaks O1 to O3 are spectra obtained by curve-fitting for the peak $O_R$ (O1s peak) with the peak attributed to each binding species.

The positions of the peaks O1 to O3 and the identified binding species are shown in Table 6. The binding species were identified using the information shown in Non Patent Literature 6.

TABLE 6

| | Peak position (eV) | Binding species |
|---|---|---|
| O1 | 532.1 to 532.3 | C—O bonds |
| O2 | 533.6 to 533.7 | C=O bonds |
| O3 | 535.8 to 536.0 | $OF_X$ bonds |

As shown in Table 6, the peak O3 was identified as being attributed to the "$OF_X$ bonds", but was found to be attributed to the $OCF_2$ bonds according to FIG. 2 shown in Non Patent Literature 7. The $OCF_2$ bonds are contained in PFPE which is a component of the fluorine-containing monomer A, for example. The peak attributed to the $OCF_2$ bonds in PFPE is shifted to the higher energy side than usual.

As described above, the peaks in the narrow spectra on the surfaces of the optical films of Study Examples 1 to 4 each were separated into a peak (peak C6) attributed to the $CF_2$ bonds, a peak (peak C7) attributed to the $CF_3$ bonds and the $OCF_2$ bonds, a peak (peak O3) attributed to the $OCF_2$ bonds, and peaks attributed to the other binding species.

Next, the ratio of the peak area of each of the peak (peak C6) attributed to the $CF_2$ bonds, the peak (peak C7) attributed to the $CF_3$ bonds and the $OCF_2$ bonds, and the peak (peak O3) attributed to the $OCF_2$ bonds to the peaks attributed to the other binding species was calculated in each study example. The peak area was calculated using data analysis software (product name: MultiPak) from the Ulvac-Phi, Inc.

Figure 13:
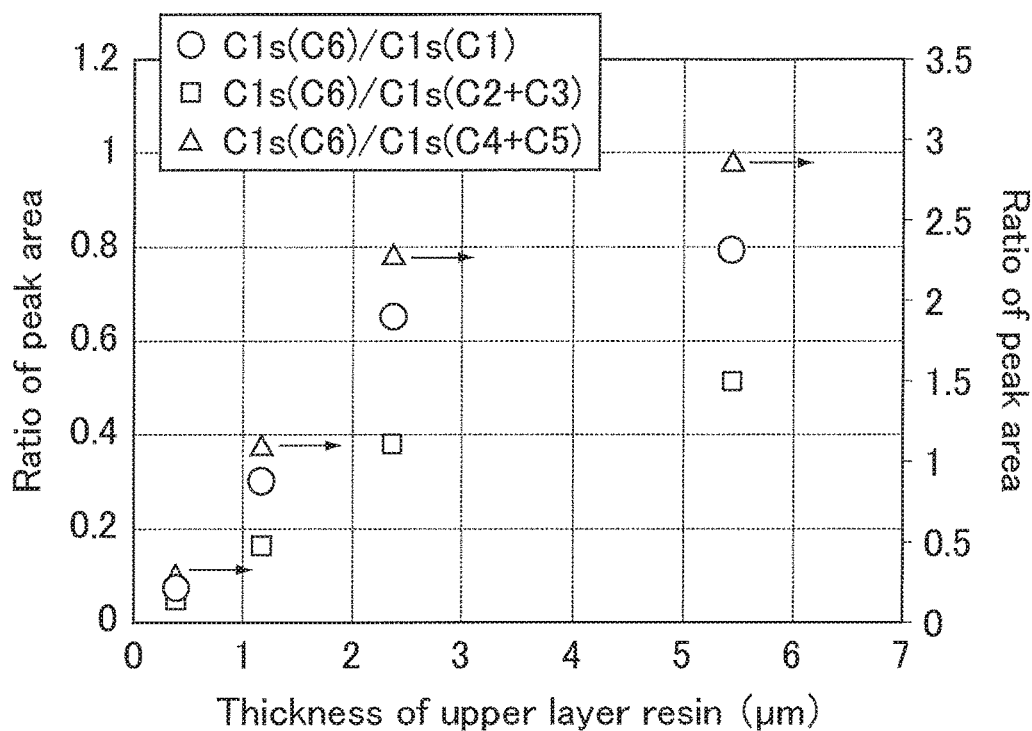
FIG. 13 is a graph showing the relation between the thickness of an upper layer resin and the ratio of the peak area of $CF_2$ bonds to the peak areas of binding species other than the $CF_2$ bonds in the C1s peak.

FIG. 13 is a graph showing the relation between the thickness of an upper layer resin and the ratio of the peak area of the $CF_2$ bonds to the peak areas of binding species other than the $CF_2$ bonds in the C1s peak. The specification of the data points in FIG. 13 is as described below.
"○": the ratio of the peak area of the $CF_2$ bonds (area of peak C6) to the peak area of the C—C bonds and others (area of peak C1)
"□": the ratio of the peak area of the $CF_2$ bonds (area of peak C6) to the peak area of the C—O bonds, C—N bonds, and others (sum of the area of peak C2 and the area of peak C3)
"Δ": the ratio of the peak area of the $CF_2$ bonds (area of peak C6) to the peak area of the CHF bonds, COO bonds, and others (sum of the area of peak C4 and the area of peak C5)
In FIG. 13, "○" and "□" are plotted along the left vertical axis, and "Δ" is plotted along the right vertical axis.

Figure 14:
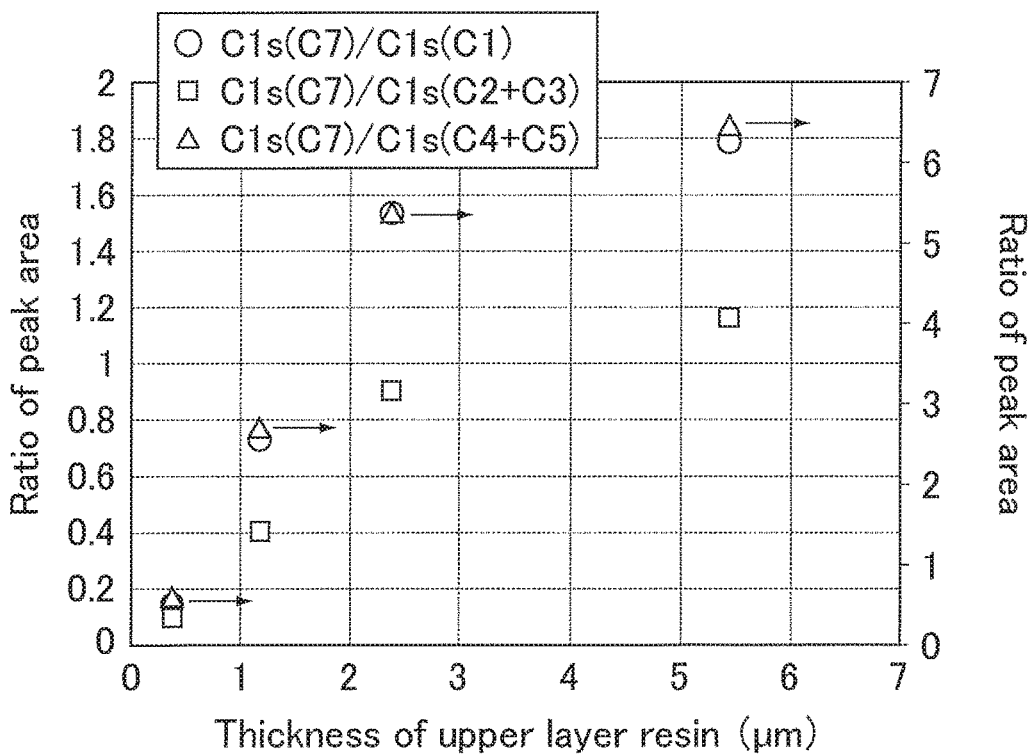
FIG. 14 is a graph showing the relation between the thickness of an upper layer resin and the ratio of the peak area of $CF_3$ bonds and $OCF_2$ bonds to the peak areas of binding species other than the $CF_3$ bonds and the $OCF_2$ bonds in the C1s peak.

FIG. 14 is a graph showing the relation between the thickness of an upper layer resin and the ratio of the peak area of $CF_3$ bonds and $OCF_2$ bonds to the peak areas of binding species other than the $CF_3$ bonds and the $OCF_2$ bonds in the C1s peak. The specification of the data points in FIG. 14 is as described below.
"○": the ratio of the peak area of the $CF_3$ bonds and the $OCF_2$ bonds (area of peak C7) to the peak area of the C—C bonds and others (area of peak C1)
"□": the ratio of the peak area of the $CF_3$ bonds and the $OCF_2$ bonds (area of peak C7) to the peak area of the C—O bonds, C—N bonds and others (sum of the area of peak C2 and the area of peak C3)
"Δ": the ratio of the peak area of the $CF_3$ bonds and the $OCF_2$ bonds (area of peak C7) to the peak area of the CHF bonds, COO bonds, and others (sum of the area of peak C4 and the area of peak C5)
In FIG. 14, "○" and "□" are plotted along the left vertical axis, and "Δ" is plotted along the right vertical axis.

Figure 15:
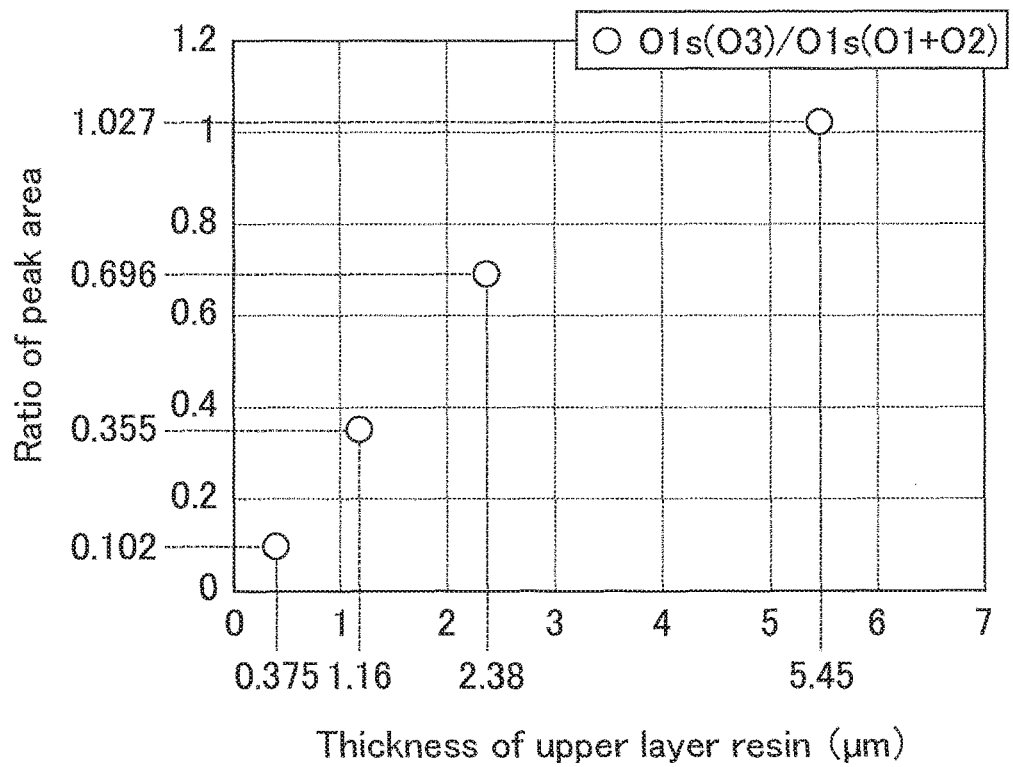
FIG. 15 is a graph showing the relation between the thickness of an upper layer resin and the ratio of the peak area of $OCF_2$ bonds to the peak areas of binding species other than the $OCF_2$ bonds in the O1s peak.

FIG. 15 is a graph showing the relation between the thickness of an upper layer resin and the ratio of the peak area of $OCF_2$ bonds to the peak areas of binding species other than the $OCF_2$ bonds in the O1s peak. In FIG. 15, "○" indicates the ratio of the peak area of the $OCF_2$ bonds (area of peak O3) to the sum of the peak area of the C—O bonds (area of peak O1) and the peak area of the C=O bonds (area of peak O2). As shown in FIG. 15, the ratio of the peak area of the $OCF_2$ bonds to the sum of the peak area of the C—O bond and the peak area of the C=O bonds is 0.102 in Study Example 1 (thickness of the upper layer resin 4: 0.375 μm), 0.355 in Study Example 2 (thickness of the upper layer resin 4: 1.16 μm), 0.696 in Study Example 3 (thickness of the upper layer resin 4: 2.38 μm), and 1.027 in Study Example 4 (thickness of the upper layer resin 4: 5.45 μm).

Comparison between FIG. 8 and FIGS. 13 to 15 shows that the tendency of the contact angle with hexadecane relative to the thickness of the upper layer resin 4 has the strongest correlation with the ratio of the peak area of the $OCF_2$ bonds to the sum of the peak area of the C—O bonds and the peak area of the C=O bonds as shown in FIG. 15. These results show that as the ratio of the peak area of the $OCF_2$ bonds to the sum of the peak area of the C—O bonds and the peak area of the C=O bonds increases, the contact angle with hexadecane increases, so that the oil repellency is improved. The ratio of the peak area of the $OCF_2$ bonds to the sum of the peak area of the C—O bonds and the peak area of the C=O bonds is preferably 0.1 or more, more preferably 0.3 or more, still more preferably 0.6 or more, particularly preferably 1 or more. The upper limit for the ratio of the peak area of the $OCF_2$ bonds to the sum of the peak area of the C—O bonds and the peak area of the C=O bonds is preferably 1.1.

Evaluation 4

In order to determine the distribution states of the constituent atoms in the cured resin layers in the optical films of Study Examples 1 to 4, the X-ray photoelectron spectroscopy was performed while the uneven structure was etched with gas cluster ion beams (GCIB).

A gas cluster ion beam consists of tens to thousands of atoms and has very low energy per atom. For example, an argon gas cluster ion beam leaves no residues of sputtered atoms when sputtered onto the sample, and thus can achieve ultra-low energy ion etching at about 1 to 20 eV per atom which cannot be achieved by $C_{60}$ ions. Also, the beam enables etching on an organic substance because almost no chemical change is caused by argon gas cluster ions on the sample surface after sputtering. The measurement device used was obtained by installing an argon gas cluster sputter ion gun (production name: 06-2000) from Ulvac-Phi, Inc. in an X-ray photoelectron spectroscopy instrument (product name: PHI 5000 VersaProbe II) from Ulvac-Phi, Inc.

Figure 16:
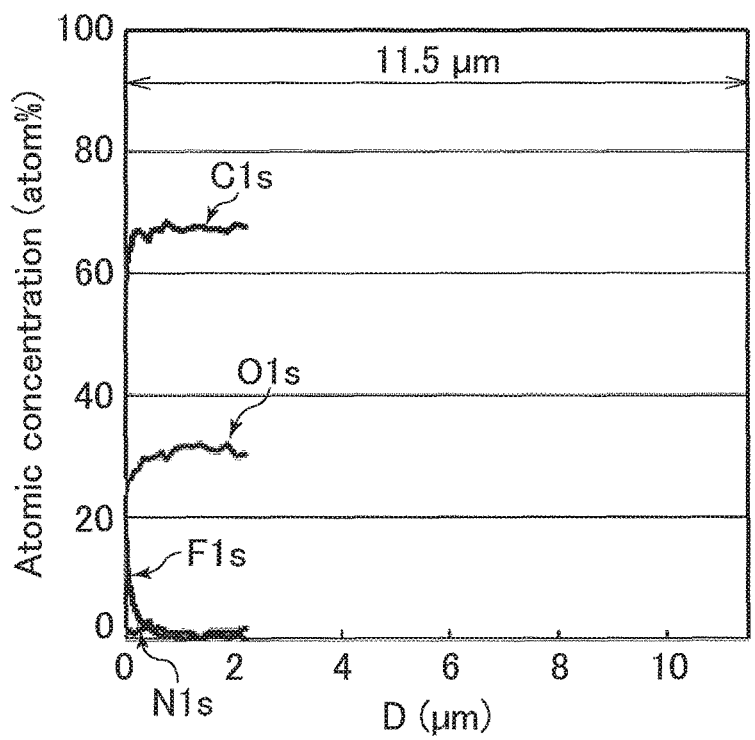
FIG. 16 is a graph showing the proportions of the numbers of the respective atoms relative to the total number of carbon atoms, nitrogen atoms, oxygen atoms, and fluorine atoms in a cured resin layer of the optical film of Study Example 1.
Figure 17:
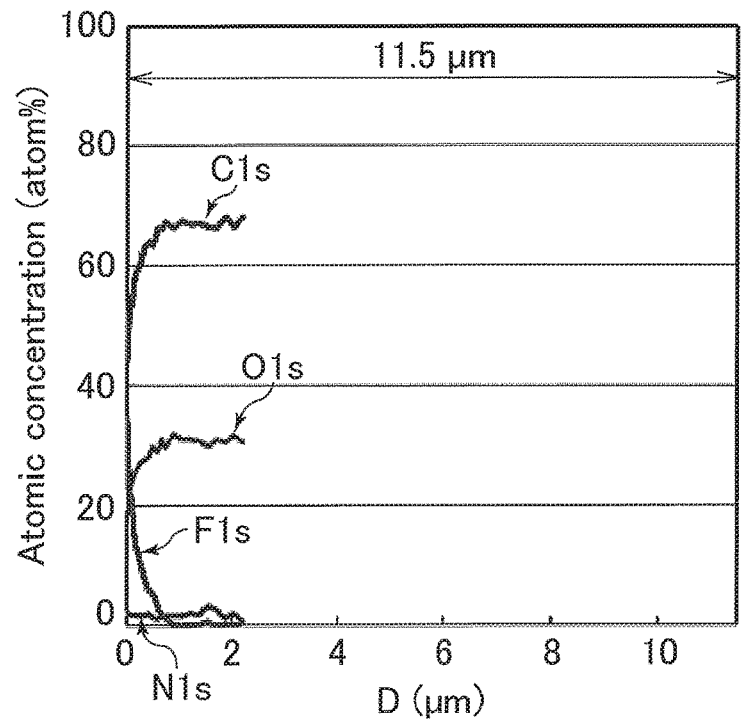
FIG. 17 is a graph showing the proportions of the numbers of the respective atoms relative to the total number of carbon atoms, nitrogen atoms, oxygen atoms, and fluorine atoms in a cured resin layer of the optical film of Study Example 2.
Figure 18:
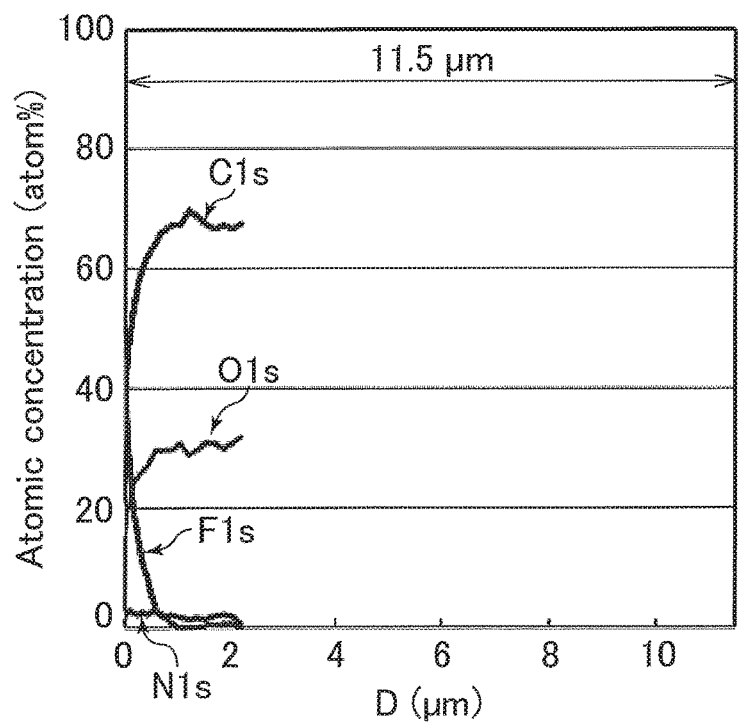
FIG. 18 is a graph showing the proportions of the numbers of the respective atoms relative to the total number of carbon atoms, nitrogen atoms, oxygen atoms, and fluorine atoms in a cured resin layer of the optical film of Study Example 3.
Figure 19:
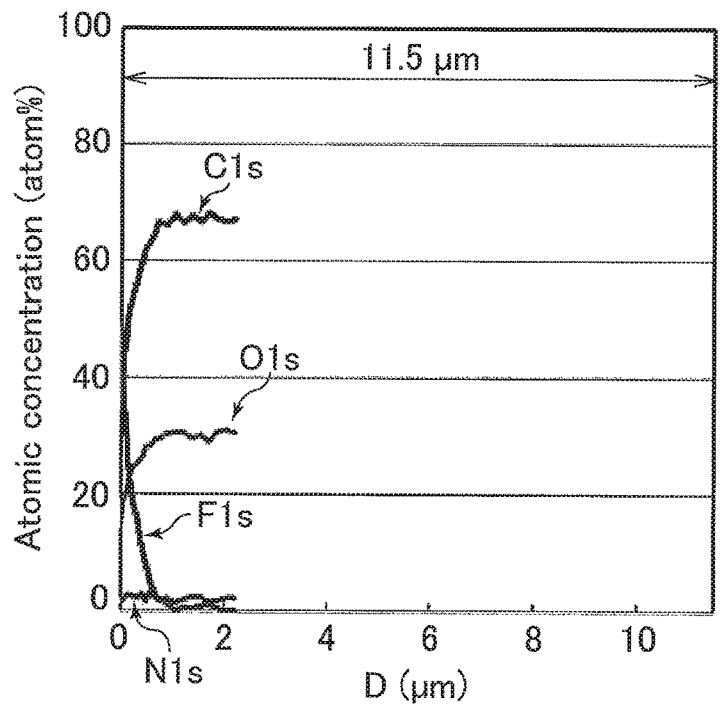
FIG. 19 is a graph showing the proportions of the numbers of the respective atoms relative to the total number of carbon atoms, nitrogen atoms, oxygen atoms, and fluorine atoms in a cured resin layer of the optical film of Study Example 4.

FIG. 16 is a graph showing the proportions of the numbers of the respective atoms relative to the total number of carbon atoms, nitrogen atoms, oxygen atoms, and fluorine atoms in a cured resin layer of the optical film of Study Example 1. FIG. 17 is a graph showing the proportions of the numbers of the respective atoms relative to the total number of carbon atoms, nitrogen atoms, oxygen atoms, and fluorine atoms in a cured resin layer of the optical film of Study Example 2. FIG. 18 is a graph showing the proportions of the numbers of the respective atoms relative to the total number of carbon atoms, nitrogen atoms, oxygen atoms, and fluorine atoms in a cured resin layer of the optical film of Study Example 3. FIG. 19 is a graph showing the proportions of the numbers of the respective atoms relative to the total number of carbon atoms, nitrogen atoms, oxygen atoms, and fluorine atoms in a cured resin layer of the optical film of Study Example 4.

The sputtering conditions by argon gas cluster ion beams and the charge neutralization conditions were as described below. The measurement conditions by X-ray photoelectron spectroscopy were the same as the measurement conditions of the narrow spectra in Evaluation 3.

<Sputtering Conditions>
  Ion source: argon gas cluster ion beams
  Accelerating voltage: 10 kV (15 mA Emission)
  Sample current: 30 nA
  Raster area: 4 mm×3 mm
  Zalar rotation: not used
  Sputtering time: 81 minutes (total time of 1.5 minutes× two cycles, 3 minutes×8 cycles, and 6 minutes×9 cycles)
  Sputtering rate (etching rate): 27 nm/min (polyhydroxy styrene equivalent)

<Charge Neutralization Conditions>
  Electron gun: Bias 1.0 V (20 pA Emission)
  Ion gun: 3 V (7 mA Emission)

The horizontal axis D (unit: μm) in FIGS. 16 to 19 indicates the distance from the surface having the uneven structure in the depth direction and is in terms of polyhydroxy styrene equivalent. The vertical axis "atomic concentration" in FIGS. 16 to 19 indicates the proportion of the number of atoms of each kind (unit: atom %) relative to the total number of carbon atoms, nitrogen atoms, oxygen atoms, and fluorine atoms.

As shown in FIGS. 16 to 19, the proportion (fluorine content) of the number of fluorine atoms to the total number of carbon atoms, nitrogen atoms, oxygen atoms, and fluorine atoms was found to decrease in the depth direction of the cured resin layer. That is, the fluorine content was found to be high on the surface side of the cured resin layer (surface side of the uneven structure).

Next, the concentration of fluorine atoms in the cured resin layer was calculated. The calculation results are shown in Table 7. The concentration of fluorine atoms in the cured resin layer was calculated for the cases of FIGS. 16 to 19 from the following formula.

[Concentration of fluorine atoms in cured resin layer](unit: %)=[area of profile of fluorine atoms]/[area of plotting area]

Here, the [area of plotting area] specifically refers to a product of the length (11.5 μm: thickness of cured resin layer) of the horizontal axis range and the length (100%) of the vertical axis range.

TABLE 7

|  | Concentration of fluorine atoms in cured resin layer |
| --- | --- |
| Study Example 1 | 0.26 |
| Study Example 2 | 0.63 |
| Study Example 3 | 0.85 |
| Study Example 4 | 1.06 |

As shown in Table 7, the concentration of fluorine atoms in the cured resin layer was about 1% at the highest, and the transparency was high. In contrast, as shown in Table 3, the fluorine content on the surface having the uneven structure was high, showing that the fluorine atoms were contained on the surface side of the cured resin layer (surface side of the uneven structure) at a high concentration. Hence, the optical films of Study Examples 1 to 4 can achieve both transparency and anti-fouling properties. Also, the concentration of fluorine atoms in the cured resin layer is preferably 2% or lower, more preferably 1.1% or lower. If the concentration of fluorine atoms in the cured resin layer is higher than 2%, the cured resin layer may be clouded.

Evaluation 5

Figure 20:
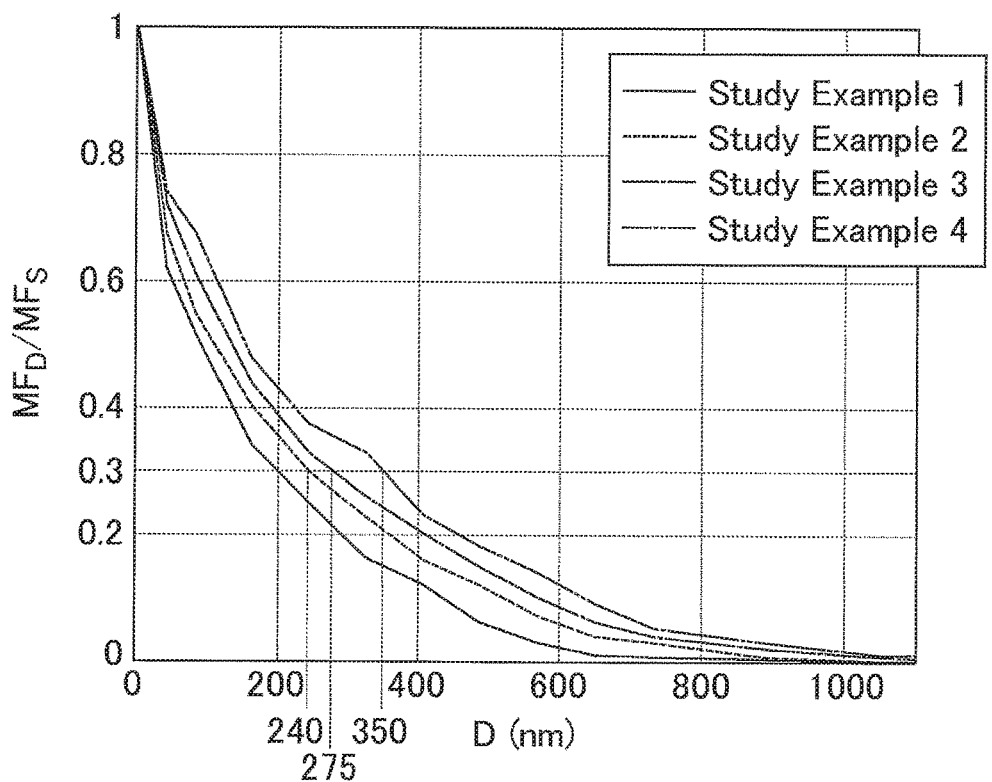
FIG. 20 is a graph showing the distribution states of fluorine atoms in the cured resin layers of the optical films of Study Examples 1 to 4.

Based on the results obtained in Evaluation 4, the distribution state of fluorine atoms in the cured resin layer was studied in more detail. FIG. 20 is a graph showing the distribution states of fluorine atoms in the cured resin layers of the optical films of Study Examples 1 to 4. The sputtering conditions by argon gas cluster ion beams, charge neutralization conditions, and the measurement conditions of the X-ray photoelectron spectroscopy were the same as those in Evaluation 4.

The horizontal axis D (unit: nm) in FIG. 20 indicates the distance from the surface having the uneven structure in the depth direction and is in terms of polyhydroxy styrene equivalent. The vertical axis "$MF_D/MF_S$" in FIG. 20 indicates the ratio of $MF_D$ to $MF_S$ defined as described below.

$MF_S$ (unit: atom %): the proportion of the number of fluorine atoms relative to the total number of carbon atoms, nitrogen atoms, oxygen atoms, and fluorine atoms on the surface having the uneven structure $MF_D$ (unit: atom %): the proportion of the number of fluorine atoms relative to the total number of carbon atoms, nitrogen atoms, oxygen atoms, and fluorine atoms at a position away from the surface having the uneven structure by D (unit: nm) in the depth direction in terms of polyhydroxy styrene equivalent As shown in FIG. 20, the proportion (fluorine content) of the number of fluorine atoms relative to the total number of carbon atoms, nitrogen atoms, oxygen atoms, and fluorine atoms was found to decrease in the depth direction of the cured resin layer. The decreasing tendency of the fluorine content was found to be the slowest in Study Example 4, followed by Study Example 3, Study Example 2, and Study Example 1 in the given order. That is, as the application amount of the upper layer resin 4 to the mold 5 increases (as the thickness of the upper layer resin 4 increases), the distribution range of the fluorine atoms was found to be deeper in the cured resin layer. The D satisfying the equation $MF_D/MF_S=0$ was 1050 nm or more in Study Example 1, 1220 nm or more in Study Example 2, 1380 nm or more in Study Example 3, and 1540 nm or more in Study Example 4. As shown in FIG. 20, the D satisfying the equation $MF_D/MF_S=0.3$ was 200 nm in Study Example 1, 240 nm in Study Example 2, 275 nm in Study Example 3, and 350 nm in Study Example 4. The D satisfying the equation $MF_D/MF_S=0.3$ is preferably 200 nm or more, more preferably 240 nm or more, still more preferably 275 nm or more, particularly preferably 350 nm or more. In the case that the D satisfying the equation $MF_D/MF_S=0.3$ is 240 nm or more, more fluorine atoms are entirely distributed in the inner portions of the projections 6 of the uneven structure (height of projections 6: 250 nm to 300 nm), and the anti-fouling properties are sufficiently improved. The upper limit for the D satisfying the equation $MF_D/MF_S=0.3$ is preferably 350 nm.

Evaluation 6

Evaluation 5 revealed the distribution state of fluorine atoms in the cured resin layer. Next, the distribution state of components ($CF_2$ bonds, $CF_3$ bonds, and $OCF_2$ bonds) contained in the fluorine-containing monomer A and the fluorine-containing monomer B in the cured resin layer was studied by separating the peak of each spectrum in the depth direction of the cured resin layer into peaks attributed to the respective binding species.

Figure 21:
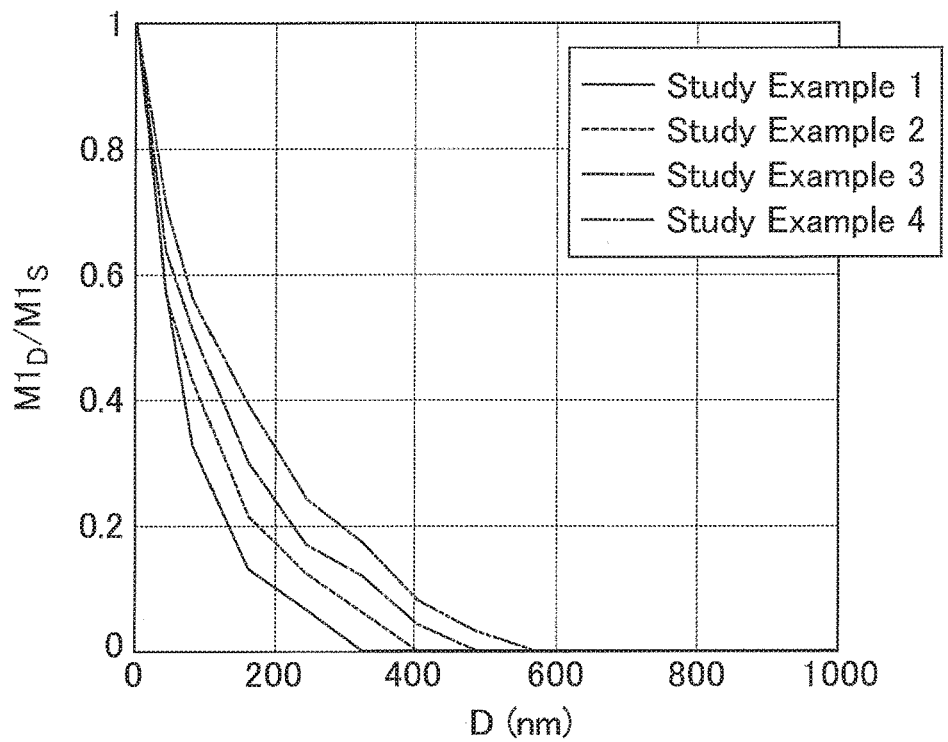
FIG. 21 is a graph showing the distribution states of $CF_2$ bonds in the cured resin layers of the optical films of Study Examples 1 to 4.

FIG. 21 is a graph showing the distribution states of $CF_2$ bonds in the cured resin layers of the optical films of Study Examples 1 to 4. The horizontal axis D (unit: nm) in FIG. 21 indicates the distance from the surface having the uneven structure in the depth direction, and is in terms of polyhydroxy styrene equivalent. The vertical axis "$M1_D/M1_S$" in FIG. 21 indicates the ratio of $M1_D$ to $M1_S$ as defined below.

$M1_S$: peak area of the $CF_2$ bonds in C1s peak detected on the surface having the uneven structure $M1_D$: peak area of the $CF_2$ bonds in the C1s peak detected at a position away from the surface having the uneven structure by D (unit: nm) in the depth direction in terms of polyhydroxy styrene equivalent Here, the peak attributed to the $CF_2$ bonds was analyzed as a peak corresponding to the peak separated from the C1s peak (e.g. peak C6 in FIG. 11).

As shown in FIG. 21, the amount of the $CF_2$ bonds was found to decrease in the depth direction of the cured resin layer. The decreasing tendency of the amount of $CF_2$ bonds was found to be the slowest in Study Example 4, followed by Study Example 3, Study Example 2, and Study Example 1 in the given order. That is, as the application amount of the upper layer resin 4 to the mold 5 increases (as the thickness of the upper layer resin 4 increases), the distribution range of the $CF_2$ bonds was found to be deeper in the cured resin layer.

Figure 22:
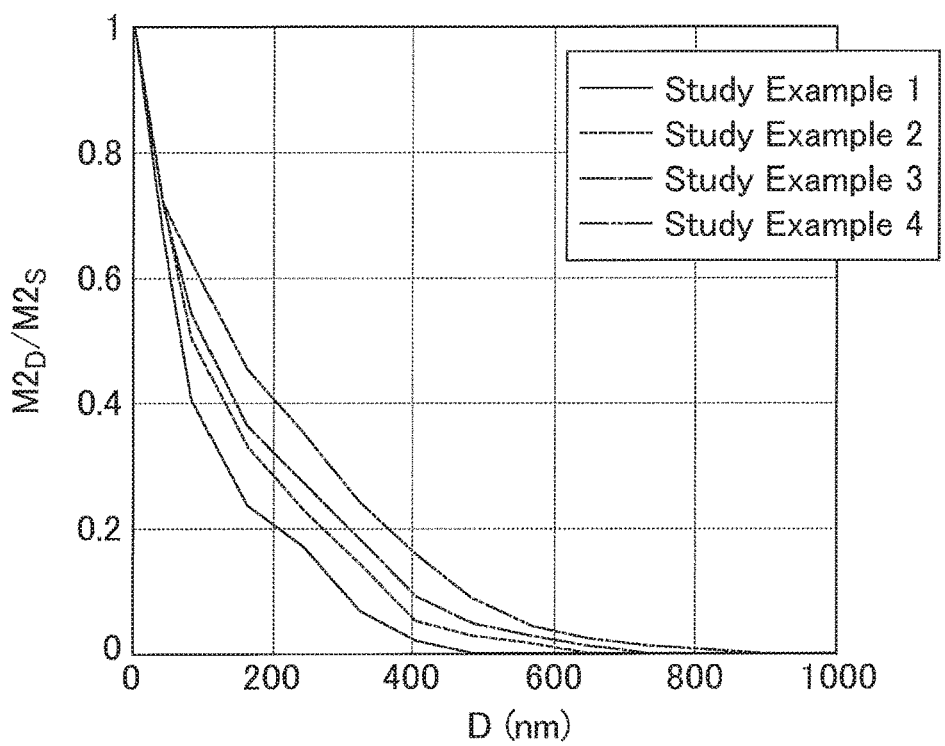
FIG. 22 is a graph showing the distribution states of $CF_3$ bonds and $OCF_2$ bonds in the cured resin layers of the optical films of Study Examples 1 to 4.

FIG. 22 is a graph showing the distribution states of $CF_3$ bonds and $OCF_2$ bonds in the cured resin layers of the optical films of Study Examples 1 to 4. The horizontal axis D (unit: nm) in FIG. 22 indicates the distance from the surface having the uneven structure in the depth direction and is in terms of polyhydroxy styrene equivalent. The vertical axis "$M2_D/M2_S$" in FIG. 22 indicates the ratio of $M2_D$ to $M2_S$ as defined below.

$M2_S$: peak area of the $CF_3$ bonds and $OCF_2$ bonds in C1s peak detected on the surface having the uneven structure $M2_D$: peak area of the $CF_3$ bonds and $OCF_2$ bonds in the C1s peak detected at a position away from the surface having the uneven structure by D (unit: nm) in the depth direction in terms of polyhydroxy styrene equivalent Here, the peak attributed to the $CF_3$ bonds and the $OCF_2$ bonds was analyzed as a peak corresponding to the peak separated from the C1s peak (e.g. peak C7 in FIG. 11).

As shown in FIG. 22, the amount of the $CF_3$ bonds and the $OCF_2$ bonds was found to decrease in the depth direction of the cured resin layer. The decreasing tendency of the amount of $CF_3$ bonds and the $OCF_2$ bonds was found to be the slowest in Study Example 4, followed by Study Example 3, Study Example 2, and Study Example 1 in the given order. That is, as the application amount of the upper layer resin 4 to the mold 5 increases (as the thickness of the upper layer resin 4 increases), the distribution range of the $CF_3$ bonds and the $OCF_2$ bonds was found to be deeper in the cured resin layer.

Figure 23:
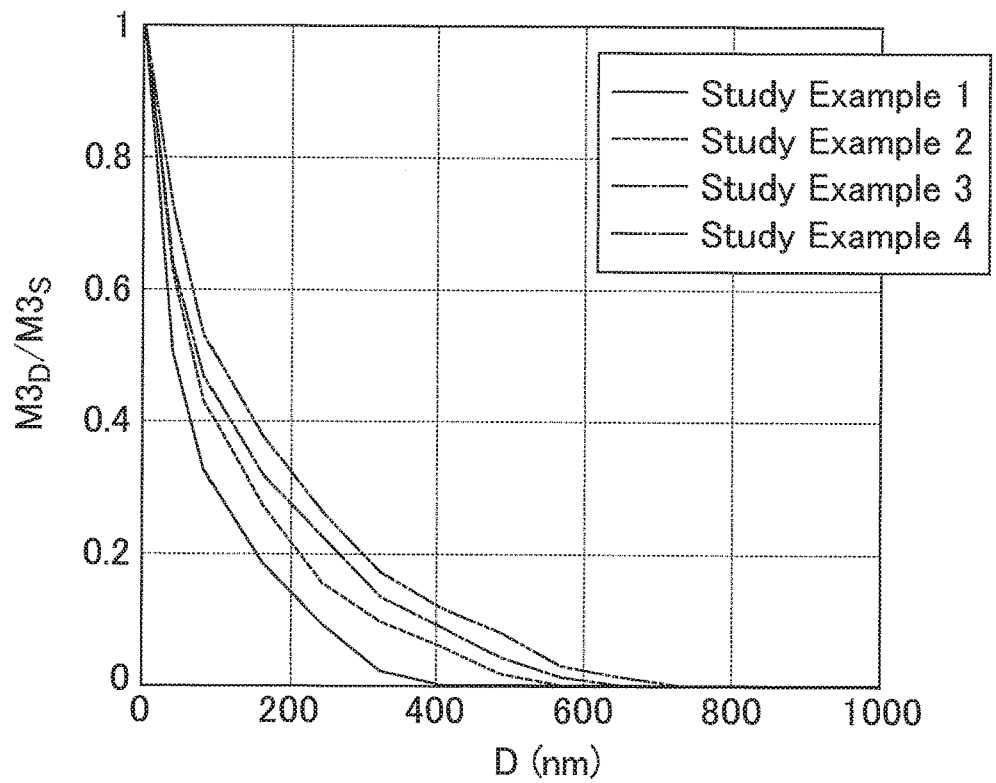
FIG. 23 is a graph showing the distribution states of $OCF_2$ bonds in the cured resin layers of the optical films of Study Examples 1 to 4.

FIG. 23 is a graph showing the distribution states of $OCF_2$ bonds in the cured resin layers of the optical films of Study Examples 1 to 4. The horizontal axis D (unit: nm) in FIG. 23 indicates the distance from the surface having the uneven structure in the depth direction and is in terms of polyhydroxy styrene equivalent. The vertical axis "$M3_D/M3_S$" in FIG. 23 indicates the ratio of $M3_D$ to $M3_S$ as defined below.

$M3_S$: peak area of the $OCF_2$ bonds in O1s peak detected on the surface having the uneven structure $M3_D$: peak area of the $OCF_2$ bonds in the O1s peak detected at a position away from the surface having the uneven structure by D (unit: nm) in the depth direction in terms of polyhydroxy styrene equivalent Here, the peak attributed to the $OCF_2$ bonds was analyzed as a peak corresponding to the peak separated from the O1s peak (e.g. peak O3 in FIG. 12).

As shown in FIG. 23, the amount of the $OCF_2$ bonds was found to decrease in the depth direction of the cured resin layer. The decreasing tendency of the amount of $OCF_2$ bonds was found to be the slowest in Study Example 4, followed by Study Example 3, Study Example 2, and Study Example 1 in the given order. That is, as the application amount of the upper layer resin 4 to the mold 5 increases (as the thickness of the upper layer resin 4 increases), the distribution range of the $OCF_2$ bonds was found to be deeper in the cured resin layer.

As shown in FIGS. 21 to 23, the components ($CF_2$ bonds, $CF_3$ bonds, and $OCF_2$ bonds) contained in the fluorine-containing monomer A and the fluorine-containing monomer B were contained at a high concentration in a region within 1 μm from the surface having the uneven structure in the depth direction in terms of polyhydroxy styrene equivalent. Then, the concentration levels of the fluorine-containing monomer A and the fluorine-containing monomer B were studied.

Figure 24:
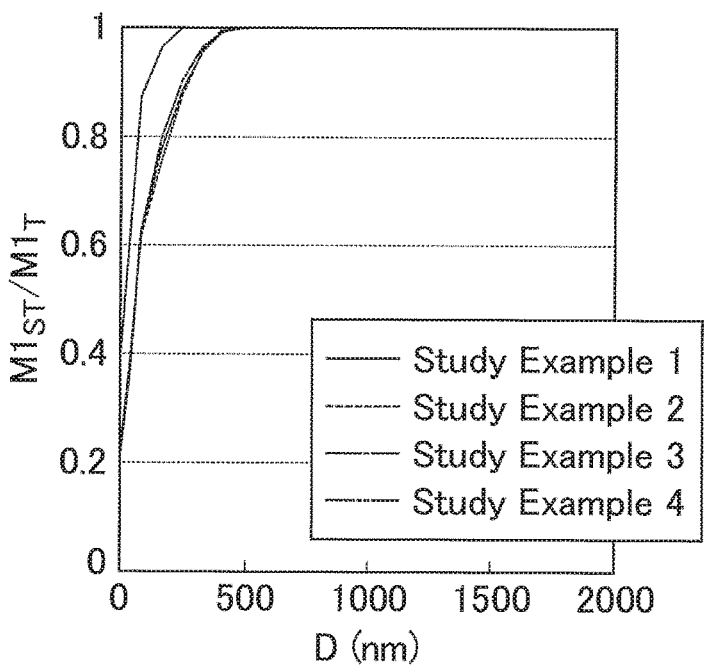
FIG. 24 is a graph showing the abundance ratio of carbon atoms of $CF_2$ bonds in the cured resin layers of the optical films of Study Examples 1 to 4.

FIG. 24 is a graph showing the abundance ratio of carbon atoms of $CF_2$ bonds in the cured resin layers of the optical films of Study Examples 1 to 4. The horizontal axis D (unit: nm) in FIG. 24 indicates the distance from the surface having the uneven structure in the depth direction and is in terms of polyhydroxy styrene equivalent. The vertical axis "$M1_{ST}/M1_T$" in FIG. 24 indicates the ratio of $M1_{ST}$ to $M1_T$ as defined below.

$M1_T$: corresponding to the number of carbon atoms of the $CF_2$ bonds in the cured resin layer $M1_{ST}$: corresponding to the number of carbon atoms of the $CF_2$ bonds in the region within D (unit: nm) in terms of polyhydroxy styrene equivalent from the surface having the uneven structure in the depth direction The ratio $M1_{ST}/M1_T$ when the equation D=1000 nm (1 μm) held was 1 in all of Study Examples 1 to 4.

$M1_T$ and $M1_{ST}$ were calculated by the following procedures. In the following, the calculation method in the case of Study Example 4 is shown. The same calculation was also performed for the other study examples.

Figure 25:
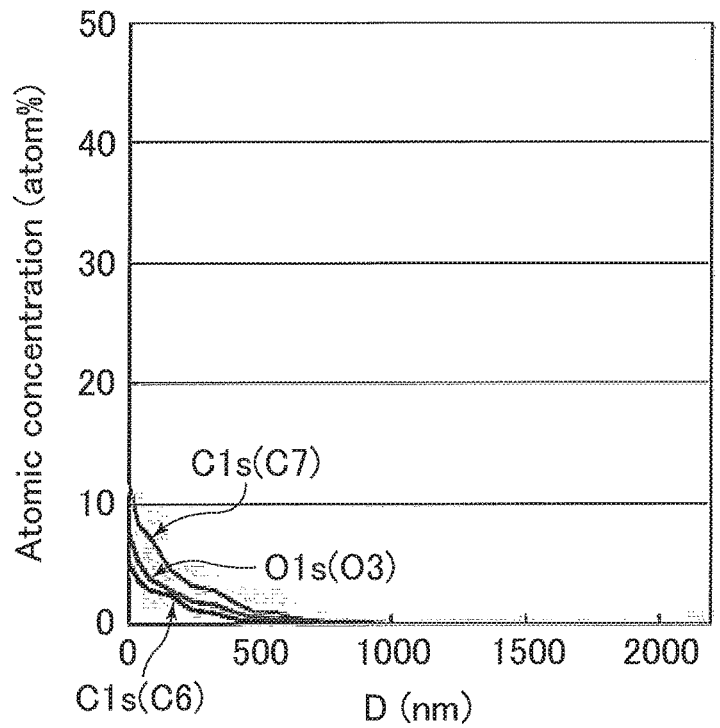
FIG. 25 is a graph showing the proportions of the numbers of the atoms of the respective binding species relative to the total number of carbon atoms, nitrogen atoms, oxygen atoms, and fluorine atoms in the cured resin layer of the optical film of Study Example 4.

First, the peak in the spectrum in the depth direction of the cured resin layer was separated into peaks attributed to the respective binding species, and the atomic concentration of each binding species was calculated. FIG. 25 is a graph showing the proportions of the numbers of the atoms of the respective binding species relative to the total number of carbon atoms, nitrogen atoms, oxygen atoms, and fluorine atoms in the cured resin layer of the optical film of Study Example 4. FIG. 25 selectively shows the peak C6 ($CF_2$ bonds), the peak C7 ($CF_3$ bonds and $OCF_2$ bonds), and the peak O3 ($OCF_2$ bonds).

The horizontal axis D (unit: nm) in FIG. 25 indicates the distance from the surface having the uneven structure in the depth direction and is in terms of polyhydroxy styrene equivalent. The vertical axis "atomic concentration" in FIG. 25 indicates the proportion of the number of atoms of respective binding species (unit: atom %) relative to the total number of carbon atoms, nitrogen atoms, oxygen atoms, and fluorine atoms. Specifically, the proportions are as described below.

Figure 26:
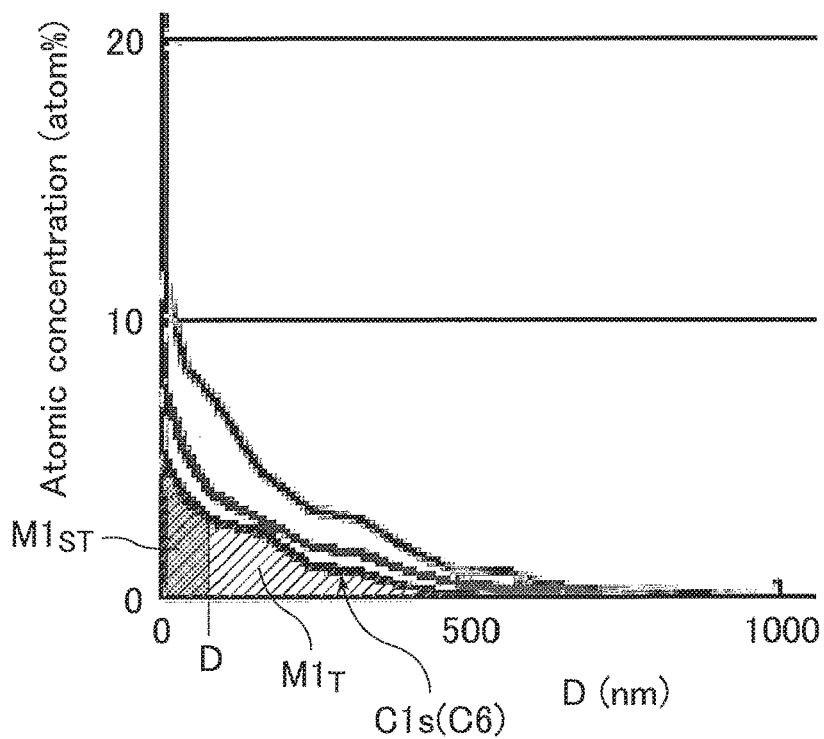
FIG. 26 is a graph showing $M1_T$ and $M1_{ST}$ in Study Example 4 shown in FIG. 24.

C1s (C6): the proportion of the number of carbon atoms of the $CF_2$ bonds relative to the total number of carbon atoms, nitrogen atoms, oxygen atoms, and fluorine atoms C1s (C7): the proportion of the number of carbon atoms of the $CF_3$ bonds and $OCF_2$ bonds relative to the total number of carbon atoms, nitrogen atoms, oxygen atoms, and fluorine atoms O1s (O3): the proportion of the number of oxygen atoms of the $OCF_2$ bonds relative to the total number of carbon atoms, nitrogen atoms, oxygen atoms, and fluorine atoms Next, based on the results shown in FIG. 25, the $M1_T$ and $M1_{ST}$ were calculated from the areas of the profiles as shown in FIG. 26. FIG. 26 is a graph showing $M1_T$ and $M1_{ST}$ in Study Example 4 shown in FIG. 24.

$M1_T$: area of profile of C1s (C6)

$M1_{ST}$: area in the range of horizontal axis 0 to D in profile of C1s (C6)

Figure 27:
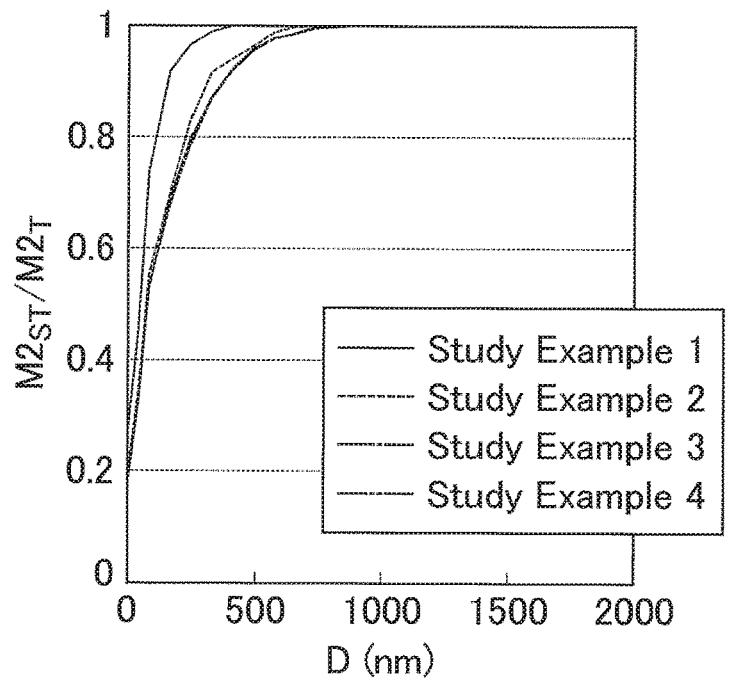
FIG. 27 is a graph showing the abundance ratio of carbon atoms of $CF_3$ bonds and $OCF_2$ bonds in the cured resin layers of the optical films of Study Examples 1 to 4.

FIG. 27 is a graph showing the abundance ratio of carbon atoms of $CF_3$ bonds and $OCF_2$ bonds in the cured resin layers of the optical films of Study Examples 1 to 4. The horizontal axis D (unit: nm) in FIG. 27 indicates the distance from the surface having the uneven structure in the depth direction and is in terms of polyhydroxy styrene equivalent. The vertical axis "$M2_{ST}/M2_T$" in FIG. 27 indicates the ratio of $M2_{ST}$ to $M2_T$ as defined below.

$M2_T$: corresponding to the number of carbon atoms of the $CF_3$ bonds and the $OCF_2$ bonds in the cured resin layer $M2_{ST}$: corresponding to the number of carbon atoms of the $CF_3$ bonds and the $OCF_2$ bonds in the region within D (unit: nm) in terms of polyhydroxy styrene equivalent from the surface having the uneven structure in the depth direction The ratio $M2_{ST}/M2_T$ when the equation D=1000 nm (1 μm) held was 1 in all of Study Examples 1 to 4.

$M2_T$ and $M2_{ST}$ were calculated by the following procedures. In the following, the calculation method in the case of Study Example 4 is shown. The same calculation was also performed for the other study examples.

Figure 28:
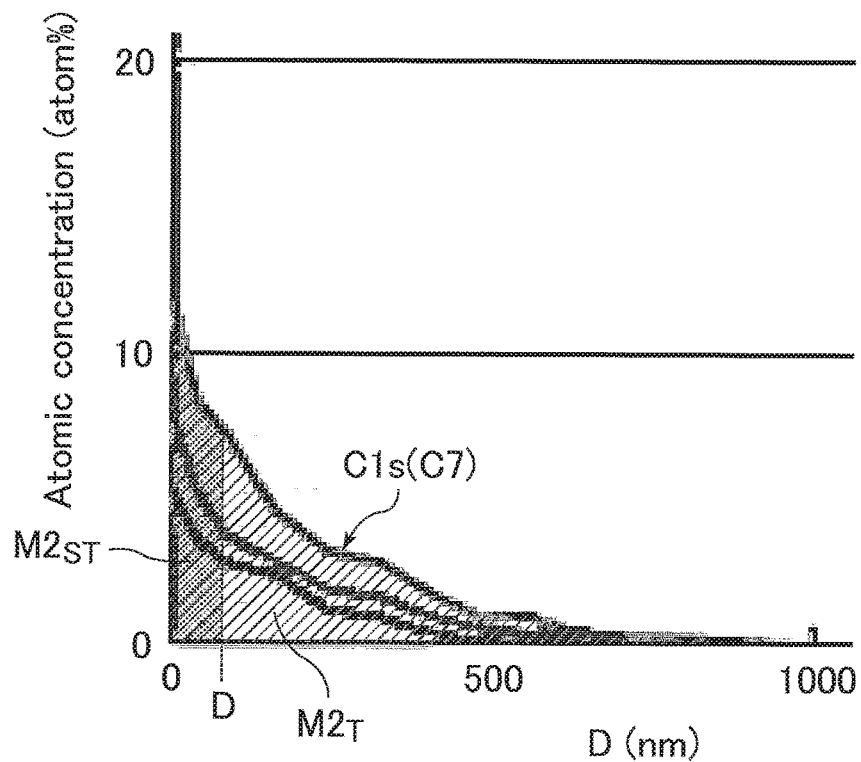
FIG. 28 is a graph showing $M2_T$ and $M2_{ST}$ in Study Example 4 shown in FIG. 27.

Based on the results shown in FIG. 25, the $M2_T$ and $M2_{ST}$ were calculated from the areas of the profiles as shown in FIG. 28. FIG. 28 is a graph showing $M2_T$ and $M2_{ST}$ in Study Example 4 shown in FIG. 27.

$M2_T$: area of profile of C1s (C7)

$M2_{ST}$: area in the range of horizontal axis 0 to D in profile of C1s (C7)

Figure 29:
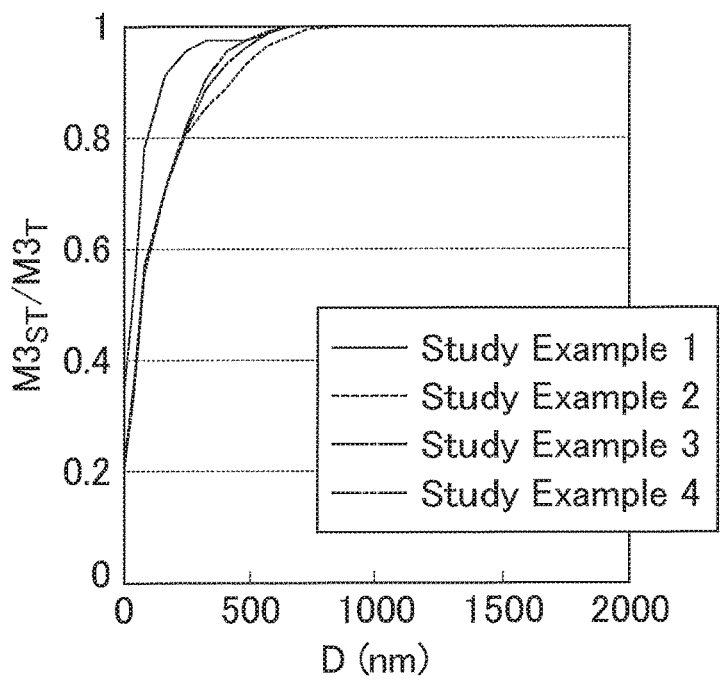
FIG. 29 is a graph showing the abundance ratio of oxygen atoms of $OCF_2$ bonds in the cured resin layers of the optical films of Study Examples 1 to 4.

FIG. 29 is a graph showing the abundance ratio of oxygen atoms of $OCF_2$ bonds in the cured resin layers of the optical films of Study Examples 1 to 4. The horizontal axis D (unit: nm) in FIG. 29 indicates the distance from the surface having the uneven structure in the depth direction and is in terms of polyhydroxy styrene equivalent. The vertical axis "$M3_{ST}/M3_T$" in FIG. 29 indicates the ratio of $M3_{ST}$ to $M3_T$ as defined below.

$M3_T$: corresponding to the number of oxygen atoms of the $OCF_2$ bonds in the cured resin layer $M3_{ST}$: corresponding to the number of oxygen atoms of the $OCF_2$ bonds in the region within D (unit: nm) in terms of polyhydroxy styrene equivalent from the surface having the uneven structure in the depth direction The ratio $M3_{ST}/M3_T$ when the equation D=1000 nm (1 μm) held was 1 in Study Examples 1 to 3, and 0.99 in Study Example 4.

$M3_T$ and $M3_{ST}$ were calculated by the following procedures. In the following, the calculation method in the case of Study Example 4 is shown. The same calculation was also performed for the other study examples.

Figure 30:
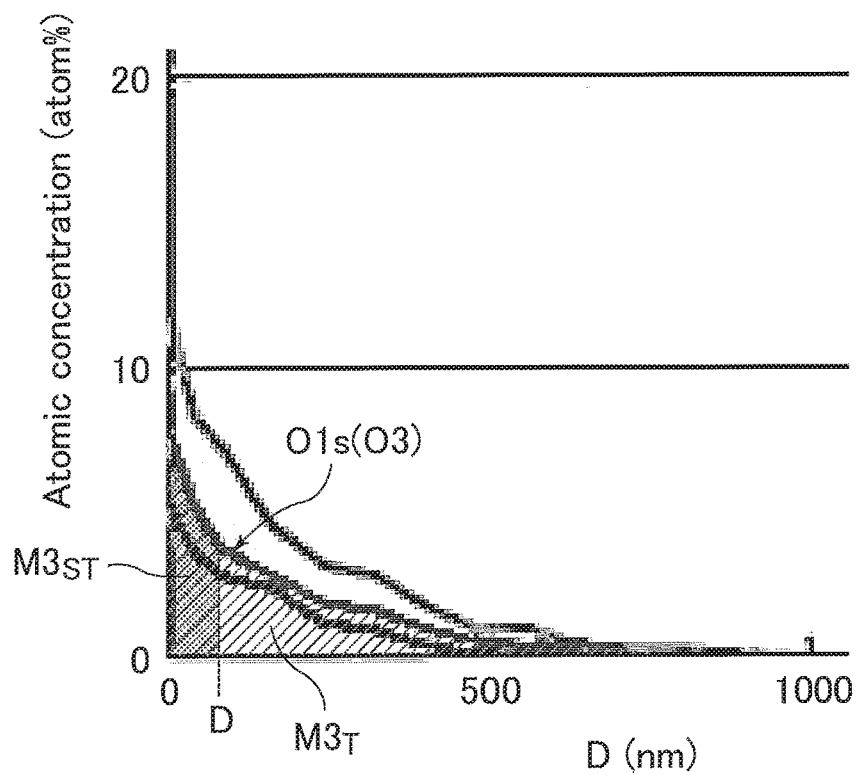
FIG. 30 is a graph showing $M3_T$ and $M3_{ST}$ in Study Example 4 shown in FIG. 29.

Based on the results shown in FIG. 25, the $M3_T$ and $M3_{ST}$ were calculated from the areas of the profiles as shown in FIG. 30. FIG. 30 is a graph showing $M3_T$ and $M3_{ST}$ in Study Example 4 in FIG. 29.

$M3_T$: area of profile of O1s (O3)

$M3_{ST}$: area in the range of horizontal axis 0 to D in profile of O1s (O3)

As shown in FIG. 24, FIG. 27, and FIG. 29, when the equation D=1000 nm (1 μm) held, all the ratios $M1_{ST}/M1_T$, $M2_{ST}/M2_T$, and $M3_{ST}/M3_T$ in each study example were 0.99 or more. That is, 99% or more of the number of atoms in the cured resin layer about the carbon atoms of the $CF_2$ bonds, the carbon atoms of the $CF_3$ bonds and $OCF_2$ bonds, and the oxygen atoms of the $OCF_2$ bonds was contained in a region within 1 μm in terms of polyhydroxy styrene equivalent from the surface having the uneven structure in the depth direction. From the viewpoint of achieving a high concentration of the components contained in the fluorine-containing monomer A and the fluorine-containing monomer B on the surface side of the cured resin layer (surface side of the uneven structure) and sufficiently improving the anti-fouling properties, preferably 95% or more, more preferably 99% or more, of the number of atoms in the cured resin layer about at least one kind of atom selected from the group consisting of the carbon atoms of the $CF_2$ bonds, the carbon atoms of the $CF_3$ bonds and the $OCF_2$ bonds, and the oxygen atoms of the $OCF_2$ bonds is contained in the region within 1 μm in terms of polyhydroxy styrene equivalent from the surface having the uneven structure in the depth direction. Also, still more preferably, 99% or more of the number of atoms in the cured resin layer about the carbon atoms of the $CF_2$ bonds, the carbon atoms of the $CF_3$ bonds and the $OCF_2$ bonds, and the oxygen atoms of the $OCF_2$ bonds is contained in the region within 1 μm in terms of polyhydroxy styrene equivalent from the surface having the uneven structure in the depth direction.

As described above, in consideration of the results shown in Evaluation 4, the components contained in the fluorine-containing monomer A and the fluorine-containing monomer B were found to be contained at a high concentration on the surface side of the cured resin layer (surface side of the uneven structure) even when the concentration of fluorine atoms in the cured resin layer was as low as 2% or lower. Such a state enables production of an optical film having sufficiently excellent anti-fouling properties.

[Additional Remarks]

One aspect of the present invention may be a method for producing an optical film having on a surface thereof an uneven structure provided with projections at a pitch equal to or shorter than the wavelength of visible light, the method including the steps of: (1) applying a lower layer resin and an upper layer resin; (2) forming a resin layer having the uneven structure on a surface thereof by pressing a mold against the lower layer resin and the upper layer resin from the upper layer resin side in the state where the applied lower layer resin and upper layer resin are stacked; and (3) curing the resin layer, the lower layer resin containing at least one kind of first monomer that contains no fluorine atoms, the upper layer resin containing a fluorine-containing monomer and at least one kind of second monomer that contains no fluorine atoms, at least one of the first monomer and the second monomer containing a compatible monomer that is compatible with the fluorine-containing monomer and being dissolved in the lower layer resin and the upper layer resin.

The phrase "applying a lower layer resin and an upper layer resin" in the above-described step (1) encompasses not only the case of applying in layers the lower layer resin and the upper layer resin to the same base material but also the case of applying the lower layer resin and the upper layer resin to different base materials. The case of applying the lower layer resin and the upper layer resin to different base materials may be, for example, the case of applying the lower layer resin to a base film and the upper layer resin to the mold.

The phrase "pressing a mold against the lower layer resin and the upper layer resin from the upper layer resin side in the state where the applied lower layer resin and upper layer resin are stacked" in the above-described step (2) encompasses not only the case of pressing the mold after the lower layer resin and the upper layer resin are stacked but also the case of pressing the mold while stacking the lower layer resin and the upper layer resin. In other words, the phrase encompasses a method of, in the above-described step (2), stacking the lower layer resin and the upper layer resin (hereinafter, also referred to as a stacking step) and pressing the mold against the lower layer resin and the upper layer resin from the upper layer resin side (hereinafter, also referred to as a pressing step) at the same timing or different timings.

The method for performing the stacking step and the pressing step at different timings is preferably performed by any of the following methods (i) to (iv).

(i) A method of sequentially applying the lower layer resin and the upper layer resin to a base film (stacking step) and then pressing the mold against the lower layer resin and the upper layer resin from the upper layer resin side (pressing step).

That is, the step (1) may be performed by sequentially applying the lower layer resin and the upper layer resin to a base film. In this case, use of an apparatus employing a common application method (e.g. gravure method, slot die method) in combination enables suitable application of the lower layer resin and the upper layer resin.

(ii) A method of simultaneously applying the lower layer resin and the upper layer resin to a base film (the upper layer resin is formed on the lower layer resin on the side opposite to the base film) (the stacking step) and then pressing the mold against the lower layer resin and the upper layer resin from the upper layer resin side (the pressing step).

That is, the step (1) may be performed by simultaneously applying the lower layer resin and the upper layer resin to a base film. In this case, the lower layer resin and the upper layer resin can be suitably applied. Furthermore, the application device can be a simple one and the number of steps can be decreased, compared with the case of sequentially applying the lower layer resin and the upper layer resin to the base film, so that the productivity is improved.

(iii) A method of sequentially applying the upper layer resin and the lower layer resin to the mold (the stacking step) and then pressing the mold to which the upper layer resin and the lower layer resin have been applied against a base film (the pressing step).

That is, the step (1) may be performed by sequentially applying the upper layer resin and the lower layer resin to the mold. In this case, for example, use of a flexible material for the mold facilitates formation of the uneven structure regardless of the shape of the base film.

(iv) A method of simultaneously applying the upper layer resin and the lower layer resin to the mold (the lower layer resin is formed on the upper layer resin on the side opposite to the mold) (the stacking step), and then pressing the mold to which the upper layer resin and the lower layer resin have been applied against a base film (the pressing step).

That is, the step (1) may be performed by simultaneously applying the upper layer resin and the lower layer resin to the mold. In this case, use of a flexible material for the mold facilitates formation of the uneven structure regardless of the shape of the base film.

The method of performing the stacking step and the pressing step at the same timing is preferably the following method (v).

(v) A method of applying the lower layer resin to a base film, applying the upper layer resin to the mold, and stacking the upper layer resin on the lower layer resin (the stacking step) while pressing, from the upper layer resin side, the mold to which the upper layer resin has been applied against the lower layer resin applied to the base film (the pressing step).

That is, the step (1) may be performed by applying the lower layer resin to a base film and the upper layer resin to the mold, and the step (2) may be performed by pressing, from the upper layer resin side, the mold to which the upper layer resin has been applied against the lower layer resin applied to the base film. In this case, stacking of the upper layer resin on the lower layer resin and formation of the uneven structure can be simultaneously performed. Furthermore, the number of steps can be reduced compared with the case of sequentially applying the lower layer resin and the upper layer resin to the base film. Also, the present method can suitably improve the anti-fouling properties, and in particular, can minimize the loss of the constituent materials of the upper layer resin.

Hereinafter, preferred characteristics of the method for producing an optical film according to the present invention are described. These examples may be appropriately combined within the spirit of the present invention.

The upper layer resin may be applied by a spray method. Thereby, the thickness of the upper layer resin can be easily adjusted, and in particular, the upper layer resin can be applied to a uniform thickness even when the upper layer resin is reduced in thickness in order to suitably increase the concentration of fluorine atoms in the vicinity of the surface of the upper layer resin. In the case of thinly applying the upper layer resin, the resin is preferably applied using, for example, a swirl nozzle, an electrostatic nozzle, or an ultrasonic nozzle. Since the fluorine-containing monomer contained in the upper layer resin is relatively expensive, thinly applying the upper layer resin enables reduction of the material cost of the optical film. Also, use of the spray method enables reduction of the apparatus cost.

The mold may have been subjected to a release treatment. Thereby, the surface free energy of the mold can be lowered, and the fluorine-containing monomer can be suitably concentrated in the vicinity of the surface of the resin layer (the upper layer resin) when the mold is pressed. The release treatment also suitably prevents the fluorine-containing monomer from moving away from the vicinity of the surface of the resin layer before the resin layer is cured. As a result, the concentration of the fluorine atoms in the vicinity of the surface of the optical film can be suitably increased.

The release treatment may be a surface treatment with a silane coupling agent. Thereby, the release treatment can be performed suitably.

The lower layer resin may have a viscosity of higher than 10 cp and lower than 10000 cp at 25° C. Thereby, the fluorine-containing monomer contained in the upper layer resin can be prevented from being mixed into the lower layer resin in the state where the upper layer resin and the lower layer resin are stacked, so that the concentration of fluorine atoms in the vicinity of the surface of the upper layer resin can be suitably prevented from decreasing. Also, the applicability of the lower layer resin can be suitably improved.

The upper layer resin may have a viscosity of higher than 0.1 cp and lower than 100 cp at 25° C. Thereby, suitable fluidity of the fluorine-containing monomer contained in the upper layer resin can be achieved. Furthermore, the applicability of the upper layer resin can be suitably improved.

The fluorine-containing monomer may be curable by ultraviolet rays. Thereby, the fluorine-containing monomer can be used effectively.

The upper layer resin may have a concentration of the fluorine-containing monomer of higher than 0% by weight and lower than 20% by weight. Thereby, occurrence of cloudiness due to a large amount of the fluorine-containing monomer can be suitably prevented.

The upper layer resin may contain no solvent. That is, the upper layer resin may be a non-solvent resin. In the case that a solvent is not added to the upper layer resin, an apparatus for drying and removing the solvent is not necessary, and thus the apparatus cost can be suppressed. Also, since no solvent is used, the cost for the solvent can be eliminated and the productivity can be improved. In contrast, if a solvent is added to the upper layer resin, the fluorine-containing monomer may be mixed too well, which may decrease the concentration of the fluorine atoms in the vicinity of the surface of the optical film. Also, the volatility of the upper layer resin will be high, which may decrease the applicability.

The compatible monomer may include an acid amide bond in the molecule. Thereby, the compatible monomers can be used effectively.

A difference between the solubility parameter of the compatible monomer and the solubility parameter of the fluorine-containing monomer may be in the range of 0 $(cal/cm^3)^{1/2}$ to 4.0 $(cal/cm^3)^{1/2}$. Thereby, the compatibility between the compatible monomer and the fluorine-containing monomer can be sufficiently improved.

A difference between the solubility parameter of the compatible monomer and the solubility parameter of a monomer component other than the compatible monomer in the lower layer resin may be in the range of 0 $(cal/cm^3)^{1/2}$ to 3.0 $(cal/cm^3)^{1/2}$. Thereby, the compatibility between the compatible monomer and the lower layer resin can be sufficiently improved.

A difference between the solubility parameter of the compatible monomer and the solubility parameter of a monomer component other than the compatible monomer in the upper layer resin may be in the range of 0 $(cal/cm^3)^{1/2}$ to 3.0 $(cal/cm^3)^{1/2}$. Thereby, the compatibility between the compatible monomer and the upper layer resin can be sufficiently improved.

A difference between the solubility parameter of the fluorine-containing monomer and the solubility parameter of a monomer component other than the compatible monomer in the lower layer resin may be in the range of 3.0 $(cal/cm^3)^{1/2}$ to 5.0 $(cal/cm^3)^{1/2}$. Thereby, the fluorine-containing monomer contained in the upper layer resin can be prevented from being mixed into the lower layer resin in the state where the lower layer resin and the upper layer resin are stacked, so that the concentration of fluorine atoms in the vicinity of the surface of the upper layer resin can be suitably prevented from decreasing.

A difference between the solubility parameter of the base film and the solubility parameter of a monomer component other than the compatible monomer in the lower layer resin may be in the range of 0 $(cal/cm^3)^{1/2}$ to 5.0 $(cal/cm^3)^{1/2}$. Thereby, the adhesion between the base film and the lower layer resin can be sufficiently improved.

Hereinafter, examples of preferred characteristics of the optical film of the present invention are described. The examples may be appropriately combined within the spirit of the present invention.

A surface of the optical film may have a contact angle with water of 100° or greater and a contact angle with hexadecane of 40° or greater. Thereby, an optical film having sufficiently high water repellency and oil repellency can be obtained.

The proportion of the number of the fluorine atoms relative to the total number of the carbon atoms, the nitrogen atoms, the oxygen atoms, and the fluorine atoms on the surface having the uneven structure may be 43 atom % or higher. Thereby, an optical film having sufficiently excellent anti-fouling properties can be obtained.

The cured resin layer may have a concentration of the fluorine atoms of 2% or lower, and in the measurement by X-ray photoelectron spectroscopy under the conditions of an X-ray beam diameter of 100 μm, an analysis area of 1000 m×500 μm, and a photoelectron extraction angle of 45°, 95% or more of the number of atoms in the cured resin layer about at least one kind of atom selected from the group consisting of the carbon atoms of $CF_2$ bonds, the carbon atoms of $CF_3$ bonds and $OCF_2$ bonds, and the oxygen atoms of the $OCF_2$ bonds may be contained in a region within 1 μm in terms of polyhydroxy styrene equivalent from the surface having the uneven structure in the depth direction. Thereby, the binding species including fluorine atoms are contained at a high concentration on the surface side of the cured resin layer (surface side of the uneven structure) even when the concentration of fluorine atoms in the cured resin layer is as low as 2% or lower, so that an optical film having sufficiently excellent anti-fouling properties can be obtained.

REFERENCE SIGNS LIST 1, 101a, 101b: optical film
2, 102: base film
3, 103a, 103b: lower layer resin
4, 104: upper layer resin
5, 105: mold
6, 106a, 106b: projection
7, 107: fluorine atom
8: resin layer
109: silicon dioxide layer
P, Q1, Q2: pitch
$D_L$: thickness of lower layer resin
$D_U$: thickness of upper layer resin
C1, C2, C3, C4, C5, C6, C7, $C_R$, O1, O2, O3, $O_R$: peak

The invention claimed is:

1. A method for producing an optical film having on a surface thereof an uneven structure provided with projections at a pitch equal to or shorter than the wavelength of visible light,
the method comprising the steps of:
(1) supplying a lower layer resin and an upper layer resin;
(2) forming a resin layer having the uneven structure on a surface thereof while mixing the lower resin and the upper resin by pressing a mold against the lower layer resin and the upper layer resin from the upper layer resin side in the state where the supplied lower layer resin and upper layer resin are stacked; and
(3) curing the resin layer in which the lower layer resin and the upper layer resin are mixed,
the upper layer resin containing a fluorine-containing monomer,
at least one of the lower layer resin and the upper layer resin containing a compatible monomer that contains no fluorine atoms and is compatible with the fluorine-containing monomer,
the compatible monomer being dissolved in the lower layer resin and the upper layer resin.

2. The method for producing an optical film according to claim 1,
wherein the step (1) is performed by sequentially applying the lower layer resin and the upper layer resin to a base film.

3. The method for producing an optical film according to claim 1,
wherein the step (1) is performed by simultaneously applying the lower layer resin and the upper layer resin to a base film.

4. The method for producing an optical film according to claim 1,
wherein the step (1) is performed by applying the lower layer resin to a base film and the upper layer resin to the mold, and
the step (2) is performed by pressing, from the upper layer resin side, the mold to which the upper layer resin has been applied against the lower layer resin applied to the base film.

5. The method for producing an optical film according to claim 2,
wherein the upper layer resin is applied by a spray method.

6. The method for producing an optical film according to claim 1,
wherein the mold has been subjected to a release treatment.

7. The method for producing an optical film according to claim 1,
wherein the lower layer resin has a viscosity of higher than 10 cp and lower than 10000 cp at 25° C.

8. The method for producing an optical film according to claim 1,
wherein the upper layer resin has a viscosity of higher than 0.1 cp and lower than 100 cp at 25° C.

9. The method for producing an optical film according to claim 1,
wherein the fluorine-containing monomer is curable by ultraviolet rays.

10. The method for producing an optical film according to claim 1,
wherein the upper layer resin has a concentration of the fluorine-containing monomer of higher than 0% by weight and lower than 20% by weight.

11. The method for producing an optical film according to claim 1,
wherein the upper layer resin contains no solvent.

12. The method for producing an optical film according to claim 1,
wherein the compatible monomer includes an acid amide bond in the molecule.

13. The method for producing an optical film according to claim 1,
wherein a difference between the solubility parameter of the compatible monomer and the solubility parameter of the fluorine-containing monomer is in the range of 0 $(cal/cm^3)^{1/2}$ to 4.0 $(cal/cm^3)^{1/2}$.

14. The method for producing an optical film according to claim 1,
wherein a difference between the solubility parameter of the compatible monomer and the solubility parameter of a monomer component other than the compatible monomer in the lower layer resin is in the range of 0 $(cal/cm^3)^{1/2}$ to 3.0 $(cal/cm^3)^{1/2}$.

15. The method for producing an optical film according to claim 1,
wherein a difference between the solubility parameter of the compatible monomer and the solubility parameter of a monomer component other than the compatible monomer in the upper layer resin is in the range of 0 $(cal/cm^3)^{1/2}$ to 3.0 $(cal/cm^3)^{1/2}$.

16. The method for producing an optical film according to claim 4,
wherein the upper layer resin is applied by a spray method.

17. The method for producing an optical film according to claim 1,
wherein a surface of the optical film has a contact angle with water of 100° or greater and a contact angle with hexadecane of 40° or greater.

18. The method for producing an optical film according to claim 1,
wherein the fluorine-containing monomer includes a moiety containing at least one selected from the group consisting of fluoroalkyl groups, fluorooxyalkyl groups, fluoroalkenyl groups, fluoroalkanediyl groups, and fluorooxyalkanediyl groups, and a reactive moiety.

19. The method for producing an optical film according to claim 18,
wherein the fluorine-containing monomer is represented by the following formula (A):

$$R^{f1}\text{—}R^{f2}\text{-}D^1 \tag{A}$$

wherein $R^{f1}$ represents a moiety containing at least one selected from the group consisting of fluoroalkyl groups, fluorooxyalkyl groups, fluoroalkenyl groups, fluoroalkanediyl groups, and fluorooxyalkanediyl groups; $R^2$ represents an alkanediyl group, an alkanetriyl group, or the ester, urethane, ether, or triazine structure derived from any of these groups; and $D^1$ represents a reactive moiety.

20. The method for producing an optical film according to claim 1,
wherein the fluorine-containing monomer includes a fluoropolyether moiety represented by the following formula (B) or (C):

$$CF_{n1}H_{(3-n1)}\text{—}(CF_{n2}H_{(2-n2)})_k O\text{—}(CF_{n3}H_{(2-n3)})_m O\text{—} \tag{B}$$

$$\text{—}(CF_{n4}H_{(2-n4)})_p O\text{—}(CF_{n5}H_{(2-n5)})_s O\text{—} \tag{C}$$

wherein n1 is an integer of 1 to 3, n2 to n5 each are 1 or 2, and k, m, p, and s each are an integer of 0 or greater.

21. The method for producing an optical film according to claim 1,
wherein the pitch is in the range of 100 nm to 400 nm.

* * * * *